United States Patent [19]
Bull et al.

[11] Patent Number: 5,735,995
[45] Date of Patent: Apr. 7, 1998

[54] APPARATUS FOR APPLYING AN APEX FILLER TO A BEAD RING

[75] Inventors: Jeffrey F. Bull, Tallmadge; Thomas D. Cartwright, Stow; Mark Marabito, Medina; Thomas D. Miller, Canton; Ty Rager, Akron; Evan J. Smith, Massillon, all of Ohio

[73] Assignee: The Steelastic Company, L.L.C., Lisle, Ill.

[21] Appl. No.: 600,896

[22] Filed: Feb. 13, 1996

[51] Int. Cl.$^6$ .................................................. B29D 30/48
[52] U.S. Cl. .................... 156/398; 156/130.7; 156/136; 156/422
[58] Field of Search ........................ 156/136, 422, 156/460, 130.7, 398, 403, 406.2, 420, 405.1, 130, 406.4, 133

[56] References Cited

U.S. PATENT DOCUMENTS

| | | | |
|---|---|---|---|
| 2,654,124 | 10/1953 | Layte | 264/281 |
| 2,655,977 | 10/1953 | Hodgkins | 156/420 |
| 3,019,475 | 2/1962 | Smith | 425/366 |
| 3,051,221 | 8/1962 | Strozewski | 156/420 |
| 3,647,126 | 3/1972 | Dieterich et al. | 156/405.1 |
| 3,912,440 | 10/1975 | Koss et al. | 425/366 |
| 3,944,458 | 3/1976 | Branick | 156/130 |
| 4,265,607 | 5/1981 | Kläy | 425/366 |
| 4,354,892 | 10/1982 | Tarantola et al. | 156/398 |
| 4,554,713 | 11/1985 | Chabal | 425/366 |
| 4,808,357 | 2/1989 | Bourcier et al. | 264/281 |
| 4,832,243 | 5/1989 | Usami | 156/406.4 |
| 4,882,006 | 11/1989 | Seki | 425/366 |
| 4,933,034 | 6/1990 | Kokubu et al. | 156/136 |
| 4,990,212 | 2/1991 | Pizzorno | 156/136 |
| 5,100,497 | 3/1992 | Moody et al. | 156/460 |
| 5,228,942 | 7/1993 | Kokui et al. | 156/420 |
| 5,328,533 | 7/1994 | Yasuno et al. | 156/130.7 |
| 5,441,587 | 8/1995 | Byerley | 156/406.2 |

FOREIGN PATENT DOCUMENTS

| | | | |
|---|---|---|---|
| 31 08 142 A1 | 9/1982 | Germany. | |
| 92/211131 | 7/1992 | WIPO | 156/136 |

Primary Examiner—Geoffrey L. Knable
Attorney, Agent, or Firm—Renner, Kenner, Greive Bobak, Taylor & Weber

[57] ABSTRACT

The assembly applies an apex filler to the outer circumferential surface of an annular bead ring. The apex filler applying assembly incorporates an apex filler applicator that is preferably operable in conjunction with a plurality of server mechanisms. One server mechanism is a conveyor that receives a bead ring. A locator operates in conjunction with the conveyor to position the annular bead ring precisely on the conveyor so that it may be engaged by a transfer mechanism. The transfer mechanism removes the bead ring from the conveyor and mounts it on a chuck turret assembly. A chuck head in the chuck turret assembly engages the bead ring and accurately positions the bead ring relative to applying rollers in the apex filler applicator, in which position the apex filler—which has been directed from an extruder through an orienting mechanism, into an in-feed mechanism and severed to length by an in-flight guillotine cutter—is applied to the annular bead ring. After the apex filler has been applied to the bead ring the transfer mechanism removes the finished tire bead sub-assembly from the chuck head and deposits the tire bead sub-assembly on the conveyor for removal from the assembly.

29 Claims, 30 Drawing Sheets

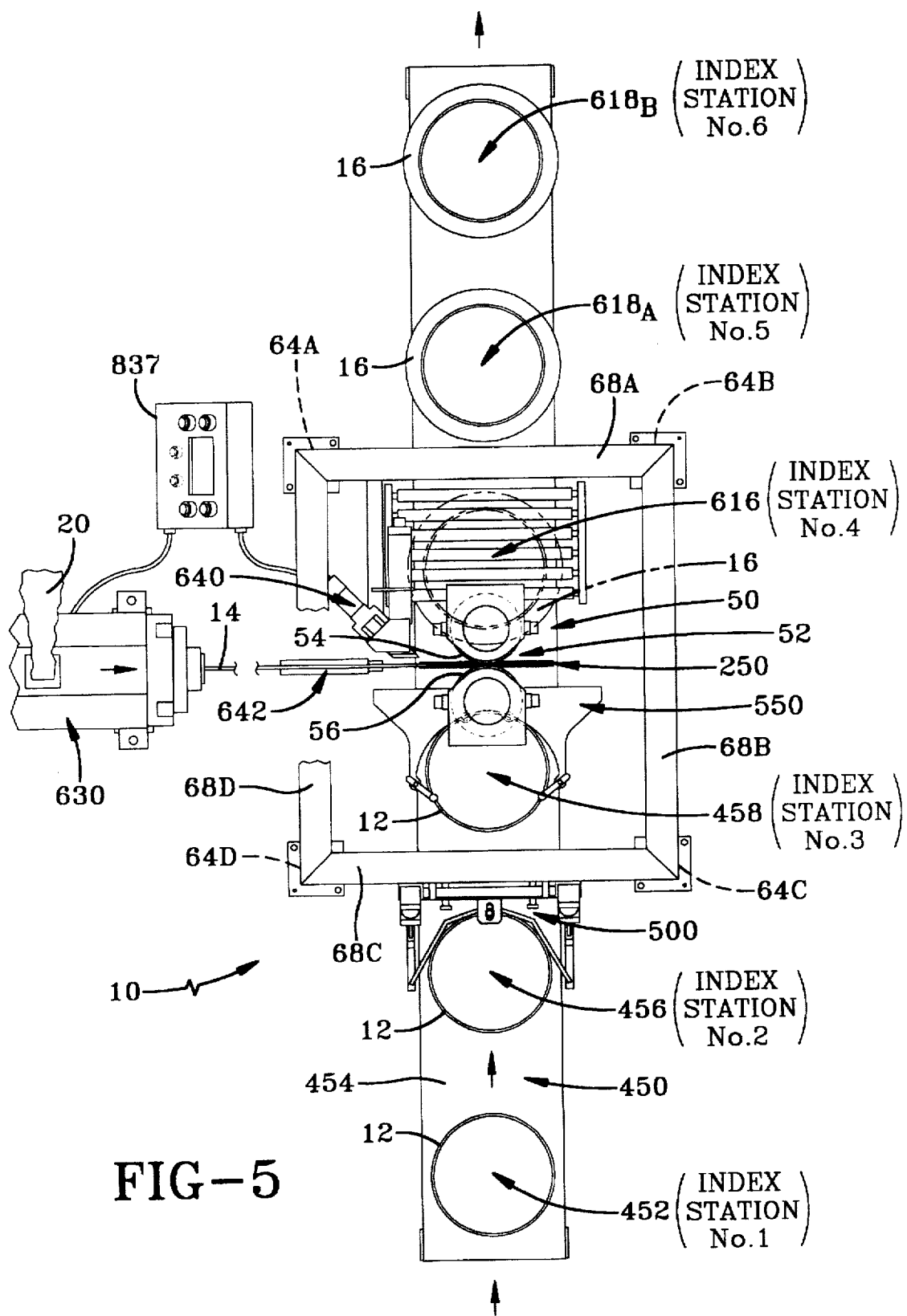

| |
|---|
| DEPOSIT BEAD RING ON CONVEYOR |
| PRECISELY LOCATE BEAD RING |
| INDEX BEAD RING TO CONVEYOR PICK-UP/DELIVERY LOCATION |
| TRANSFER BEAD RING TO CHUCK |
| SWING CHUCK TO POSITION BEAD RING IN APPLICATOR NIP |
| FEED ELASTOMERIC STRIP TO NIP |
| APPLY ELASTOMERIC STRIP TO BEAD RING |
| REMOVE BEAD ASSEMBLY FROM NIP |
| DELIVER BEAD ASSEMBLY TO PICK-UP/DELIVERY LOCATION ON CONVEYOR |
| INDEX BEAD ASSEMBLY TO SHAPE RETAINER |
| INDEX BEAD SUB-ASSEMBLY TO REMOVAL PORTION OF CONVEYOR |

FIG-6

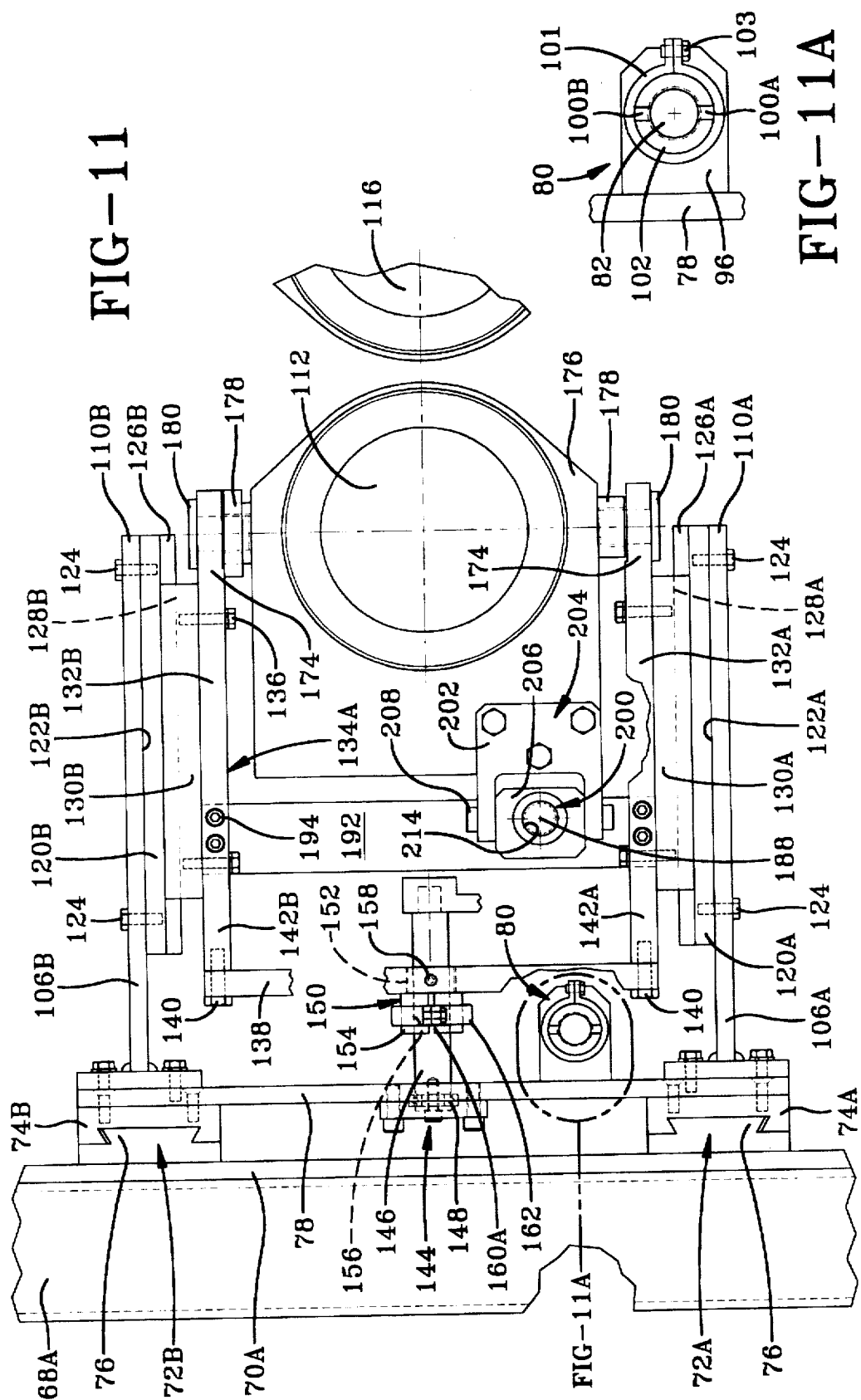

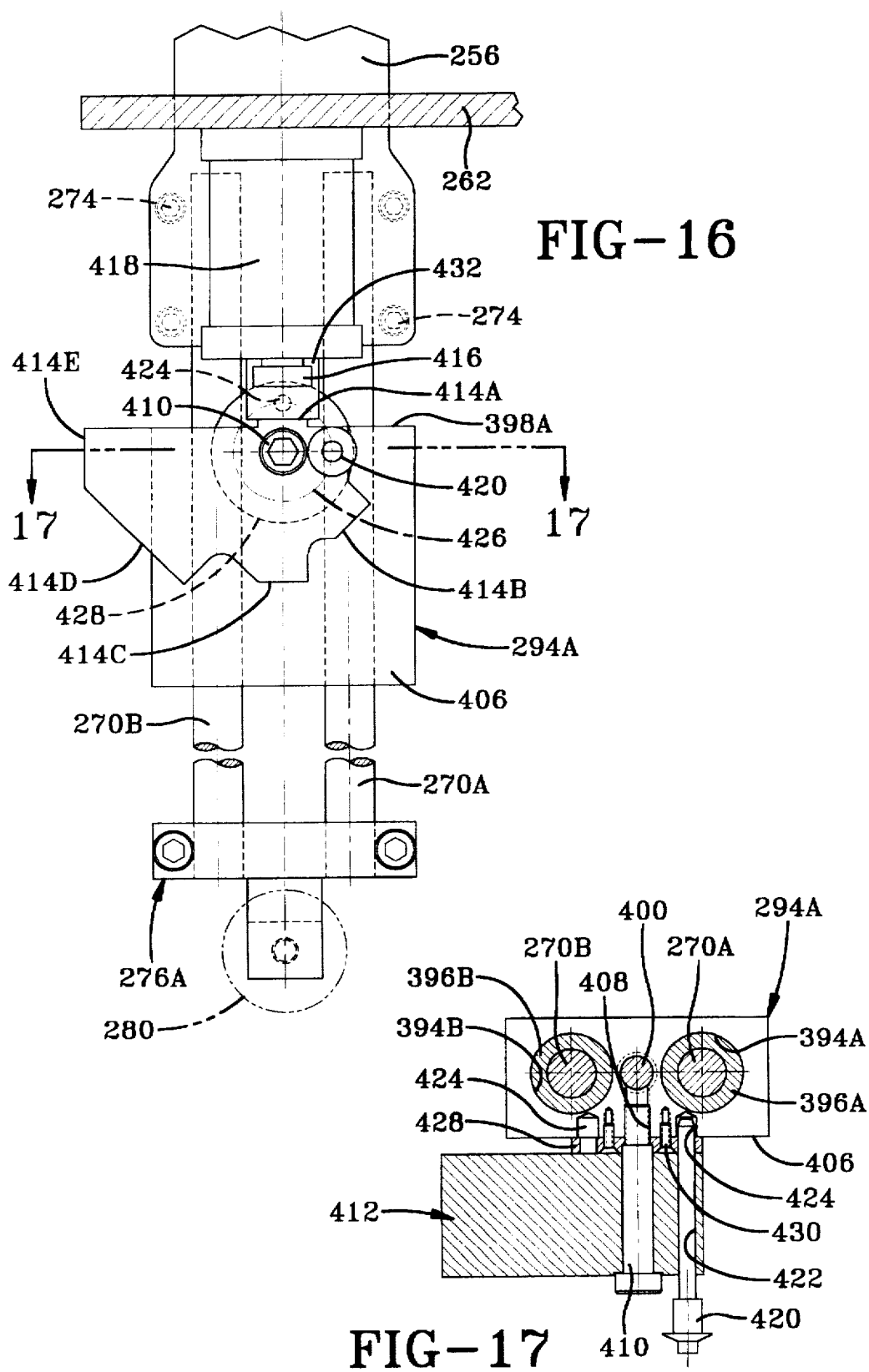

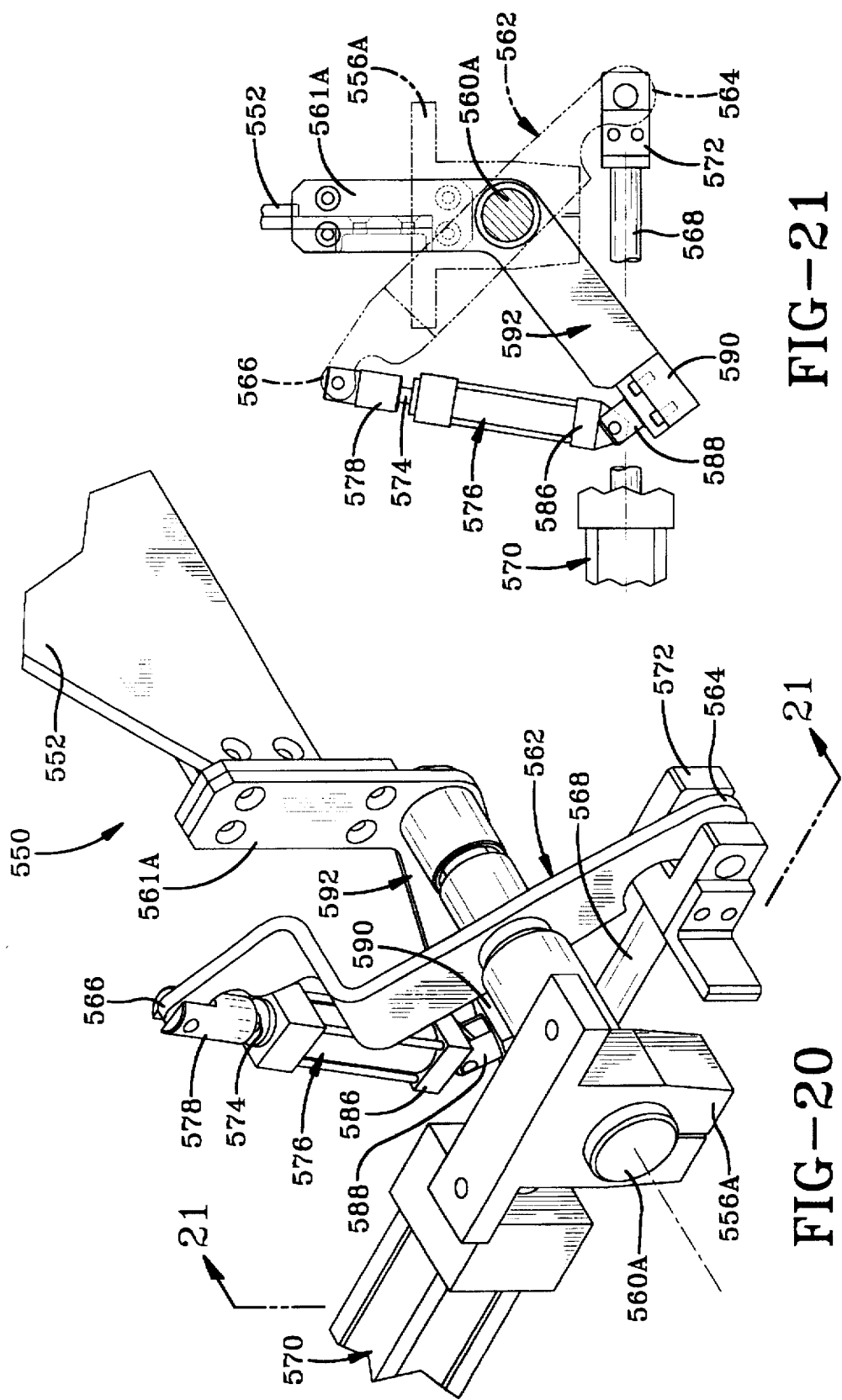

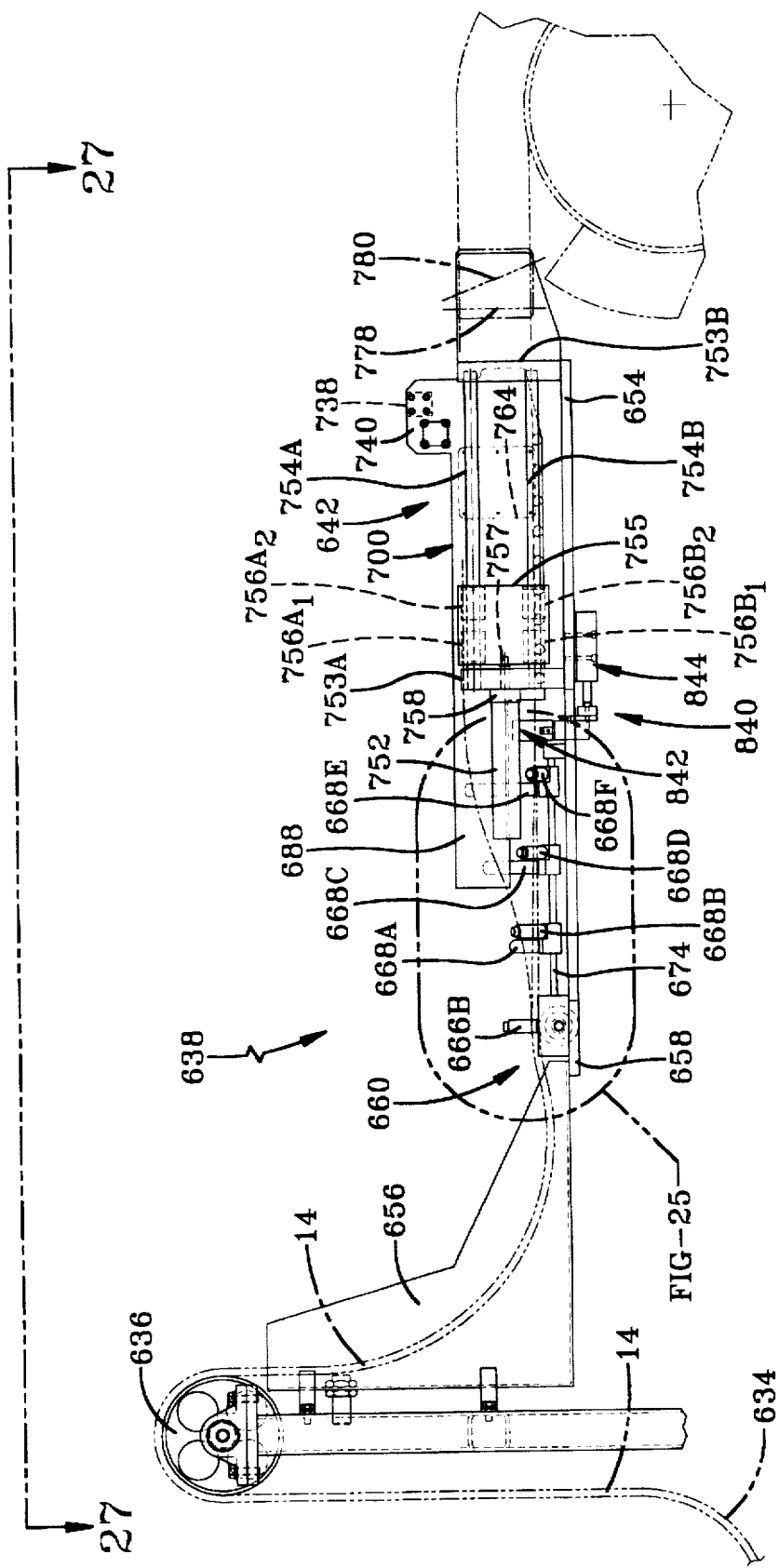

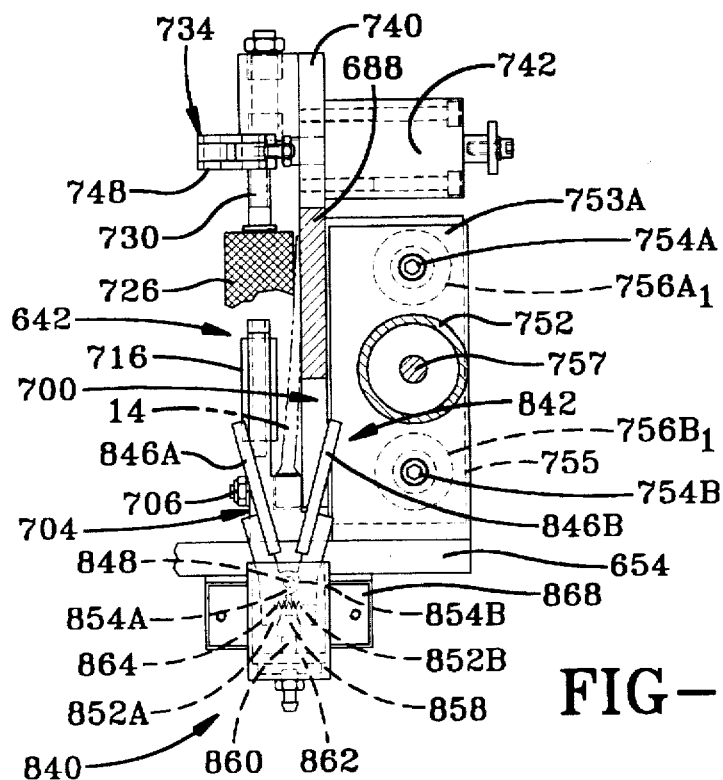
FIG-26E₁
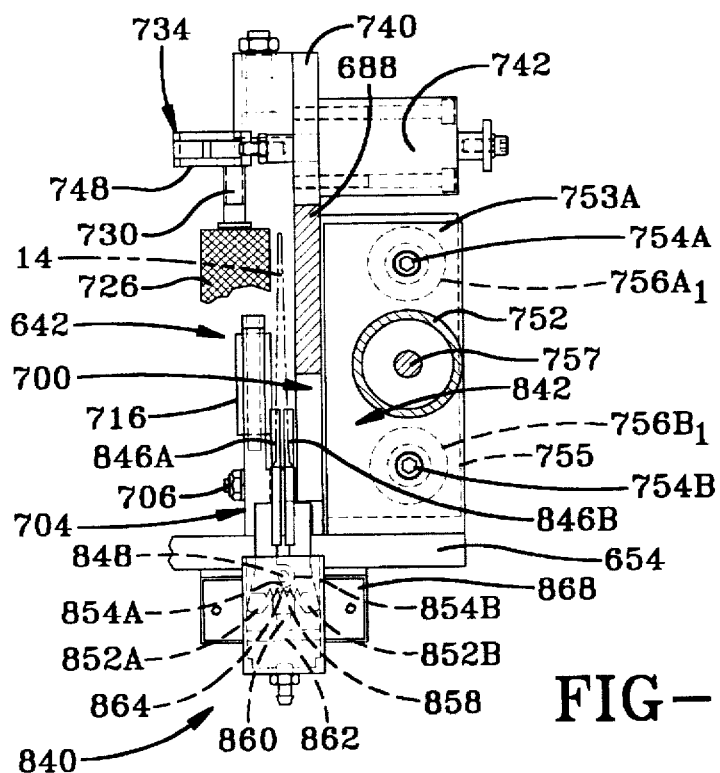
FIG-26E₂

APPARATUS FOR APPLYING AN APEX FILLER TO A BEAD RING

TECHNICAL FIELD

The present invention relates generally to a method and apparatus for applying an apex filler having a relatively high aspect ratio to an annular bead ring in order to provide a finished tire bead sub-assembly that is intended to be incorporated within a vehicular tire. More particularly, the present invention relates to a method and apparatus for applying a relatively high aspect ratio apex filler presented in linear form to an annular bead ring, the method and apparatus providing minimal scalloping, curling or cupping of the apex filler in the completed tire bead sub-assembly. Specifically, the present invention relates not only to the method and the unique apparatus for actually applying a relatively high aspect ratio apex filler to an annular bead ring but also to the servers that facilitate exercise of the method and operation of the apparatus for applying the apex filler to the annular bead ring.

BACKGROUND OF THE INVENTION

The unique apex filler applying apparatus to which the present invention is directed is an improvement over the apparatus disclosed in prior U.S. Pat. No. 5,100,497 which is owned, of record, by the Assignee of the present invention. The apparatus disclosed and claimed in said prior art patent operates quite effectively to apply apex fillers of limited aspect ratios—i.e.: for applying apex fillers having a radial dimension of up to approximately three-quarters (¾) of an inch with a base width on the order of about one quarter (¼) of an inch to constitute an aspect ratio on the order of approximately 3:1. The prior art apparatus, however, is incapable of applying apex fillers of any significantly greater aspect ratio than the aforementioned 3:1 ratio without causing the undesirable scalloping, curling or cupping of the apex filler in the completed tire bead sub-assembly.

As will become apparent, the aspect ratio desired for current apex fillers adapted for use in low profile tires will likely fall within the range of from about eight to one (8:1) to as much as sixteen to one (16:1). The prior art mechanisms for creating combined bead ring and apex filler assemblies—as exemplified by the apparatus disclosed in U.S. Pat. No. 5,100,497—simply can not create such assemblies with an apex filler having aspect ratios of such increased magnitude. To better understand the configuration of apex fillers having aspect ratios of relatively higher magnitude, a typical apex filler having about a three and one-third (3⅓) inch radial dimension and a base width of on the order of one quarter (¼) inch constitutes an aspect ratio of on the order of approximately thirteen to one (13:1). With the width of the apex filler falling in the range of from a little less than to a little more than approximately one quarter (94) inch and with the radial dimensions of the apex filler falling within the range of from about three (3) inches to as much as about five (5) inches, the aspect ratios are considerably more significant than are encountered with prior art configurations.

In order more clearly to comprehend the historic, and current, function of apex fillers it should be understood that a tire has two, laterally spaced bead portions which define the innermost diameter thereof. Each bead portion incorporates an annular, metallic, bead ring assembly which provides hoop strength and structural integrity to the bead—i.e.: the rim-engaging structure of the tire. Normally, each tire bead sub-assembly also includes an apex filler in addition to the metallic bead ring, because the combination assures a smooth transitional juncture between each bead portion and the adjacent sidewall portion of the tire.

While low profile tires are deemed to enhance the aesthetic appearance of the vehicle on which they are mounted, operation of a vehicle having low profile tires at high speeds may reduce the lateral stability of the vehicle. Specifically, if the design of the low profile tire incorporates a reduction in the rubberized material forming the sidewall of the tire, cornering the vehicle at high speeds is adversely affected by the minimization of the rubberized material in the sidewall. The application of additional plies within at least the side wall will enhance the lateral stability of the tire, not only at excessive cost but also by providing an unnecessary addition to the thickness of the tire beneath the tread portion.

The lateral stability of the tire sidewall has been found to have been satisfactorily increased to permit operation at high speeds merely by extending the apex filler further into, and in some situations to about the shoulder of, the tire sidewall. However, current vehicular tire design utilizes the apex filler to do more than provide for a smooth transitional juncture between each bead portion and the adjacent sidewall of the tire. In addition, apex fillers are currently employed as performance-tuning members. That is, they serve to increase cornering stability and to dampen harmonics inherent in the vehicular undercarriage on which the tires are mounted. Although this is a relatively easy fix for the tire designer, current apparatus for applying an apex filler of the desired size to the bead ring simply won't produce an acceptable combination of bead ring and apex filler—i.e.: a tire bead sub-assembly.

To facilitate the manufacture of the tire, the annular bead ring and the apex filler are generally provided as a composite tire bead sub-assembly about which the plies of the tire may be wrapped. The aforesaid U.S. Pat. No. 5,100,497 significantly advanced the technology of applying an apex filler to an annular bead ring.

The advancement achieved by U.S. Pat. No. 5,100,497 is best understood by recognizing the two primary manufacturing techniques that antedated that patent. One such historic prior art method of fabricating the tire bead sub-assembly applied a flat strip of elastomeric material along the inner circumference of a rubber-coated, annular, bead ring and then encapsulated the bead ring by wrapping the strip radially outwardly about the bead ring. That portion of the strip which extended radially outwardly from the bead ring constituted the apex filler. This method was fraught with difficulties, particularly in splicing the abutting ends of the wrapped strip. When the elastomeric strip was so wrapped to encapsulate the bead ring, the outer circumference of the material had to be stretched to accommodate the difference between the circumferential dimension of the bead ring and the circumferential dimension at the radially outer periphery of the elastomeric strip. This stretching induced stresses which produced warpage in the form of dishing, cupping or scalloping along the radially outer portion of the resulting apex filler. This warpage was not constant from filler to filler, and it therefore increased the difficulty of maintaining quality control between successive tires employing bead assemblies made by this method.

Another historic method of manufacturing a tire bead sub-assembly applied an apex filler strip to a rotating bead ring until the starting point of the apex filler strip was adjacent the point at which the apex filler strip was first applied to the bead ring—approximately one revolution—at which time the apex filler strip was severed. The partially combined bead ring and apex filler assembly was then moved to a second processing station where a gripping and stretching apparatus engaged the apex filler to close the ends and complete the tire bead sub-assembly. This also resulted in stretching the radially outer circumference of the apex filler strip more than that portion of the filler strip which had been joined with the bead ring. This stretching causes the same distortion problems inherent to, and as described in conjunction with, the previously discussed prior art methods.

SUMMARY OF THE INVENTION

It is, therefore, a primary object of the present invention to provide a novel method and apparatus for applying an elastomeric apex filler strip to a bead ring of substantially annular configuration, even when the aspect ratio—i.e.: the ratio of the radial height to transverse width—of the apex filler applied to the bead ring is significantly greater than capable with prior art mechanisms.

It is another object of the present invention to provide an improved method and apparatus for forming an apex filler, as above, wherein the aspect ratio is based upon a radial dimension for the apex filler that is significantly greater than is capable of being achieved with prior art mechanisms.

It is a further object of the present invention to provide an improved method and apparatus for applying an apex filler, as above, by delivering a strip of elastomeric material to a nip presented by opposed applying rollers having specially treated engaging surfaces to produce a substantially annular apex filler of increased aspect ratio.

It is a still further object of the present invention to provide an improved method and apparatus for applying an apex filler, as above, wherein the strip of elastomeric material is delivered to the nip presented by the opposed applying rollers at a linear speed that is equal to, or less than, the rotational surface speed of the applying rollers.

It is still another object of the present invention to provide an improved method and apparatus for manufacturing and applying an apex filler to an annular bead ring, as above, wherein the circumference of the elastomeric strip being formed into the apex filler is progressively lengthened relative to the increasing radius thereof by virtue of the interaction between the elastomeric strip and the specially treated engaging surfaces on a pair of angularly opposed applying rollers, while the apex filler is being simultaneously applied to the outer periphery of the annular bead ring, which is also being rotated by engagement with the applying rollers.

It is yet another object of the present invention to provide an improved method and apparatus for applying an apex filler to an annular bead ring wherein the bead ring is rotatably mounted on a chuck assembly having rollers that adjust virtually simultaneously to support bead rings of different diameters.

It is an even further object of the present invention to provide a plurality of improved servers in the nature of a bead ring conveyor operating in conjunction with a locator that precisely positions the bead ring on the locating portion of the conveyor. Precise indexing of the conveyor translates the precisely located bead ring to the pick-up/delivery portion where a further server, in the nature of a transfer mechanism, removes the bead ring from the conveyor and mounts it on yet another server in the nature of a chuck head presented from a chuck turret assembly. The chuck turret assembly then positions the bead ring to receive the apex filler. The transfer mechanism is also employed to remove the combined bead ring and apex filler—i.e.: the tire bead sub-assembly—and return it to the pick-up/delivery portion of the conveyor.

These and other objects of the invention, as well as the advantages thereof over existing and prior art forms, which will be apparent in view of the following detailed specification, are accomplished by means hereinafter described and claimed.

In general, an apex filler applying assembly embodying the concepts of the present invention utilizes a chuck means for selectively receiving an annular bead ring having a radially outer surface. Extruding means present a linear strip of elastomeric material having a substantially triangular cross section to the outer surface of the bead ring. A pair of opposed, frusto-conical, applying rollers each have a rotary axis and outer surfaces which are spaced, one with respect to the other, to define a nip therebetween. The configuration of the nip is adapted to engage the substantially triangular cross-sectional shape of the elastomeric strip and apply it to the outer surface of the annular bead ring. The elastomeric strip is delivered to the nip at a linear speed that is equal to, or less than, the surface speed at which the outer surfaces of the applying rollers are rotated about their respective rotary axes. Means are provided for indexing the chuck means, at least when supporting a bead ring, into the desired position relative to a nip defined by the adjustably mounted, opposed applying rollers. Means are also provided for cutting the strip to the length required to equal the circumference of the outer surface of the bead ring.

To acquaint persons skilled in the arts most closely related to the present invention, one preferred embodiment of an apex filler applying assembly that illustrates a best mode now contemplated for putting the invention into practice is described herein by, and with reference to, the annexed drawings that form a part of the specification. The exemplary apex filler applying assembly is described in detail without attempting to show all of the various forms and modifications in which the invention might be embodied. As such, the embodiment shown and described herein is illustrative, and—as will become apparent to those skilled in these arts—can be modified in numerous ways within the spirit and scope of the invention; the invention being measured by the appended claims and not by the details of the specification.

BRIEF DESCRIPTION OF THE DRAWINGS

FIG. 5 is a schematic top plan representation of an overall apex filler applying assembly embodying the concepts of the present invention;

FIG. 6 is a flow chart depicting the basic steps employed according to the concepts of the present invention in performing a method of applying a high aspect ratio apex filler to an annular bead ring;

FIG. 11 is top plan view taken substantially along line 11—11 of FIG. 10;

FIG. 11A is an enlarged area of FIG. 11 depicting the locking portion of the adjusting mechanism in end elevation, the area being designated by the chain-line circle in FIG. 11, said chain-line circle being specifically marked as "FIG. 11A;"

FIG. 16 is a rear elevation taken substantially along line 16—16 of FIG. 14A;

FIG. 17 is an enlarged, transverse section taken substantially along line 17—17 of FIG. 16;

FIG. 20 is an enlarged area of FIG. 19;

FIG. 21 is a section taken substantially along line 21—21 of FIG. 20;

FIG. 24 is an enlarged side elevational view of a portion of FIG. 22 focusing more particularly on the orienting feed mechanism and the in-feed mechanism by which a continuous elastomeric strip is delivered to the nip of the applying mechanism;

Figure 25:
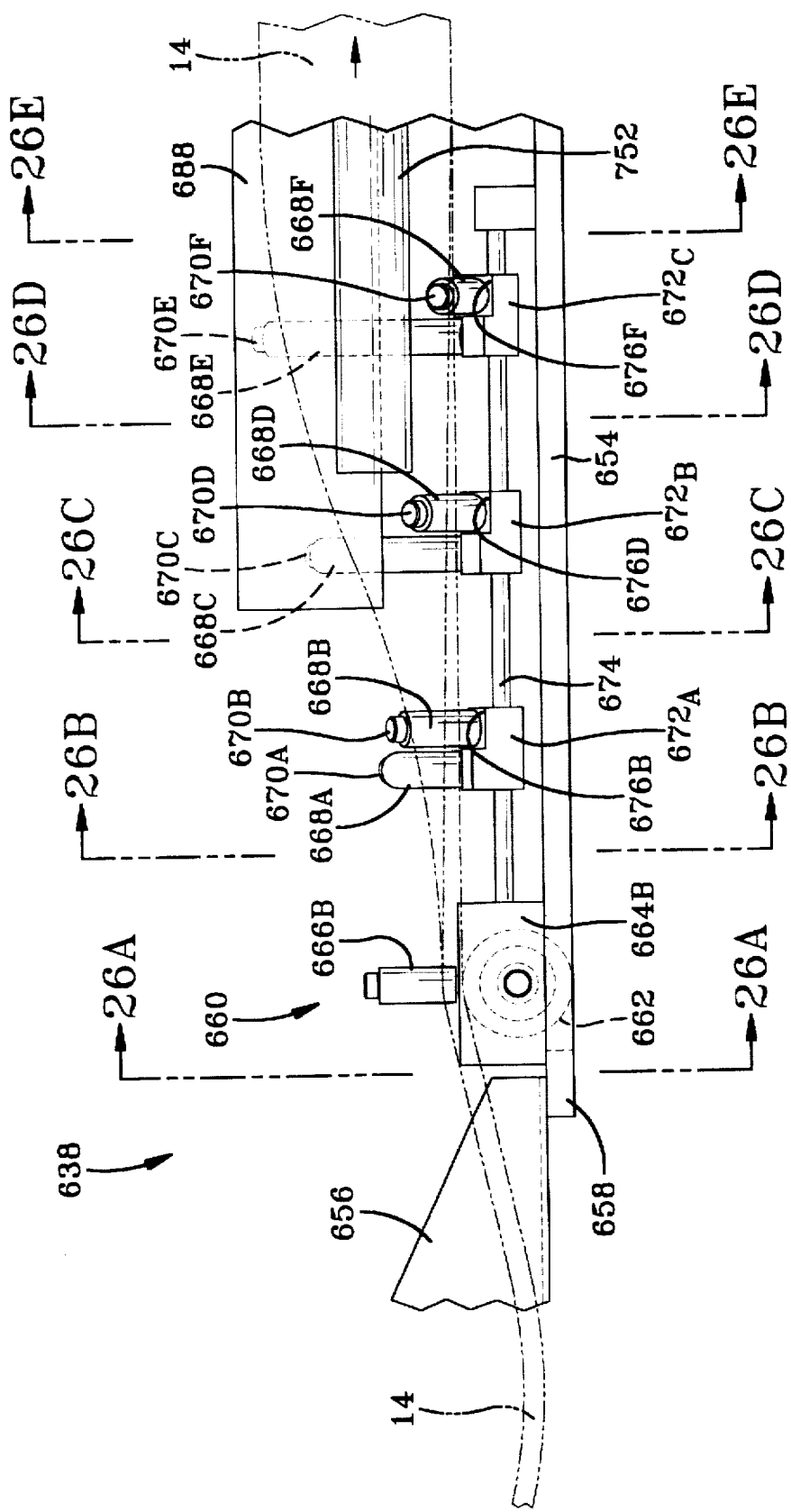
FIG. 25 is an enlarged area of FIG. 24, the area being designated by the chain-line ellipse in FIG. 24, said ellipse being specifically marked as "FIG. 25;"
Figure 26A:
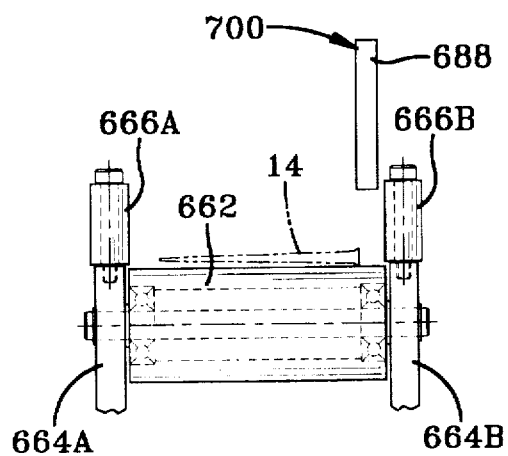
FIGS. 26A through 26D are longitudinally spaced, transverse sections taken substantially along the longitudinally spaced lines 26A—26A through 26D—26D on FIG. 25.
Figure 26B:
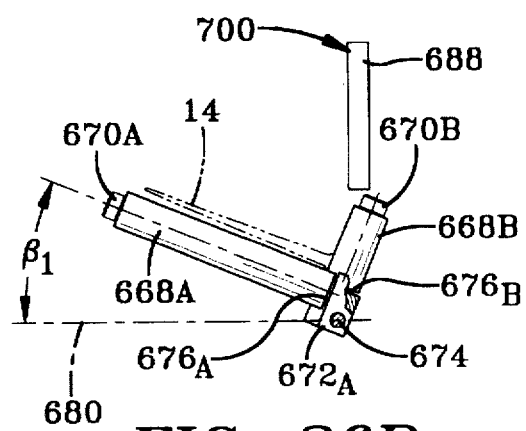
Figure 26C:
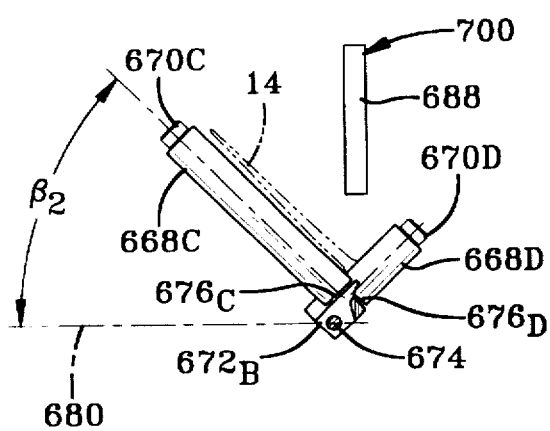
Figure 26D:
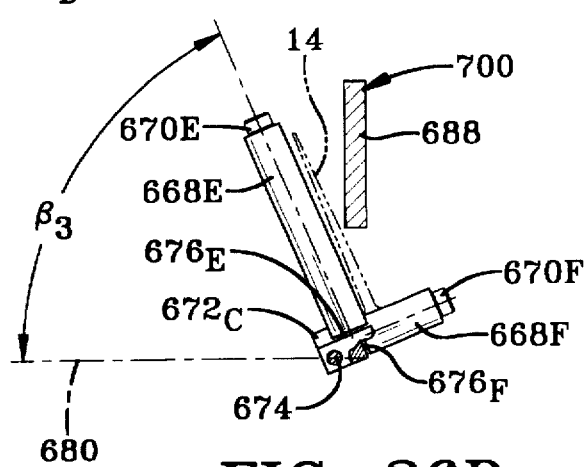
Figure 27:
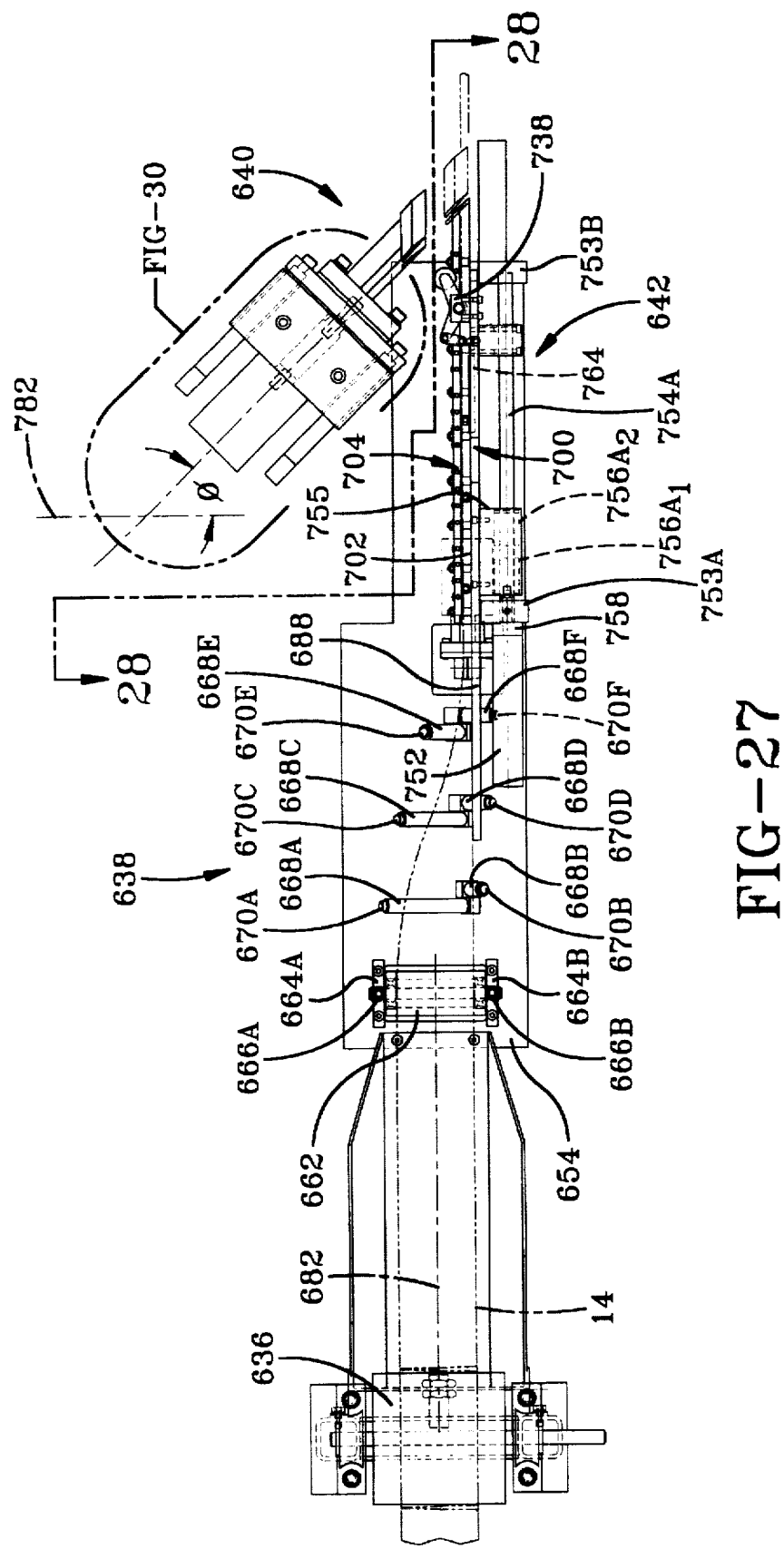
Figure 28:
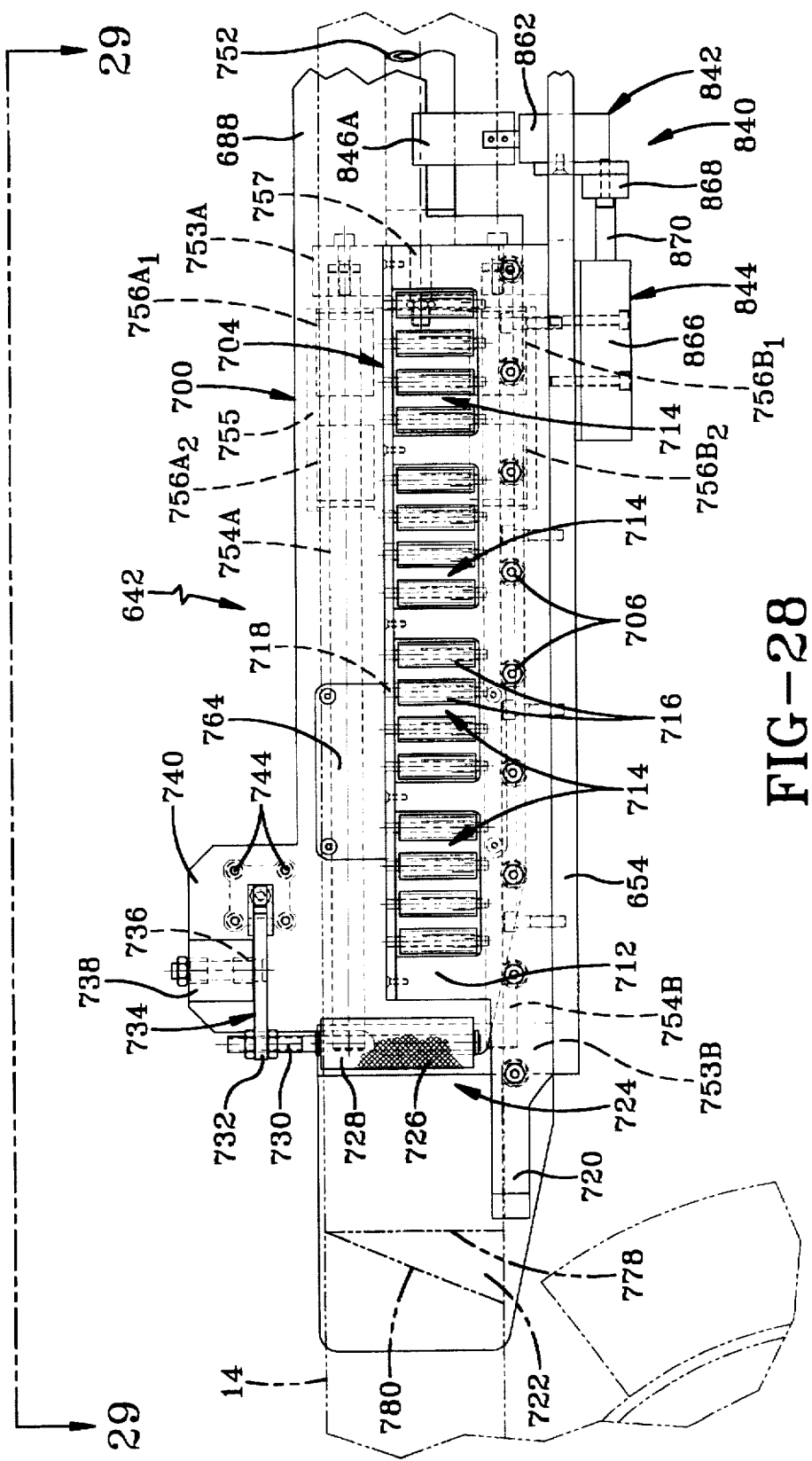
Figure 29:
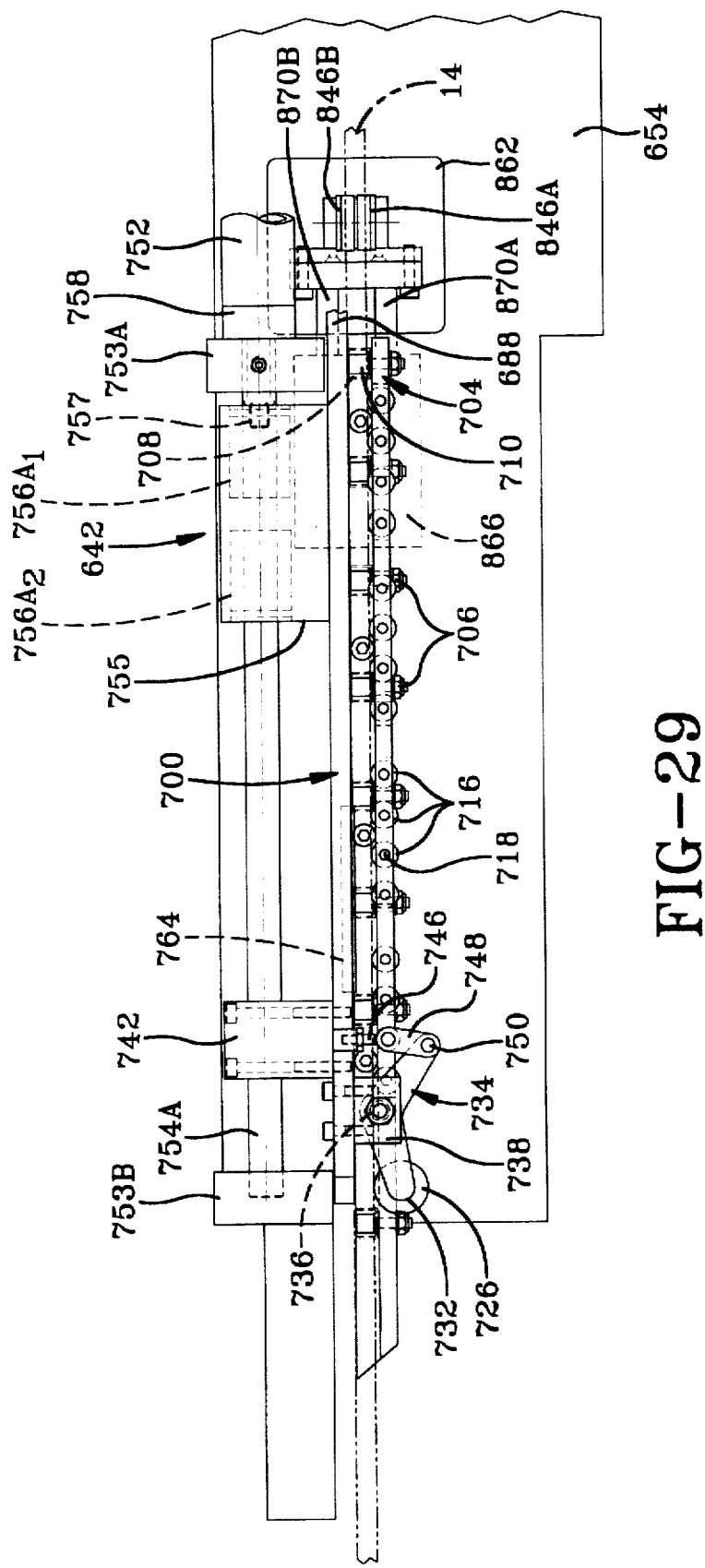
Figure 30:
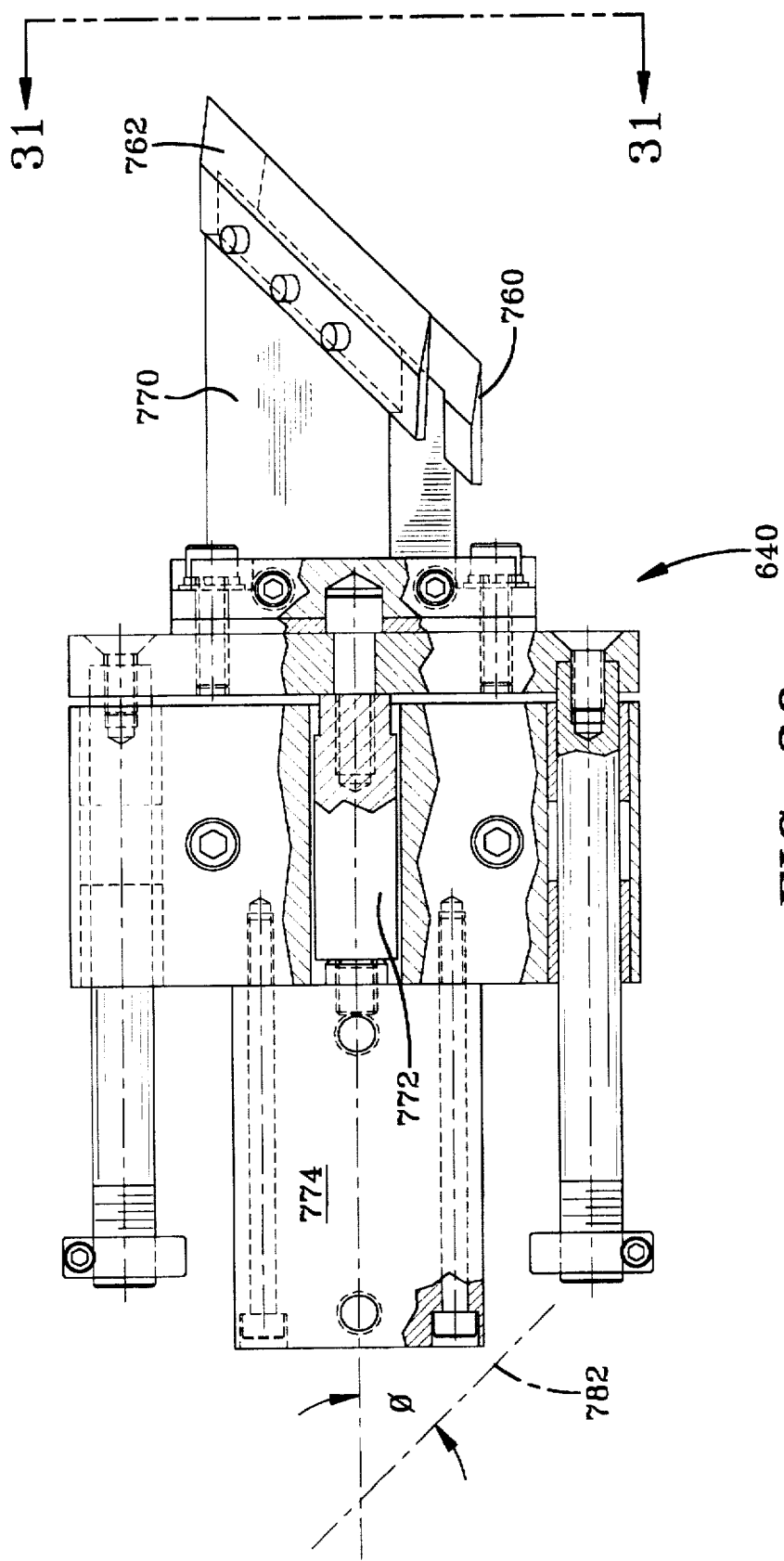

FIGS. $26E_1$ and $26E_2$ are both an enlarged transverse section taken substantially along line 26E—26E on FIG. 25—FIG. $26E_1$ depicting the gripper mechanism released from the apex filler strip passing therethrough and FIG. $26E_2$ depicting the gripper mechanism grasping the apex filler strip passing therethrough;

FIG. 27 is a top plan taken substantially along line 27—27 of FIG. 24;

FIG. 28 is an enlarged side elevational view of the in-feed mechanism taken substantially along line 28—28 of FIG. 27;

FIG. 29 is a top plan view taken substantially along line 29—29 of FIG. 28;

FIG. 30 is an enlarged area of FIG. 27 depicting the guillotine cutter, the area being designated by the chain-line ellipse in FIG. 27, said ellipse being specifically marked as "FIG. 30;"

Figure 8:
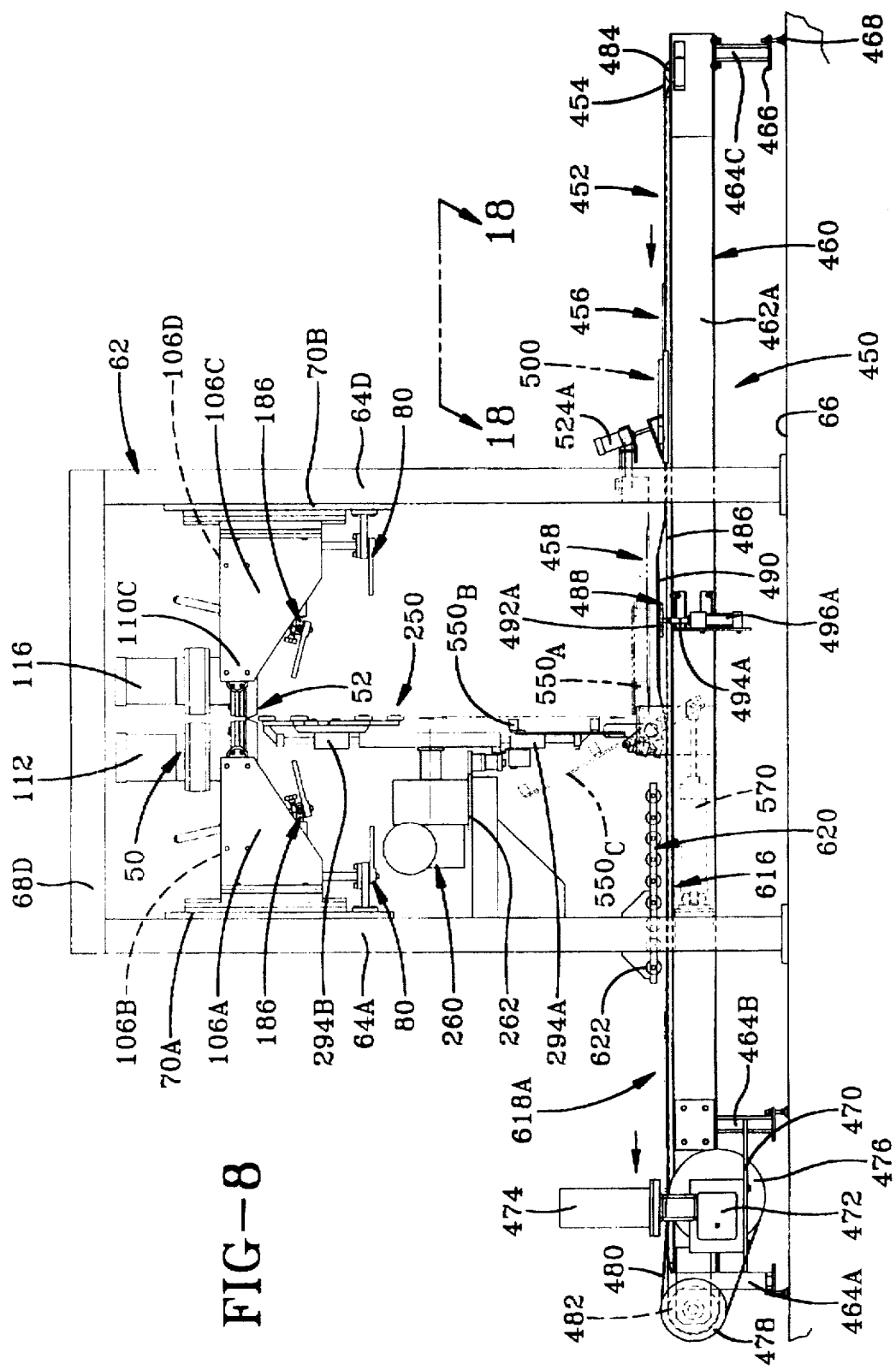
FIG. 8 is a side elevational view taken substantially along line 8—8 of FIG. 7.
Figure 31:
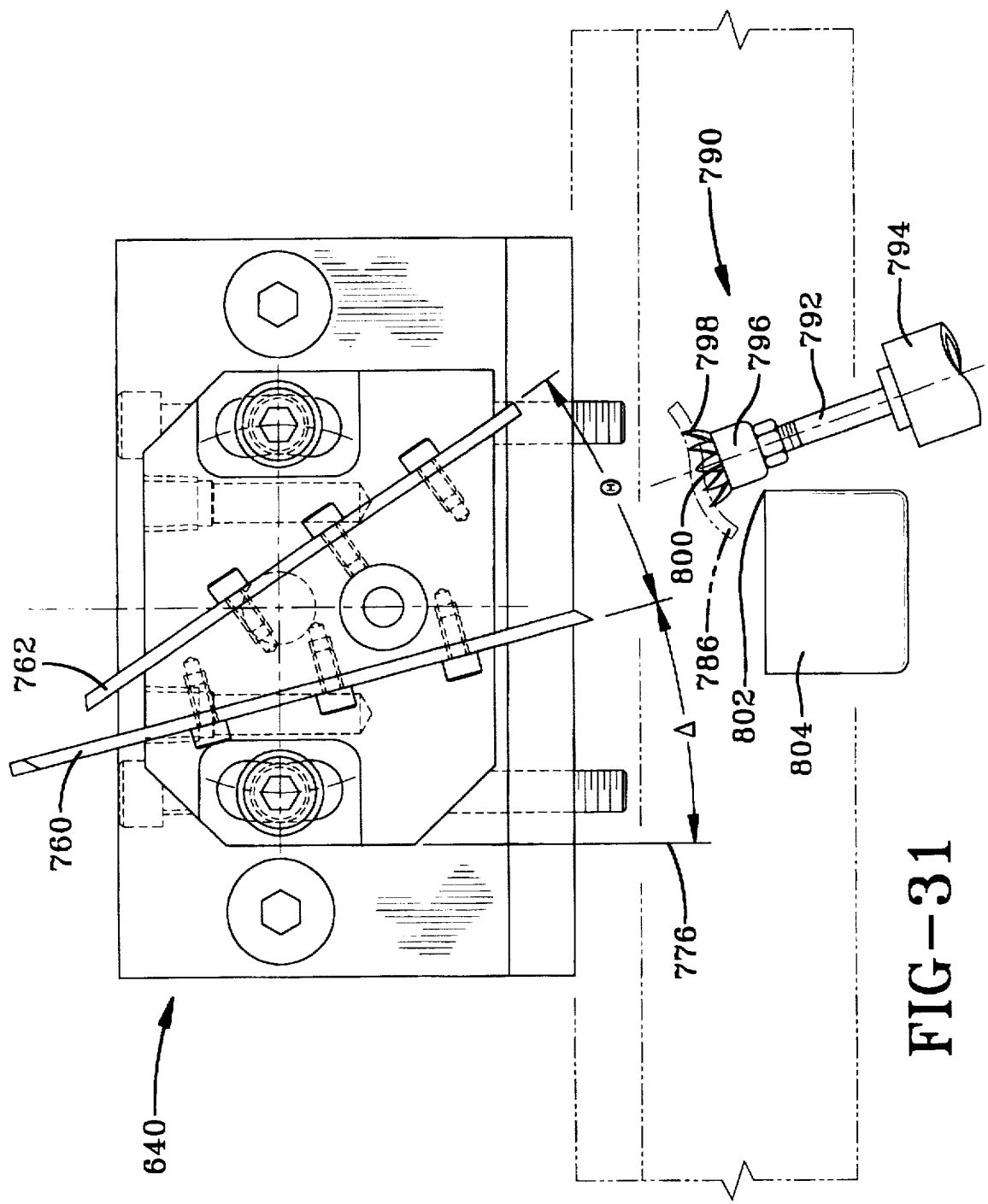
Figure 32:
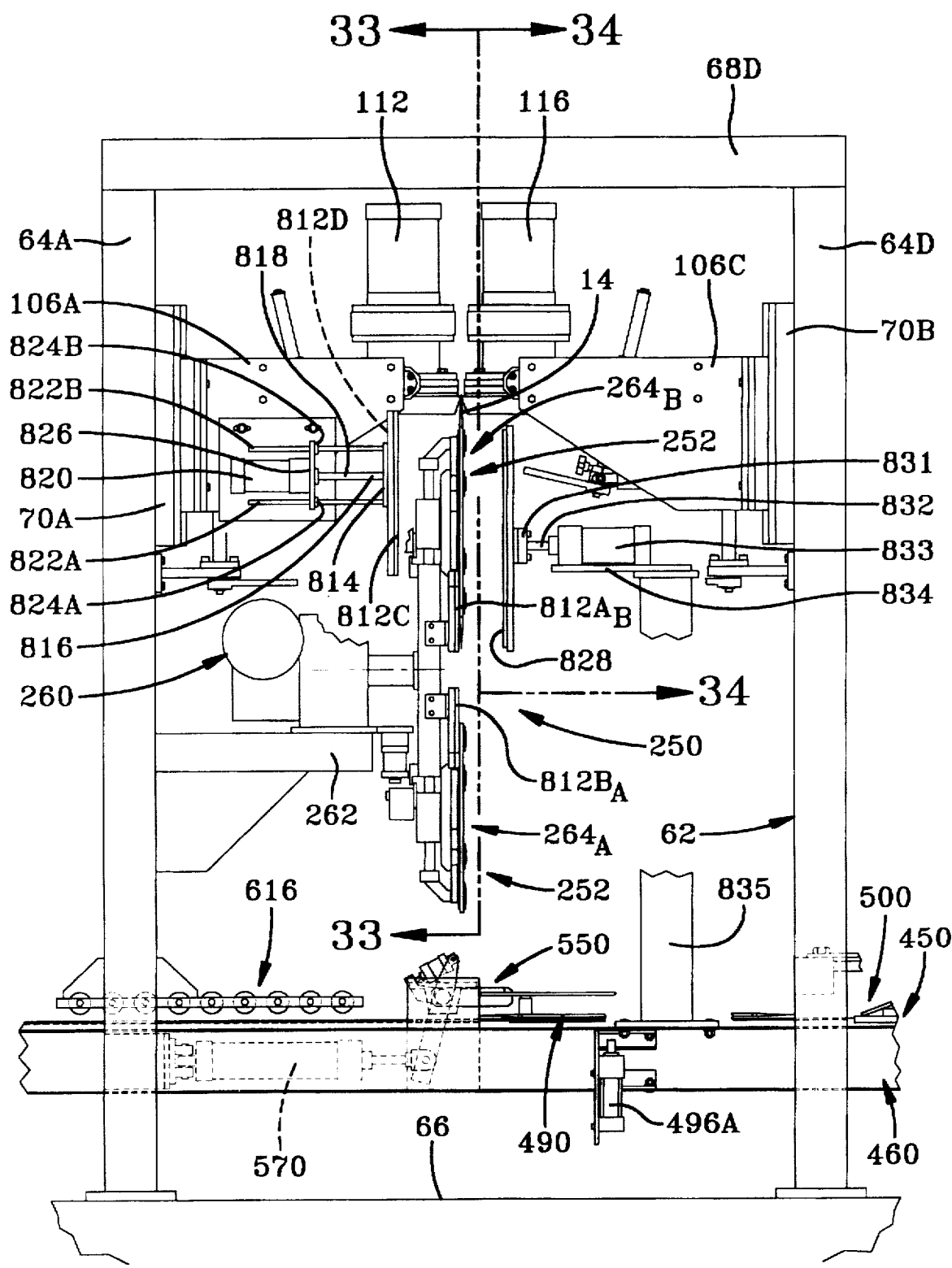
Figure 33:
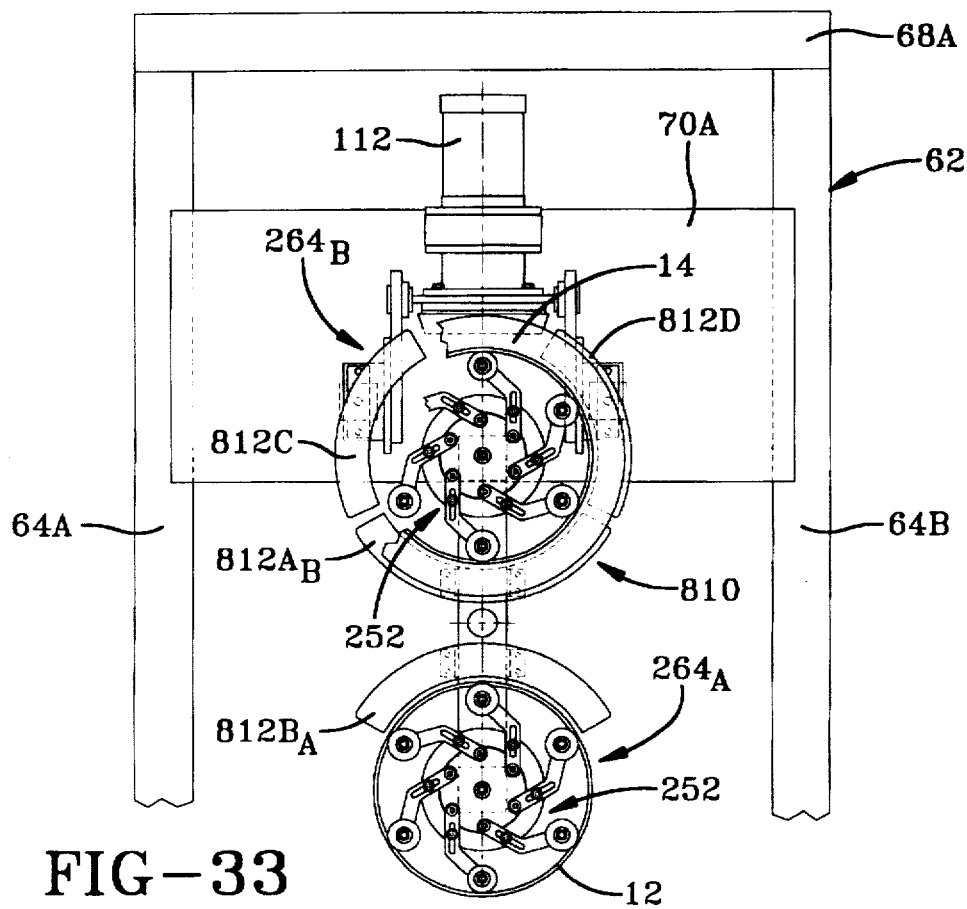
Figure 34:
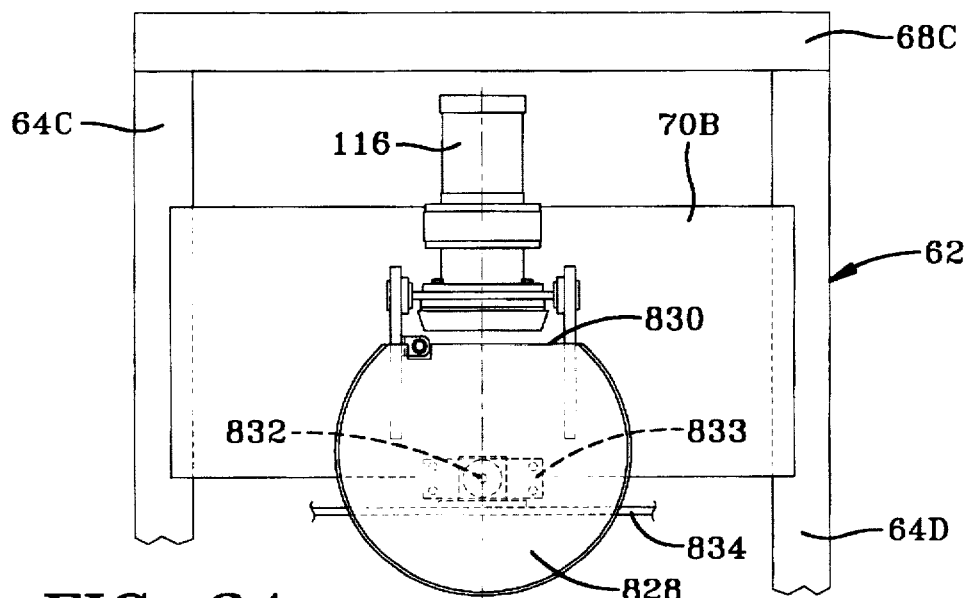

FIG. 31 is a frontal elevation taken substantially along line 31—31 of FIG. 30 to depict the relative disposition of the cutting blades;

FIG. 32 is a side elevation of the retainers and their relationship to the chuck heads in the chuck turret assembly which is represented in an enlarged portion of FIG. 8;

FIG. 33 is a cross sectional view taken substantially along line 33—33 of FIG. 32; and, FIG. 34 is a cross sectional view taken substantially along line 34—34 of FIG. 32.

DESCRIPTION OF AN EXEMPLARY EMBODIMENT

Overview of the Apex Filler Applying Assembly and its Operation

One representative form of an apex filler applying assembly embodying the concepts of the present invention is designated generally by the numeral 10 on the accompanying drawings. The representative apex filler applying assembly 10, as schematically represented in FIG. 5, incorporates an apex filler applicator, designated generally at 50, that is preferably operable in conjunction with a plurality of server mechanisms such as the chuck turret assembly 250, an apex filler in-feed mechanism 642, a guillotine cutter 640, a transfer mechanism 550 and a conveyor system 450. A receiving portion 452 (Index Station No. 1) on the belt 454 of the conveyor system 450 receives a bead ring 12 onto which an apex filler 14 (FIGS. 1 and 2) is to be applied.

As set forth on the basic-step flow chart (FIG. 6), during the initial—and each subsequent—indexing movement of the conveyor belt 454 the bead ring 12 that was previously located on the receiving portion 452 of the conveyor belt 454 is translated to a locating portion 456 (Index Station No. 2) where the bead ring 12 engages a locator mechanism 500 that operates to position the bead ring 12 precisely with respect to the conveyor belt 454.

Prior to the second indexing movement of conveyor belt 454 a second bead ring 12 is deposited on the receiving portion 452 of the conveyor belt 454 (Index Station No. 1) so that the second indexing movement of the conveyor belt 454 will move the second bead ring 12 to the locating portion 456 (Index Station No. 2). The second indexing movement of the conveyor belt 454 also translates initially deposited bead ring 12 from the locating portion 456 to a pick-up/delivery portion 458 (Index Station No. 3) where the bead ring 12 is engaged by the transfer mechanism 550.

Figure 9:
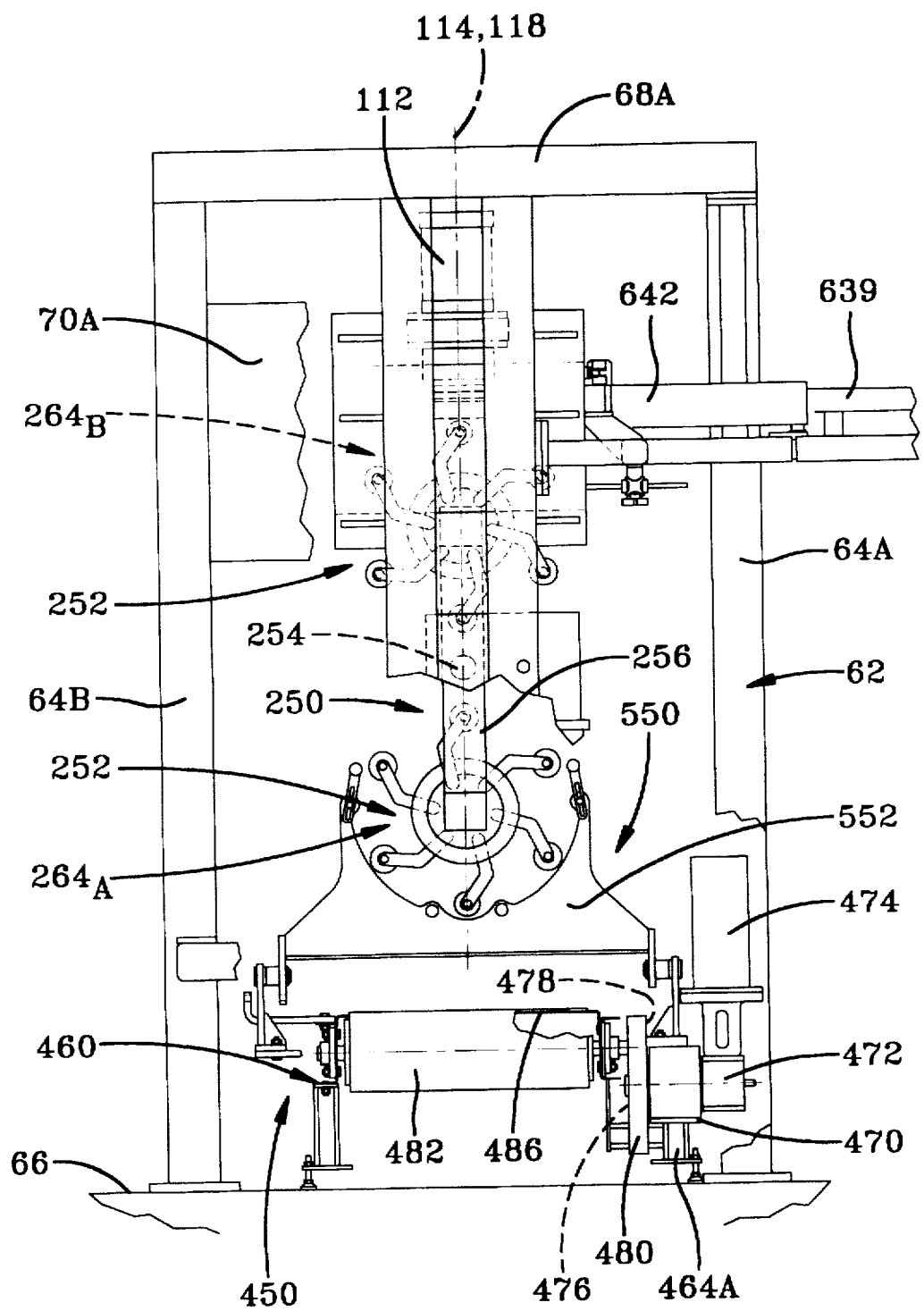
FIG. 9 is an end elevational view taken substantially along line 9—9 of FIG. 7.

The transfer mechanism 550 removes the bead ring 12—located at the pick-up/delivery portion 458—from the conveyor belt 454 and mounts it on one chuck head 252 of the chuck turret assembly 250. That chuck head 252 which receives a bead ring 12 from the transfer mechanism 550 is located at what is hereinafter identified as the chuck head loading/unloading position—designated as $264_A$ (FIG. 9). With a bead ring 12 received on the chuck head 252 at the loading/unloading position $264_A$, the chuck turret assembly 250 is indexed so that the chuck head 252 upon which the bead ring 12 is mounted is swung to what is hereinafter identified as the application position—designated as $264_B$ (also FIG. 9)—at which location the apex filler is applied to the bead ring 12. The two chuck heads 252 on the chuck turret assembly 250 may be identical, but their relative positions are thereby distinguished by the subscripted letter suffixes "A" or "B".

It should be appreciated that during start-up neither chuck head 252 has a bead ring 112 mounted thereon. As such, as soon as the first bead ring 12 has been transferred from the conveyor belt 454 to the chuck head 252 at the loading/unloading position $264_A$ by the transfer mechanism 550, the chuck turret assembly 250 indexes to swing the chuck head 252 supporting the bead ring 12 from the loading/unloading position $264_A$ to the application position $264_B$. That same initial indexing of the chuck turret assembly 250 swings the empty chuck head 252 that had been at the application position $264_B$ to the loading/unloading position $264_A$ to receive a bead ring 12. Thus, the conveyor belt 454 will index to place two successive bead rings 12 at the pick-up/ delivery portion 458 (Index Station No. 3) of the conveyor belt 454 before a finished tire bead sub-assembly 16 is returned to the pick-up/delivery portion 458 of the conveyor belt 454.

To continue with the overview, the bead ring 12 mounted on the chuck head 252 located at the chuck head application position $264_B$ is accurately positioned relative to a nip 52 (FIGS. 5, 8, 10 and 13A) defined between applying rollers 54 and 56 in the apex filler applicator 50 as the chuck turret assembly 250 indexes the chuck heads 252 supporting the bead ring 12 from chuck head loading/unloading position $264_A$ to the chuck head application position $264_B$. When a bead ring 12 is thus positioned within the nip 52 an apex filler 14 (which has been converted by an extruder 630 from an uncured elastomeric material 20 into a continuous strip of what will be applied as an apex filler 14) is properly disposed—by the orienting feed mechanism 638 (hereinafter more fully described in conjunction with FIGS. 24–27)—for application to the bead ring 12 and is properly inserted—by the in-feed mechanism 642 (also hereinafter more fully described in conjunction with FIGS. 24 and 27–29)—into the nip 52. When the strip form of the apex filler 14 is received within the nip 52, the apex filler applicator 50 applies the apex filler 14 to the annular bead ring 12 to complete a finished tire bead sub-assembly 16.

During the initial start-up, and during each subsequent application of an apex filler 14 to the bead ring 12 supported on the chuck head 252 that is located at chuck head application position $264_B$, the conveyor belt 454 indexes to position the next successive bead ring 12 at the pick-up/ delivery station 458, and the transfer mechanism 550 positions that bead ring 12 on whichever chuck head 252 is then located at chuck head loading/unloading position $264_A$.

After the apex filler 14 has been applied by the applicator 50 to that bead ring 12 mounted on the chuck head 252 at the chuck head application position $264_B$, the chuck turret assembly 250 indexes to remove the finished tire bead sub-assembly 16 from the nip 52 and to present the finished tire bead sub-assembly 16—still supported on the chuck head 252—at chuck head loading/unloading position $264_A$ where the transfer mechanism 550 removes the completed tire bead sub-assembly 16 from its supporting chuck head 252 and deposits it on the pick-up/delivery portion 458 of the conveyor belt 454. That same indexing movement of the chuck turret assembly 250 positions the chuck head 252 supporting the next successive bead ring 12 within the nip 52 of the applicator 50 at chuck head application position $264_B$.

The aforesaid transfers of the bead rings 12 and the tire bead sub-assemblies 16 between the chuck heads 252 and the conveyor belt 454 will be hereinafter more fully explained, but in order to enhance initial understanding of the invention it should be appreciated that the C-shaped frame member 552 (FIG. 9) of the transfer mechanism 550 is selectively movable between three positions, as is best seen on FIG. 8. In the first transfer mechanism position $550_A$ the C-shaped frame member 552 is disposed in parallel relation to the conveyor belt 454 so that a bead ring 12 resting on the pick-up/delivery portion 458 of the belt 454 can be operatively engaged by the frame member 552 and lifted off the belt 454.

In the second position $550_B$, the C-shaped frame member 552 is disposed in perpendicular relation to the conveyor belt 454. That is, the bead ring 12 supported on the transfer mechanism 550 is disposed in co-planar relation with the chuck head 252 located at the chuck head loading/unloading position $264_A$. At transfer mechanism position $550_B$, therefore, the support of the bead ring 12 can be changed from the frame member 552 to the chuck head 252 located at chuck head loading/unloading position $264_A$. Conversely, at transfer mechanism position $550_B$ support of a finished tire bead sub-assembly 16 can be changed from the chuck head 252 to the frame member 552.

In the third position $550_C$ of the transfer mechanism 550 the C-shaped frame member 552 remains idle. It has no function in the third position $550_C$ except to avoid engagement with the other elements of the apex filler apply assembly 10. The frame member 552 moves from the second transfer mechanism position $550_B$ to the third position $550_C$ after the bead ring 12 is transferred from the frame member 552 to that chuck head 252 at chuck head loading/unloading position $264_A$. Conversely, the frame member 552 moves from the third position $550_C$ to the second position $550_B$ when a finished tire bead sub-assembly 16 is supported by the chuck head 252 at chuck head loading/unloading position $264_A$. This movement causes the frame member 552 to engage the tire bead sub-assembly 16 and change the support of the tire bead sub-assembly 16 from the chuck head 252 to the frame member 552.

Movement of the frame member 552 from the second position $550_B$ back to the first position $550_A$ delivers the finished tire bead sub-assembly 16 from the frame member 552 to the pick-up/delivery portion 458 of the conveyor belt 454.

When the conveyor belt 454 is indexed after the tire bead sub-assembly 16 has been transferred to the conveyor belt 454 the next successive bead ring 12 is moved to the pick-up/delivery portion 458 of the conveyor belt 454 while the finished tire bead sub-assembly 16 is being translated to a shape retainer station 616 (Index Station No. 4) which maintains the desired shape of the tire bead sub-assembly 16 as it at least partially cools. The next indexing movement of the conveyor belt 454 translates the tire bead sub-assembly 16 to the removal portion 618 (Index Station No. 5) as successive bead rings 12 are, in turn, converted to finished tire bead sub-assemblies 16. There may, as shown, be two removal portions $618_A$ and $618_B$ (Index Stations No. 5 and 6).

Overview of Apex Filler Applicator

Figure 1:
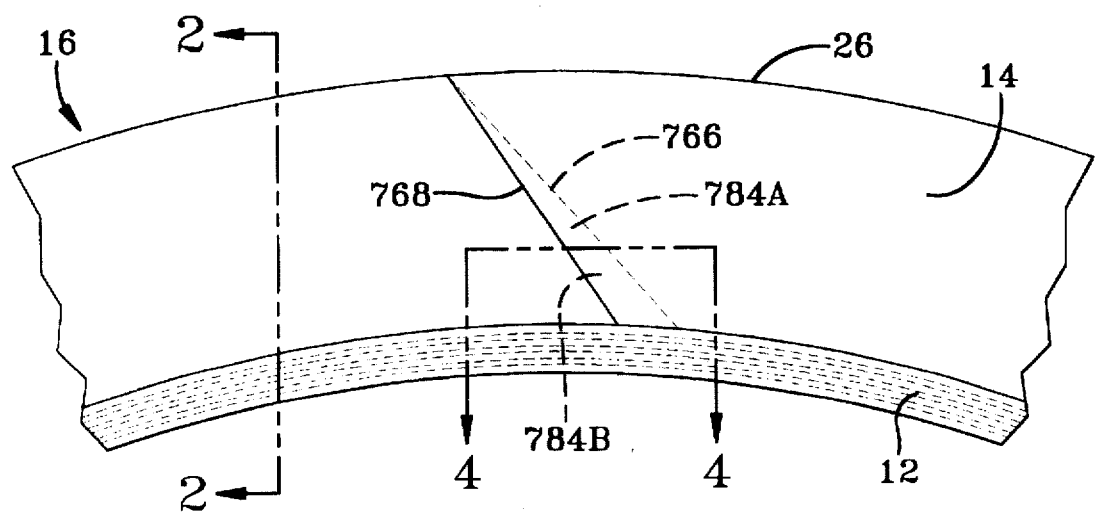
FIG. 1 is a partial side elevation of a tire bead sub-assembly which comprises an annular bead ring to which an apex filler has been applied according to the method and by the apparatus of the present invention.
Figure 2:
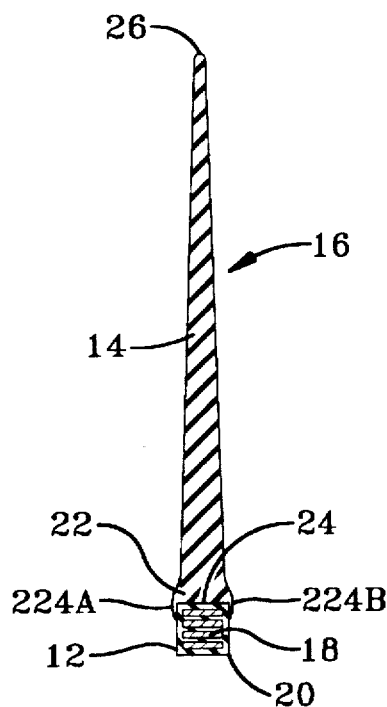
FIG. 2 is an enlarged section taken substantially along line 2—2 of FIG. 1.
Figure 3:
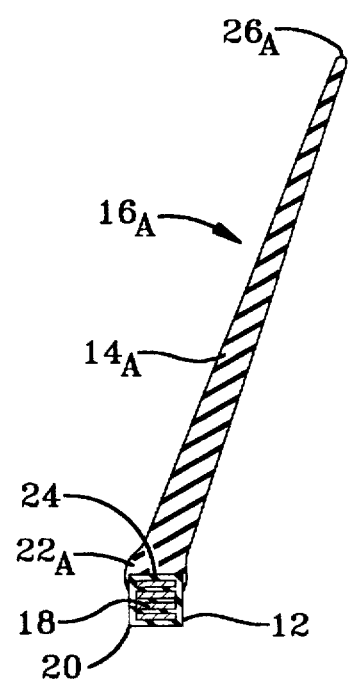
FIG. 3 is view similar to FIG. 2 but depicting an alternative disposition at which the apex filler may be applied to the annular bead ring in accordance with the concepts of the present invention.

Inasmuch as an apex filler 14 will be combined with an annular bead ring 12 by the method or apparatus embodying the concepts of the present invention, let us first direct our attention to the combined bead ring and apex filler—or tire bead sub-assembly 16. As is depicted in FIGS. 1 through 3, and as is well known to the art, a bead ring 12 may have a number of configurations. FIGS. 1 and 2, however, represent a typical construction wherein each bead ring 12 comprises a volute wound metallic ribbon 18 (it could as well be a plurality of wires disposed in an annular configuration) that is encased by a coating of uncured elastomeric material 20 in order to effect a joinder not only between the successively wound layers of the ribbon 18 (or wires) forming the annular bead ring 12 but also between the annular bead ring 12 and the apex filler 14 without the need to employ special adhesives. In order to simplify the disclosure, the annular bead ring 12 is depicted as having a rectilinear cross section, and the apex filler 14 is depicted as having a cross sectional configuration of an isosceles triangle, the base 22 of which engages the outer circumferential surface 24 of the bead ring 12 such that the apex filler 14 will extend outwardly in the form of an isosceles triangle to the outer edge 26 thereof. It must be understood, however, that the present invention is not limited to those specific configurations.

For example, a tire bead sub-assembly $16_A$—depicted in FIG. 3—utilizes an alternative configuration for the apex filler $14_A$. In FIG. 3 the bead ring 12 is represented as being conjoined to an apex filler $14_A$ having the cross sectional configuration of a scalene triangle. The base $22_A$ of the apex filler $14_A$ also engages the outer circumferential surface 24 of the bead ring 12 but the radially outer edge $26_A$ of the apex filler $14_A$ is laterally offset from the position the outer edge 26 occupies in the apex filler 14 in the finished tire bead sub-assembly 16 depicted in FIGS. 1 and 2. This alternative form of the combined bead ring and apex filler sub-assembly $16_A$, and its components, may be manufactured with the same apparatus, and processes, that are used to manufacture the tire bead sub-assembly 16, and its components.

As previewed to this point in the description, there are situations where quite similar, but significantly different, structural members, components or arrangements may be employed at various locations. When referring generally to those types of structural members, components or arrangements a common numerical designation shall be employed. However, when one of the structural members, components or arrangements so identified is to be individually identified it shall be referenced by virtue of a letter subscript employed in combination with the numerical designation employed for general identification of such structural members, components or arrangements. For example, two, generally similar, but significantly different apex fillers have been referenced. Apex fillers are generally identified by the numeral 14, but the specifically different apex filler is identified by the alphanumeric designator $14_A$ in the specification and on the drawings. Similarly, various structural members, components or arrangements may be sequentially disposed at distinctly different dispositions. Here, too, the members shall be generally identified by their numerical designation, but the distinct dispositions will be distinguished by the use of subscripted letter suffixes. This convention would be exemplified by the use of the designations $264_A$ and $264_B$ to identify the two positions of the chuck heads 252 as well as the use of the designations $550_A$, $550_B$ and $550_C$ to identify the three positions of the C-shaped frame member 552 in the transfer mechanism 550. This subscript convention shall also be employed throughout the specification.

The shape of the apex filler 14, or $14_A$, is determined by the configuration of the aperture through the die head 652 of the extruder 630, but the application of either filler 14 or $14_A$ to the bead ring 12 is accomplished by the complimentarily shaped nip 52 defined by the opposed frusto-conical surfaces 58 and 60 on the applying rollers 54 and 56 employed in the apex filler applicator 50. Apex fillers 14 may be produced in a wide range of shapes by apparatus embodying the concepts of the present invention. The ability to substitute die heads 652 in the extruder 630 as well as the ability to effect selective, independent, angular adjustment of each applying roller 54 and 56, together with the ability to select the desired cross sectional configuration of the applying rollers 54 or 56 will allow the application of apex fillers 14 having a wide range of cross sectional configurations provided by the extruder 630.

Apex Filler Applicator

Figure 7:
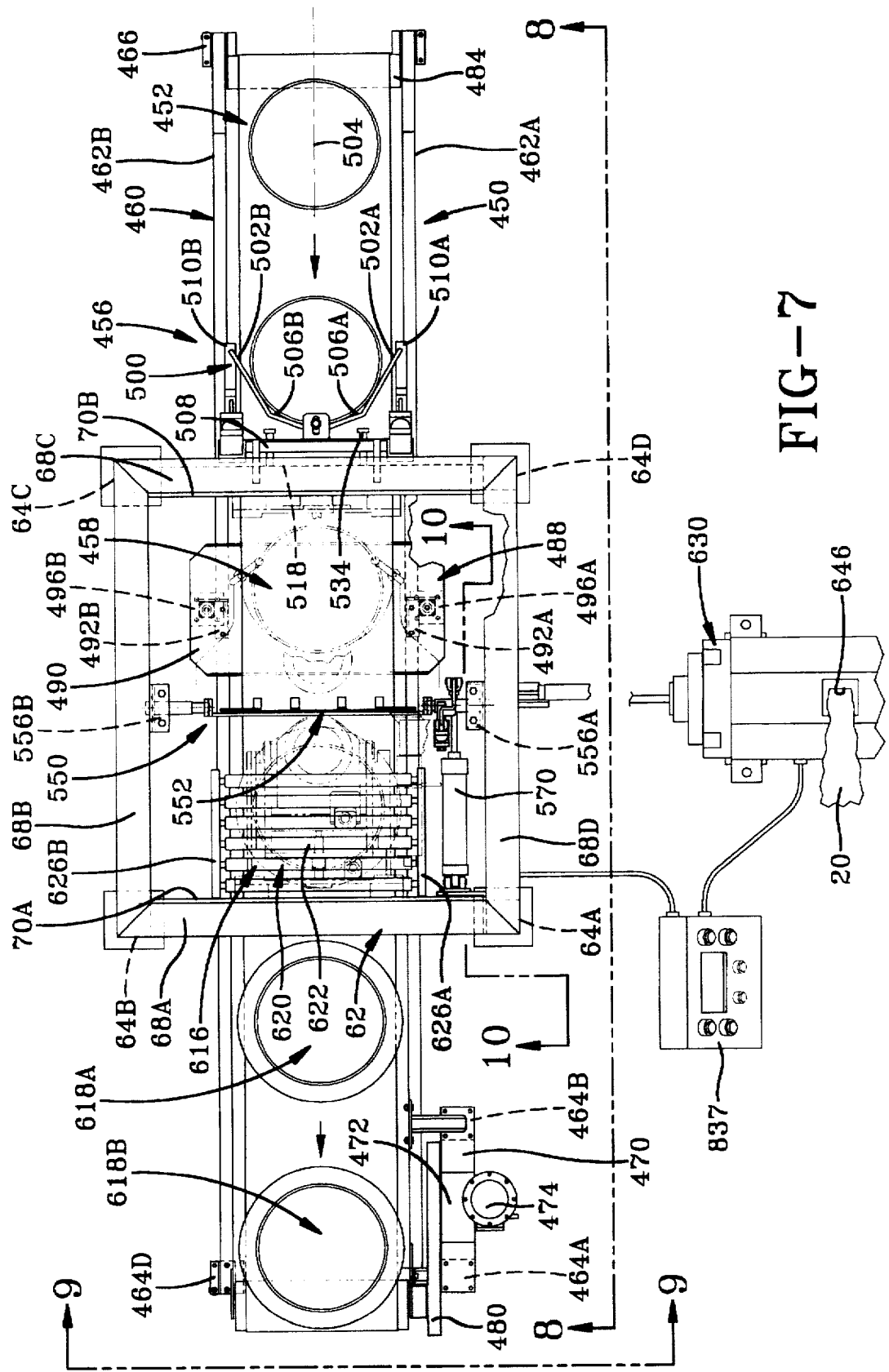
FIG. 7 is a top plan view, similar to FIG. 5, of the overall apex filler applying assembly, but in greater structural detail than presented in FIG. 5.

With more specific reference to FIGS. 7–9, the apex filler applicator 50 is carried by a main frame 62 that, as shown, may utilize four vertical support posts 64A through 64D that preferably extend upwardly from fixed positions on a floor 66. The tops of the support posts 64 are preferably interconnected by structural rails 68A through 68D that extend, respectively, between the posts 64A–64B, 64B–64C, 64C–64D and 64D–64A.

As previewed in the previous paragraph, a particular structural member, component or structural arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, more than one identical support posts have been referenced. Support posts are generally identified by the numeral 64, but the specific, individual support posts are identified as support posts 64A, 64B, etc. in the specification and on the drawings. This suffix convention shall also be employed throughout the specification.

A number of additional structural members may be desirably incorporated in the main frame 62, but in order to minimize clutter and to simplify the drawings not every geometric relationship between each structural member employed to support an operating member and the main frame 62 will be depicted on the drawings. In those instances, therefore, where it is necessary to attach an operating member to an immovable member that may be a part of the frame 62, but when the specific geometric relationship between that structural member and the frame 62 is immaterial to the overall operation of the invention, it will be simply noted that the operating member is "grounded" to a structural member that is identified simply as the frame 62.

A first main support beam 70A extends between vertical posts 64A and 64B, and a second main support beam 70B extends between vertical posts 64C and 64D in parallel, laterally spaced, relation to the first main support beam 70A.

Figures 10, 10A:
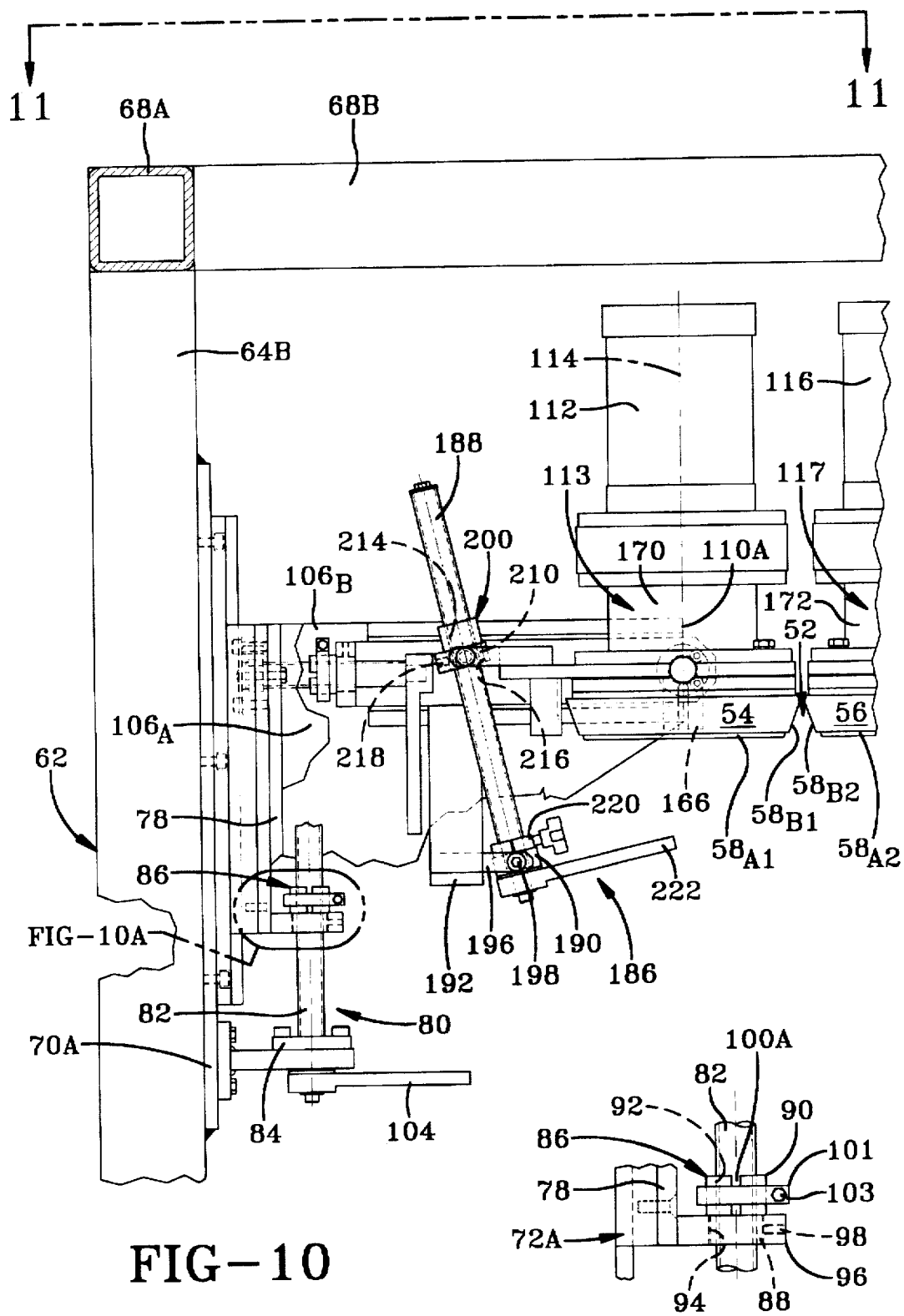
FIG. 10 is an enlarged area of FIG. 8 detailing the mechanism by which either of the apply rollers may be individually adjusted not only vertically and horizontally but also rotatably about a horizontal axis that parallels the longitudinal axis along which the bead ring is aligned for the application of an apex filler thereto.
FIG. 10A is an enlarged area of FIG. 10 depicting the locking portion of the adjusting mechanism in side elevation, the area being designated by the chain-line circle in FIG. 10, said chain-line circle being specifically marked as "FIG. 10A;"

As best seen in FIGS. 10, and 11, a pair of parallel, laterally spaced track members 72A and 72B are mounted in substantially vertical orientation on main support beam 70A. Identical, laterally spaced track members (not shown) may also be mounted on main support beam 70B. A carriage 74 is movably mounted on each track member 72, as along the double-V guide 76. A connecting plate 78 is secured between, and joins, the laterally spaced carriages 74A and 74B, and an adjusting mechanism 80 (as best represented in FIGS. 10A and 11A) is provided to select the vertical disposition of the carriages 74 with respect to the main support beams 70. Such an adjusting mechanism 80 may be in the nature of a threaded shaft 82 that extends through a thrust bearing 84 that is fixedly secured to the main frame 62 of the apex filler assembly 10—such as to the main support beam 70, as depicted. In addition to the thrust bearing, the shaft 82 also threadably engages a stepped lock nut 86 that is mounted on the transverse connecting plate 78.

The lock nut 86 has a mounting portion 88 of greater exterior diameter than the locking portion 90, but the bore 92 extending through the stepped lock nut 86 is of a single diameter and is threaded meshingly to engage the shaft 82. The mounting portion 88 is secured within a bore 94 that extends through a flange 96 that is affixed to, and extends outwardly from, the transverse connecting plate 78. A set screw 98 may extend transversely through the flange 96 to engage the mounting portion 88 of the stepped lock nut 86 received within the bore 94 and thereby secure the stepped lock nut 86 in fixed position with respect to the transverse connecting plate 84.

The locking portion 90 of the stepped lock nut 86 is not only of lesser diameter than the mounting portion 88, but the locking portion may also be provided with opposed longitudinally oriented slits, as at 100A and 100B, to permit the locking portion 90 to dose upon the shaft 82 that threadably engages the bore 92 which extends through the stepped lock nut 86 in response to the tightening of an adjustable damping collar 101 which surrounds the outer end of the locking portion 90. The clamping collar 101 may itself be split to allow adjusting nut 102 to be tightened, or loosened, onto locking bolt 103 in order to force the locking portion 90 into locking, or rotatable, engagement with the shaft 82. Rotation of the threaded shaft 82, as by the ratchet arm 104, when the adjusting nut 102 is loosened is employed to effect simultaneous vertical adjustment of the carriages 74A and 74B along the tracks 72A and 72B.

A haunched bracket 106 (FIG. 11) is affixed to each carriage 74 and is cantilevered outwardly therefrom such that the brackets 106A and 106B extend outwardly from the laterally spaced carriages 74A and 74B, respectively, and are disposed in parallel relation to each other and in opposition to a corresponding pair of brackets 106C and 106D that extend outwardly from the substantially identical, laterally spaced carriages supported from the main support beam 70B.

The applying rollers 54 and 56, and the means by which they are powered, are mounted for the desired articulation on the end portions of the parallel brackets 106 in proximity to the apices 110 thereof. That is, the first applying roller 54, the motor 112 and speed reducer 113 by which the roller 54 is selectively driven about its axis of rotation 114, are carried on the apices 110A and 110B of the parallel, haunched brackets 106A and 106B. Likewise, the second applying roller 56, the motor 116 and the speed reducer 117 by which roller 56 is selectively driven about its axis of rotation 118, are carried on the apices 110C and 110D of the parallel, haunched brackets 106C and 106D.

Guide plates 120 are mounted in opposition on the facing surfaces 122 of the haunched brackets 106. That is, a guide plate 120A may be attached, as by machine screws 124, to the surface 122A of bracket 106A. Guide plate 120B may be similarly secured to the surface 122B of the bracket 106B by screws 124. Similar guide plates 120 may be utilized in conjunction with haunched brackets 106C and 106D. Each guide plate 120 may be provided with a raised double-V guide 126 adapted to engage the longitudinally extending double-V recess 128 within a gib plate 130 that is slidably received along each guide 126.

The side plates 132 of a generally U-shaped mounting bracket 134 are, in turn, affixed to the gib plates 130. As depicted, the side plates 132A and 132B of mounting bracket 134A are secured to the gib plates 130A and 130B, as by machine screws 136. Likewise, a U-shaped mounting bracket (not detailed) may be similarly supported from the haunched brackets 106C and 106D.

The base plate 138 of the U-shaped mounting bracket 134A is connected to, as by machine screws 140, and extends transversely between the respective inboard end portions 142A and 142B of each side plate 132A and 132B. An adjusting mechanism 144 interacts with the base plate 138 to effect the desired horizontal disposition of the U-shaped mounting bracket 134. The adjusting mechanism 144 may be in the nature of a threaded shaft 146 that extends through a thrust bearing 148 fixedly positioned on the connecting plate 78. In addition to engaging the thrust bearing, the shaft 146 also threadably engages a stepped lock nut 150 that is virtually identical in both construction and operation with stepped lock nut 86. As such, neither the description nor the operation of the adjusting mechanism 144 need be reiterated.

Rotation of the threaded shaft 146, as by the ratchet arm 164, is employed to effect horizontal adjustment of the U-shaped mounting bracket 134, but only when the stepped lock nut 150 is loosened. Otherwise, the horizontal position of the U-shaped mounting bracket 134 is fixed.

The applying rollers 54 and 56 may be directly connected to the drive shafts 166 and 168 emanating from the respective speed reducers 113 and 117, and the housings 170 and 172 of the respective motors 112 and 116 are pivotally supported from the outboard end portions 174 of the side plates 132 in the U-shaped bracket 134. Specifically, the housings 170 and 172 are each secured to a yoke 176 that presents a trunnion bearing 178. Each trunnion bearing 178 rotatably receives a trunnion pin 180 that extends through the end portion 174 of each side plate 132.

Adjusting mechanisms 186 (also best seen in FIG. 10) are provided to select the tilted disposition of the individual yokes 176, and thus the individual tilted disposition of the applying rollers 54 and 56. Each adjusting mechanism 186 may be in the nature of a threaded shaft 188 that extends through a thrust bearing 190 that is mounted from the U-shaped bracket 134. Specifically, a stirrup 192 is fastened to the side plate 132A, as by machine screws 194, to depend downwardly from the U-shaped bracket 134 and present a clevis 196 which rotatably receives the gudgeon pins 198 that extend diametrically outwardly from the thrust bearing 190. In addition to the thrust bearing 190, the shaft 188 also threadably engages a stepped reaction nut 200 that is mounted on a clevis 202 presented from a pedestal 204 which is secured to, and extends upwardly from, the yoke 176. As depicted, the reaction nut 200 is preferably mounted on a swing plate 206 that itself presents gudgeon pins 208 that are rotatably received within the clevis 202. The stepped reaction nut 200 may have a mounting portion 210 of lesser exterior diameter than the remainder of the reaction nut 200, but the bore 214 that extends through the stepped reaction nut 200 is of a single diameter and is threaded meshingly to engage the shaft 188. The mounting portion 210 is secured within a bore 216 that extends through the swing plate 206 mounted on the clevis 202 of the pedestal 204. To secure the mounting portion 210 within the bore 216, the engaging surfaces may either be threaded or a set screw (not shown) may extend transversely through the swing plate 206 to engage the mounting portion 210 of the stepped reaction nut 200. Either approach secures the stepped reaction nut 200 in fixed position with respect to the yoke 176.

A threaded locking collar 220 that is axially split along its circumference is also received on the shaft 188 in contiguous juxtaposition to the thrust bearing 190 to permit the collar 220 to close upon, and lock, the shaft 188 against rotation. When the collar 220 is loosened, rotation of the threaded shaft 188, as by the ratchet arm 222, is employed to effect tilting adjustment of the yoke 176, and thus the tilted disposition of the applying rollers 54 and 56.

As will become apparent, the cross sectional configuration of the nip 52 defined between the adjacent, and composite, frusto-conical surfaces $58_A$ and $58_B$ of the applying rollers 54 and 56 is virtually identical with the cross sectional shape of the apex filler 14 to be applied to the bead ring 12 received within the nip 52. As shown, first portions $58_{A1}$ and $58_{A2}$ of the frusto-conical outer surface 58 on each respective roller 54 and 56 may serve grippingly to engage the radially outer corners 224A and 224B (FIGS. 2 or 3) of the annular bead ring 12 and second portions $58_{B1}$ and $58_{B2}$ of the frusto-conical outer surface 58 on each respective roller 54 and 56 may serve not only to grip but also workingly to form and apply the apex filler 14, as will be hereinafter more fully described.

With respect, first, to surface portion $58_A$ on each of the rollers 54 and 56, it should be appreciated that whereas the representative bead ring 12 is depicted as being rectilinear, it could, as well, have another geometric cross section—i.e.: hexagonal, octagonal or even circular, to mention a few. The point is that the surface portions $58_{A1}$ and $58_{A2}$ of the opposed rollers 54 and 56 should have whatever configuration is necessary to effect the necessary driving engagement with the flanks of the bead ring 12—those flanks being the corners 224A and 224B in the rectilinear configuration depicted.

In any event, the use of the compound, frusto-conical portions $58_A$ and $58_B$ on the opposed rollers 54 and 56 readily provides such cross sectional configurations for the tire bead sub-assemblies 16 and $16_A$ depicted in FIGS. 1 and 2, respectively. It should be appreciated, however, that the present invention is fully capable of producing apex fillers 14 having a wide variety of cross sectional configurations. To that end it must be understood that the opposed applying rollers 54 and 56 need not form the nip 52 with only conical surfaces. The nip 52 may, for example, be formed by oppositely disposed, curving surfaces, one of which may be convex and the other of which may be concave. Irrespective of the shape employed to define the nip, the opposing surfaces must be configured to provide corresponding points on each which are the same distance from the respective axes 114 and 118 about which the applying rollers presenting those opposed points rotate. As a result, contact of the rollers with the apex filler being formed will be linear. That is, the speed of the nip surface at any point on one forming roller will be exactly equal to the speed of the corresponding point on the opposed roller so that the material between those points is not subjected to working transversely of the nip 52, and yet each successive point along the radius of each roller 54 and 56 moves at a progressively increasing rate radially outwardly of the forming rollers. In this manner substantially stress free differential elongation is maintained as the elastomeric material is formed into an apex filler of the desired cross sectional configuration.

The applying rollers 54 and 56 are preferably treated, or coated, with a release agent material to eliminate sticking of the uncured elastomeric strip 20 from which the apex filler 14 is fabricated to the applying rollers 54 and 56 in conjunction with application of the apex filler 14 to the bead ring 12. While a plurality of such materials are known, including fluorocarbon coatings, silicone coatings and tapes, Teflon® tapes and sleeves, and chrome plating, one particularly useful coating comprises a nickel-chromium matrix within a polymer base, applied via plasma coating. Suitable coating materials of this nature are available from Plasma Coatings, Inc., of Waterbury, Conn., as their 700 Series Release/Traction Coatings. While the exact composition is proprietary, properties of the coatings include thermal and electrical conductivity, a low coefficient of friction and excellent abrasion resistance and moderate corrosion resistance. The coatings can also withstand constant service temperatures of 400° F.

An adequate coating thickness is on the order of about 0.006 to 0.008 inch, although thickness is not a limitation of the present invention. As depicted in the drawings, the coating 226 (best seen in FIG. 13A) does not completely cover the entire frusto-conical surface 58 or 60 of the two forming rollers 54 and 56 inasmuch as it is not desirable to employ the coating over that portion of the frusto-conical surfaces that engages the bead ring 12 or that portion of either roller that contacts the opposing roller. Typically, release properties are not necessary in the area of contact with the bead ring 12 and, most coatings would be worn away due to the nearly continuous engagement of the bead rings 12 between the opposed forming rollers. It is to be understood that the foregoing description is meant to provide an enabling but non-limiting disclosure of suitable coatings. As will be apparent to those of ordinary skill in the art, substantially any release coating material can be selected, recognizing that the coating should not itself release onto or impart any foreign material to the apex which might deleteriously affect the tire. Additionally, one should not select a coating material that can be solubilized by the rubber strip with which it contacts.

Chuck Assembly

With reference to FIGS. 9 and 12-17, the chuck heads 252 of the chuck turret assembly 250 are carried in diametral opposition radially outwardly of the rotational axis 254 of the chuck turret assembly 250 on turret arm 256. The turret arm 256 is secured to a drive shaft 258 that is rotatable about axis 254 by a power supply that is preferably in the form of a cam indexing unit 260 which is supported on a structural shelf 262 that may be presented from support posts 64A and 64B or otherwise grounded to the frame 62. A cam indexing unit 260 imparts a profiled indexing movement to the turret arm 256. Specifically, the profiled indexing movement provided by the cam indexing unit 260 would consist of: an acceleration portion; a constant velocity portion; and, a deceleration portion.

Figure 12:
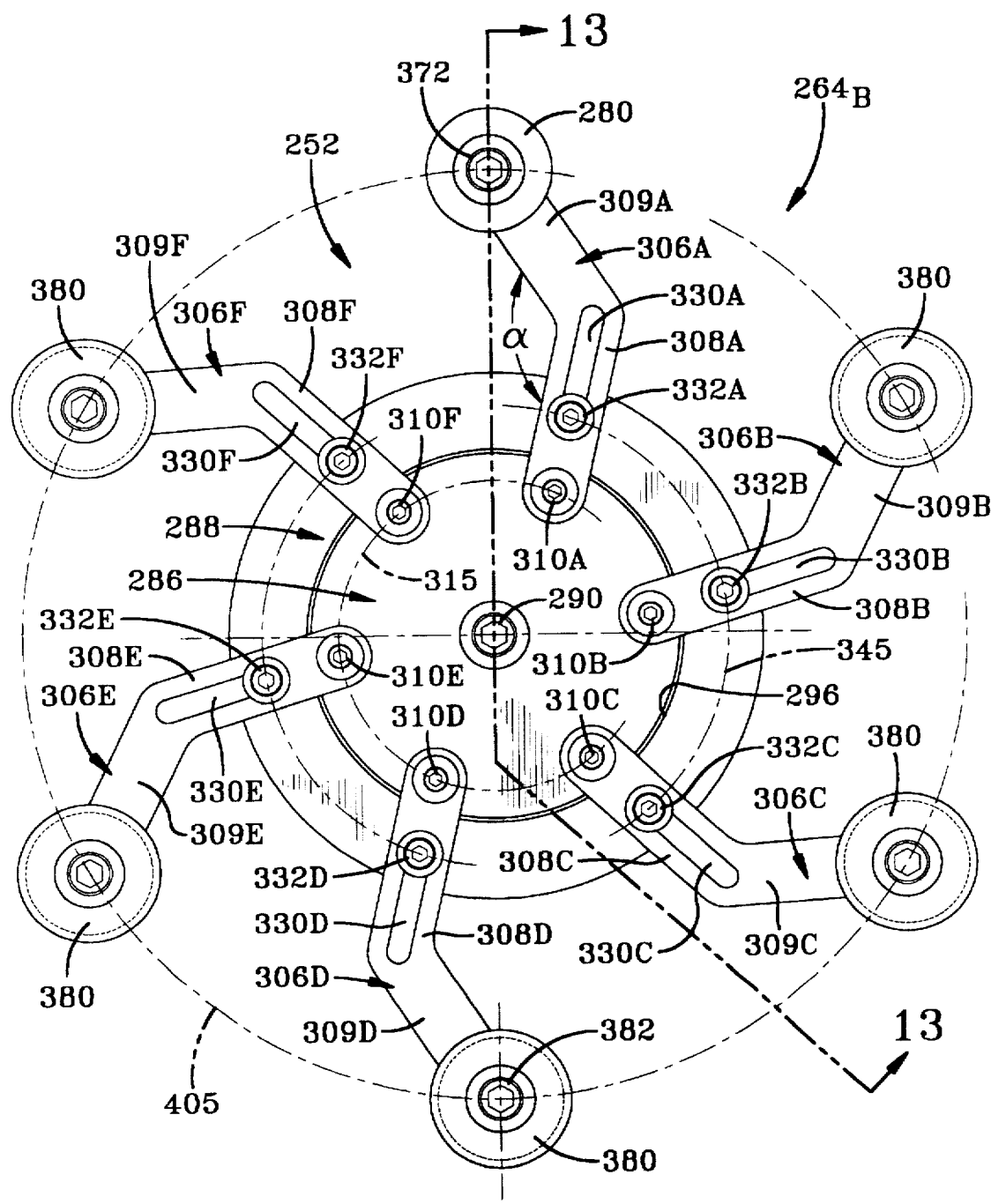
FIG. 12 is a frontal elevation of one chuck head in the chuck turret assembly.
Figures 13, 13A, 13B:
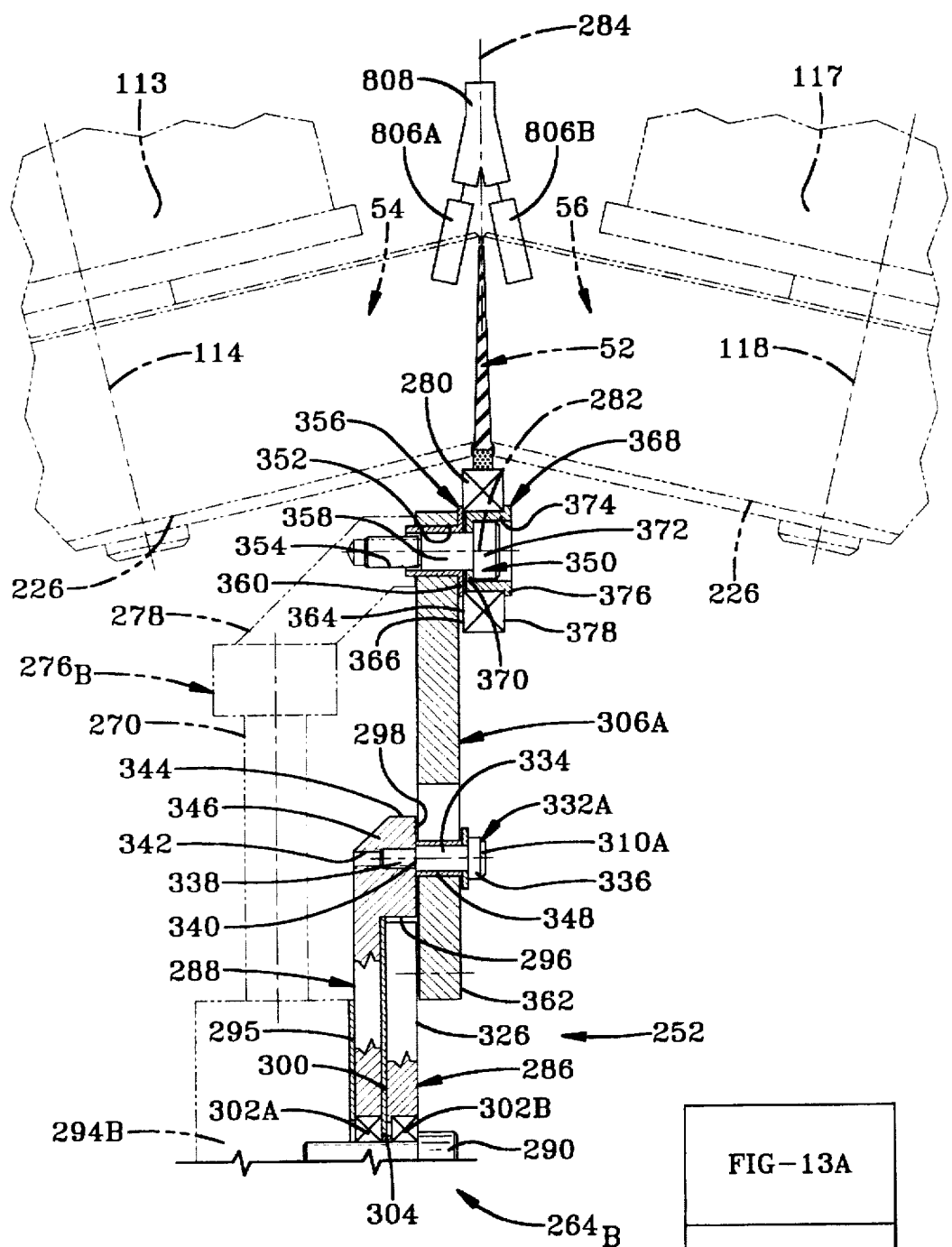
FIGS. 13A and 13B are generally vertical sections taken substantially along line 13—13 of FIG. 12 to depict the structural components of the chuck head—some of which are at least partly broken away to reveal their interconnection—as well as the usage of the chuck head to position an annular bead ring within the nip of the opposed apply rollers, which are depicted in chain line, said FIGS. 13A and 13B constituting split portions of the overall chuck head and being presented as represented in the box diagram captioned FIG. 13 and appearing on the same sheet of drawings as FIG. 13A.
Figure 13B:
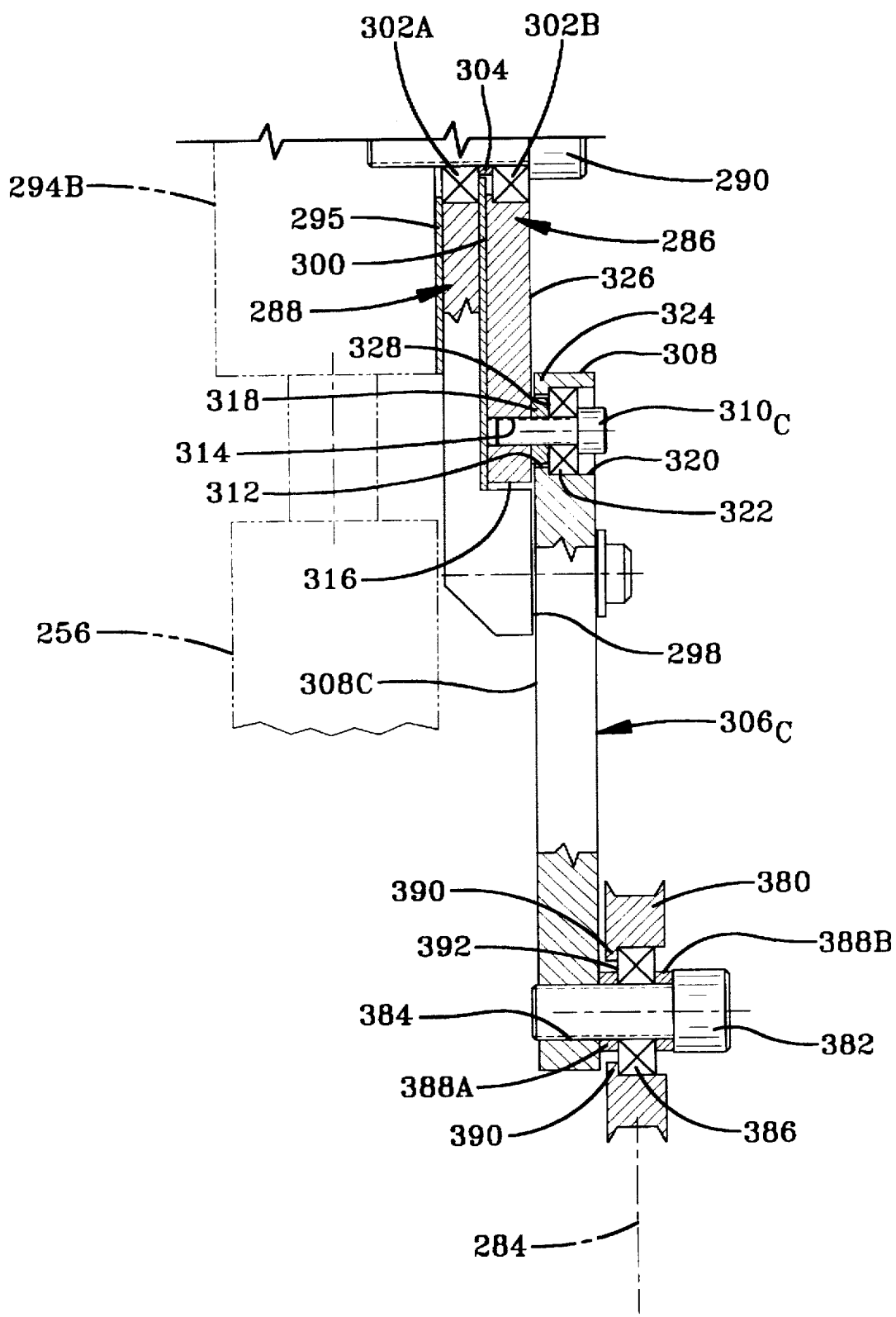

The semi-circular, rotational indexing movement of the turret arm 256 by the drive shaft 258 effects overall, sequential indexing of the chuck heads 252 between two diametral positions—i.e.: a chuck head loading/unloading position 264$_A$ (FIGS. 14–17) and a chuck head application position 26% (FIGS. 12 and 13). As best presented in FIG. 9, when either chuck head 252 is disposed to receive an annular bead ring 12 from the hereinafter defined transfer device 550 that chuck head 252 is at the loading/unloading position 264$_A$. Conversely, when either chuck head 252 has been swung to position a bead ring in the nip 52 of the apex filler applicator 50 that chuck head 252 is at application position 264$_B$. In order to present the disclosure of the apex filler applying assembly 10 in an orderly fashion the chuck turret assembly 250 will now be described in detail.

The turret arm 256 extends transversely outwardly from the drive shaft 258, and the central, hub portion 266 of the turret arm 256 is secured to the shaft 258, as by nut and bolt combinations 268. A set of parallel guide shafts 270 are mounted in each oppositely directed end of the radially outwardly extending turret arm 256. That is, a pair of parallel guide shafts 270A and 270B extend outwardly from one end of the turret arm 256, and an opposed pair of parallel guide shafts 270 (not detailed) extend outwardly from the opposite end of the turret arm 256. The opposite ends of the turret arm 256 may be split, as at 272, to facilitate insertion of the guides shafts 270, and a plurality of transverse nut and bolt combinations 274 may be employed to tighten the turret arm 256 onto the guide shafts 270.

An end fitting 276A is mounted at, and extends between, the outer end portion of the parallel guide shafts 270A and 270B extending outwardly from one end of the turret arm 256, and a similar end fitting 276B is mounted on, and extends between, the outer end portion of the oppositely-extending, parallel guide shafts 270 (not detailed) extending outwardly from the opposite end of the turret arm 256. An offset arm 278 is mounted on the medial portion of each end fitting 276, and each offset arm 278 locates a roller 280 adapted to engage and contribute to the support of a bead ring 12. As will be hereinafter more fully explained, the roller 280 located by the offset arm 278 may freely rotate about its own axis 282, but it is restrained from translation within the plane 284 of the roller 280 and the hereinafter described pulleys 380.

Each chuck head 252 incorporates a pair of relatively rotatable disk members 286 and 288 (FIG. 12) that are mounted on a cap screw 290 which extends axially through the disk members 286 and 288 to be threadably attached within a bore 292 in a drive block 294 that is, in turn, mounted on one set of the parallel guide shafts 270 for longitudinal translation therealong. A low friction bearing plate 295 is preferably interposed between the drive block 294 and the rimmed disk member 288. As such, there are two drive blocks 294A and 294B in the chuck turret assembly 250 depicted. One drive block 294A is mounted on guide shafts 270A and 270B, and the other drive block 294B is mounted on the oppositely extending guide shafts 270 (not detailed).

The central disk member 286 in each chuck head 252 is received within a cylindrical cavity 296 recessed into the outer face 298 of the rimmed disk member 288. In the representative chuck turret assembly 250 depicted (and as best seen in FIGS. 13A and 13B), the central disk member 286 may well be on the order of about six (6) inches in diameter. A low friction bearing plate 300 is interposed between the cavity 296 in the rimmed disk member 288 and the central disk member 286. A pair of annular bearing members 302A and 302B surround the cap screw 290 and are separated by an annular spacing ring 304 which disposes the bearing members 302A and 302B in the planes of the respective disk members 286 and 288 to enhance the relative rotation thereof.

As best seen in FIG. 12, each chuck head 252 employs a plurality of drive arms 306—each drive arm 306 having a radially inner dog-leg portion 308 and radially outer dog-leg portion 309. The dog leg portions 308 and 309 preferably diverge at an angle α which, for the representative chuck head 252 depicted, may well fall within the range of from about one hundred thirty to about one hundred thirty-five degrees (130°–135°). The radially inner dog-leg portion 308 of each drive arm 292 is pivotally connected to the central disk 286, as by a cap screw 310. The cap screw 310 extends through an oversized bore 312 (FIG. 13B) located at the radially inner end of the inner dog-leg portion 308 of the drive arm 306 to be threadably received within a threaded bore 314 spaced radially inwardly from the radially outer edge 316 of the central disk 286. In the representative chuck turret assembly 250 depicted, the threaded bores 314 may be disposed in a bolt circle 315 (FIG. 12) having a diameter of approximately five (5) inches. A spacing washer 318 is received within the oversized bore 312, and the axially outer end of the bore 312 is circumscribed by a countersunk recess 320 that receives a bearing 322. Thus, when each individual cap screw 310 is tightened, it will position the bearing 322 in proximity to the shelf 324 formed at the intersection of the bore 312 and the countersunk recess 320. The spacing washer 318 will engage the outer surface 326 of the central disk 286 as well as the opposed, underside 328 of the bearing 322 and secure the location of the bearing 322. As such, the bearing 322 on each cap screw 310 provides a fulcrum about which the drive arm 306 will pivot in response to relative rotation between the central disk 286 and the rimmed disk 288, as will also be hereinafter more fully explained.

The inner dog-leg portion 308 of each drive arm 306 has a longitudinally extending slot 330 which, in the representative chuck head 252 depicted, may well be on the order of about three (3) inches in length. A stepped cap screw 332 has a preferably smooth, cylindrical tang portion 334 that extends between the head portion 336 and the threaded shank portion 338. The threaded shank portion 338 is of relatively lesser diameter than the smooth tang portion 334, and the relative diameters delineate a shoulder 340 which is adapted to engage the outer surface 298 on the rimmed disk member 288 when the shank portion 338 of the stepped cap screw 332 is threadably secured within a bore 342 spaced radially inwardly from the radially outer edge 344 on the rim portion 346 of the rimmed disk member 288. In the representative embodiment of the chuck turret assembly 250 depicted, the bores 342 are disposed along a bolt circle 345 having a diameter of approximately seven and one-half (7½) inches. An annular sleeve bearing 348 circumscribes the smooth tang portion 334 of the stepped cap screw 332 to facilitate relative translational movement between the slot 330 and the tang portion 334 of the stepped cap screw 332.

The outer dog-leg portion 309A of drive arm 306A cooperatively interacts with the offset arm 278 by virtue of the means (depicted in FIG. 13A) employed to mount the roller 280 on both the drive arm 306A and the offset arm 278. That is, the roller 280 is rotatably mounted on a stepped cap screw 350 which extends through a bore 352 in the radially outer end portion of the outer dog-leg portion 309A of drive arm 306A to be received in, and be secured to, the threaded bore 354 in the offset arm 278 which extends both radially and axially outwardly from the end fitting 276. A flanged sleeve bearing 356 is interposed between the smooth cylindrical tang portion 358 of the stepped cap screw 350 and the bore 352 of drive arm 306A. The radially extending flange portion 360 of sleeve bearing 356 engages the outer surface 362 of the drive arm 306A as well as the radially inner edge portion 364 on the under side 366 of the roller 280 in order precisely to locate the roller 280 in the desired plane 284. A bearing mount 368 having a Z-shaped cross section presents a first flange 370 that extends under the head 372 of the stepped cap screw 350, a cylindrical portion 374 that circumscribes the head portion 372 and a second flange 376 that extends radially outwardly to engage the upper side 378 of the roller 280 and thereby capture the roller 280 when the stepped cap screw 350 is tightened to the position described.

The remaining drive arms 306B through 306F present rotatably mounted support pulleys 380 that are disposed in the same plane 284 as the roller 280. Each pulley 380 is mounted on a cap screw 382 that meshingly engages a threaded bore 384 in the radially outer end of the outer dog-leg portion 309 of the drive arms 306B through 306F. Each pulley 380 rotates on a bearing 386 that is axially located along the cap screw 382 by annular spacers 388A and 388B, one on either side of the bearing 386. The pulley 380 itself has a radially inwardly directed flange 390 which engages the under side 392 of the bearing 386 in order to secure each pulley 380 within the plane 284 of the roller 280.

In order to facilitate ease of loading a bead ring 12 onto the chuck heads 252 and the respective unloading of a completed tire bead sub-assembly 16 from the chuck heads 252, the support pulleys 380 presented from the radially outer ends of the drive arms 306B through 306F on each individual chuck head 252 are capable of being positioned simultaneously in a radial plane relative to the individual chuck heads 252. This positioning of the support pulleys 380 in a common plane is achieved in response to axial displacement of the drive block 294 associated with the specific chuck head 252 on which the support rollers 380 are carried. As such, the distance from the center of each support pulley 380 to the center of the chuck head 252 on which those support pulleys are carried is simultaneously adjusted in response to axial displacement of the drive block 294 associated with the chuck head 252 being adjusted.

The drive blocks 294A and 294B (FIG. 8) mounted in opposition on the guide shafts 270 may each be an integral unit provided with two longitudinally extending bores 394A and 394B (FIG. 17), each of which receives a corresponding sleeve bearing 396A and 396B to reduce friction between the drive block 294 and the guide shafts 270 in order to facilitate low friction displacement of the blocks 294 along their respective guide shafts 270.

The opposed ends 398 on the axially spaced drive blocks 294A and 294B, respectively, are bored and tapped threadably to receive a clevis 400 (FIGS. 14 and 17) adapted to engage the end connectors 402 of a tension spring 404 that extends between the spaced drive blocks 294 in order to bias each toward the other. To accommodate the spring 404, the turret arm 256 is preferably hollow. One face 406 of each drive block 294 is bored, as at 408, to receive a mounting pin 410 upon which an adjustable return block 412 may be supported for selective pivotal movement. As shown, the mounting pin 410 may be a cap screw. The return block 412 may present a plurality of engaging surfaces such as the engaging surfaces 414A through 414E (FIG. 16) which may be selectively positioned on the drive block 294 so that each can, selectively, be disposed in opposition to a piston head 416 that is selectively extended from a cylinder 418 that may be mounted on the underside of the structural shelf 262 that supports the power supply 260.

Although the return block 412 may be swung to the selected position on the mounting pin 410, the selected disposition of the return block 412 may be secured by a locking pin 420 that extends through a positioning bore 422 in the return block 412 to be received in one of the several locking bores 424 (of a number equal to the number of engaging surfaces 414) on the drive block 294 that are drilled at appropriate circumferentially spaced locations about a bolt ring 426 that circumscribes the bore 408 in which the mounting pin 410 is received. A bearing plate 428 may be secured to the face 406 of the drive block 294, as by screws 430. The bearing plate 428 spaces the return block 412 in an appropriate distance outwardly from the face 406 of the drive block 294, and the bearing plate 428 also provides a stable base against which the return block 412 can be secured when rotated to its selected position.

In order to provide a means by which to limit the extent to which the return block 412 can move toward the piston 416, a stop flange 432 (FIGS. 14A and 14B) may be mounted on the end portion of the turret arm 256. The stop flange 432 is directed toward the return block 412 in order for the stop flange 32 to contact the selected engaging surface 414 when the drive block 294 is displaced by the biasing action of the tension spring 404 to the extent desired.

As will become apparent from the operational description of the chuck turret assembly 250 which follows, the biasing action of the tension spring 404 urges an expansion of the radial location of the pulleys 380 carried on the chuck heads 252. Conversely, the driving force applied by the piston head 416 forces the support pulleys 380 carried on the chuck head 252 associated with the drive block 294 being displaced by the piston 416 to contract. As should now be appreciated, only the chuck head 252 received in the loading/unloading position $264_A$ may be contracted, and even when the bolt circle 405 of the pulleys 380 on that chuck head 252 are being contracted, the spring 404 continues to maintain the bolt circle 405 of the pulleys 380 on the chuck head 252 at the application position 26% fully expanded against the bead ring 12 that is partially received within the nip 52.

Figure 14A:
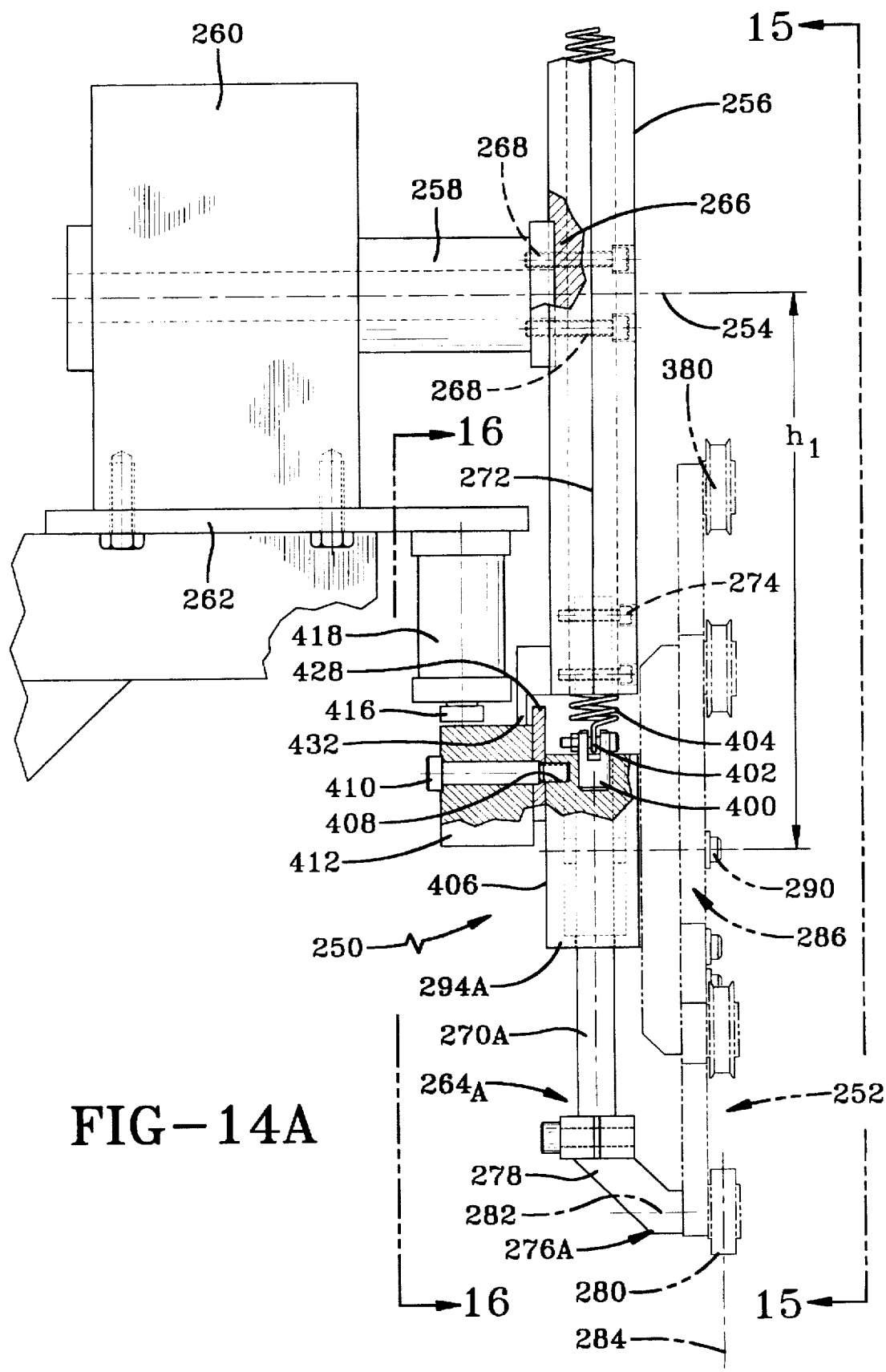
FIG. 14A is a side elevation, partly broken away, depicting a portion of the turret arm, the power source which rotates the turret arm and the mechanism by which the chuck head, represented in chain line, is selectively expanded and contracted—the mechanism being depicted to effect expansion of the chuck head.

Specifically, when the piston head 416 is retracted, the tension spring 404 causes that drive block 294 being disengaged by the piston head 416 to move radially inwardly with respect to the turret arm 256 and along the guide shafts 270 on which that drive block 294A and/or 294B is supported. With reference to FIG. 14A, as compared to FIG. 14B, when the tension spring 404 moves the drive block 294, for example, radially inwardly (the movement being reflected by the difference between the dimension $h_2$ and dimension $h_1$), the central disk member 286 is rotated counter-clockwise. This rotation of the central disk member 286 is effected because the stepped cap screw 350 by which the roller 280 secured to the outer end portion of the drive arm 306A is also secured to the fixed offset arm 278 presented from the end fitting 276 attached to the guide shafts 270. As such, the drive arm 306A will pivot about the fixed axis 282 of the roller 280 as the drive block 294 is displaced away from the end fitting 276. That pivotal movement of the inextendable drive arm 306A in response to the displacement of the central disk member 286 forces the central disk member 286 to rotate in a counter-clockwise direction in order to accommodate displacement of the drive block 294 and the central disk member 286 carried thereon. Because the stepped cap screw 332 connects the rimmed disk member 288 to the drive arm 306A through the interaction of the stepped cap screw 332 with the slot 330 in the drive arm 306& the rimmed disk member 288 will also rotate in a counter-clockwise direction, but to a lesser degree of angular displacement than that to which the central disk member 286 is subjected by the crank-arm action of the drive arm 306A.

The resulting relative rotational movement imposed on the central disk member 286 with respect to the rimmed disk member 288 will force each drive arm 306B through 306F—in response to the reaction of the slots 330B through 330F against the movement of the stepped cap screws 332B through 332F—to pivot about the cap screw 310B through 310F by which that drive arm is secured to the central disk member 286. The same relative counter-clockwise movement of the rimmed disk member 288 with respect to the central disk member 286 effects displacement of the pulleys 380 carried on the drive arms 306B through 306F to be displaced radially outwardly to bolt circles 405 of ever increasing diameter until the stop flange 432 engages the selected engaging surface 414 on the return block 412.

Figure 14B:
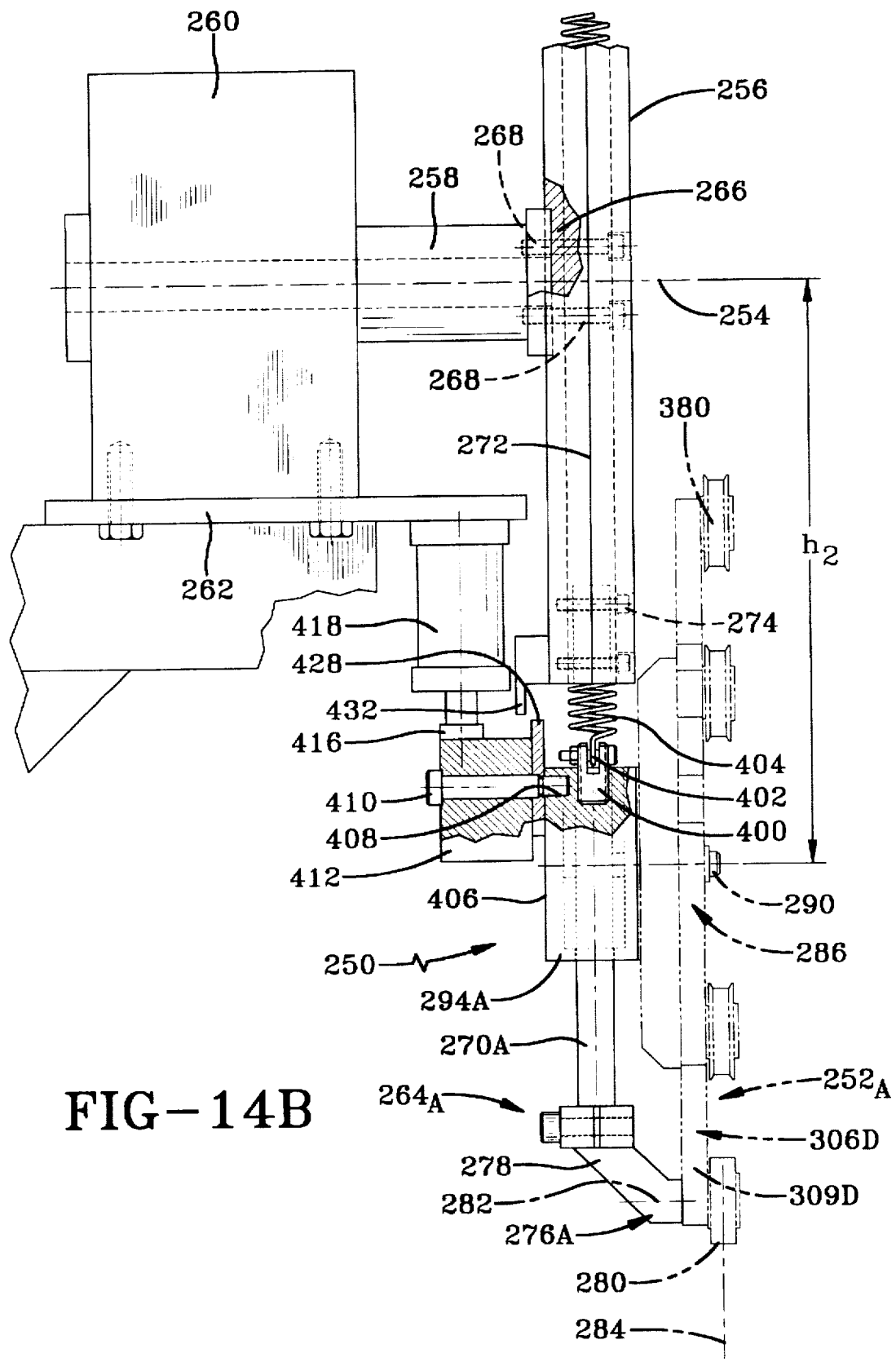
FIG. 14B is a partly broken away side elevation that is similar to FIG. 14A but depicting the mechanism by which the chuck head is selectively expanded and contracted having been actuated to effect contraction of the chuck head.
Figure 15:
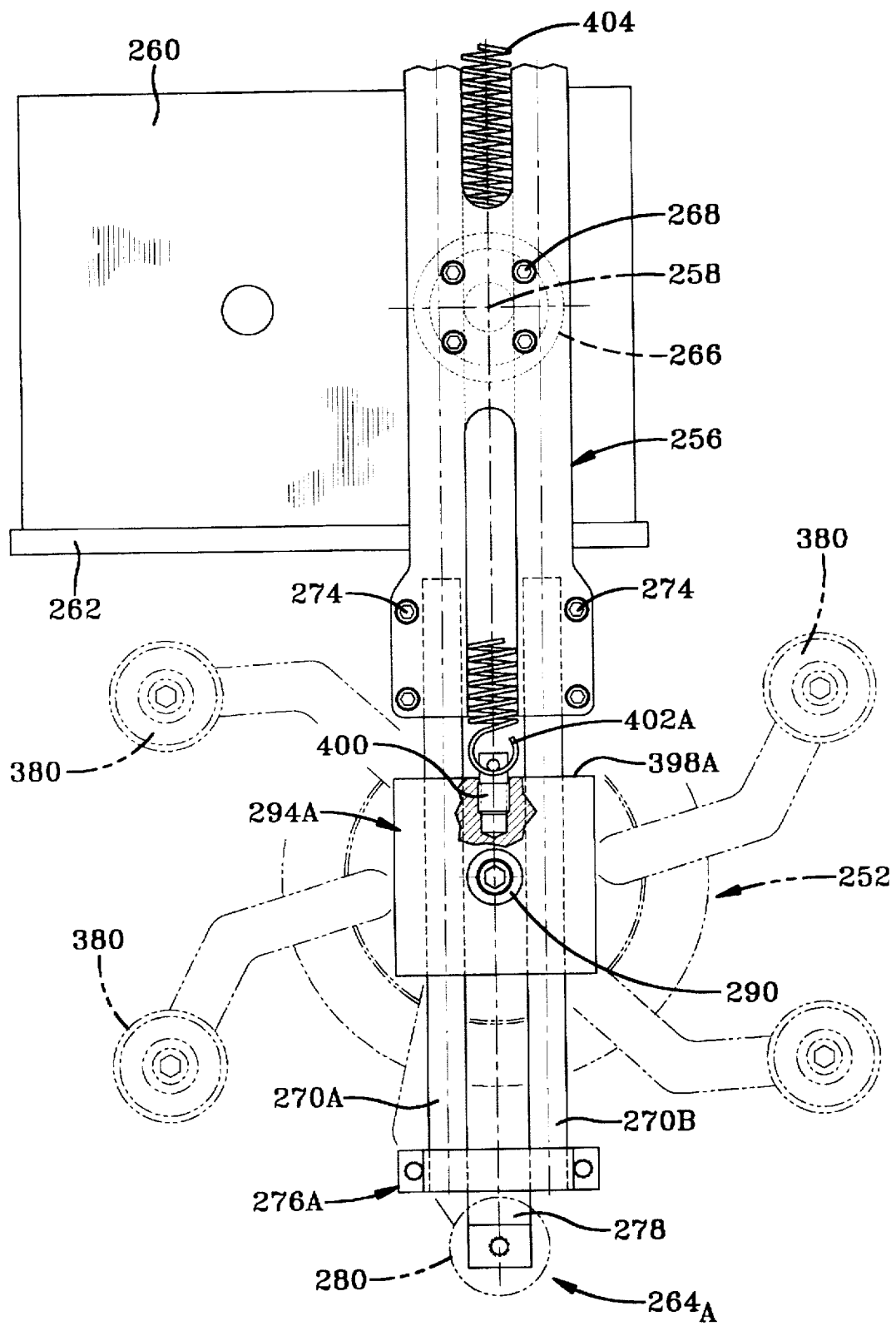
FIG. 15 is a frontal elevation taken substantially along line 15—15 of FIG. 14A.
Figure 18:
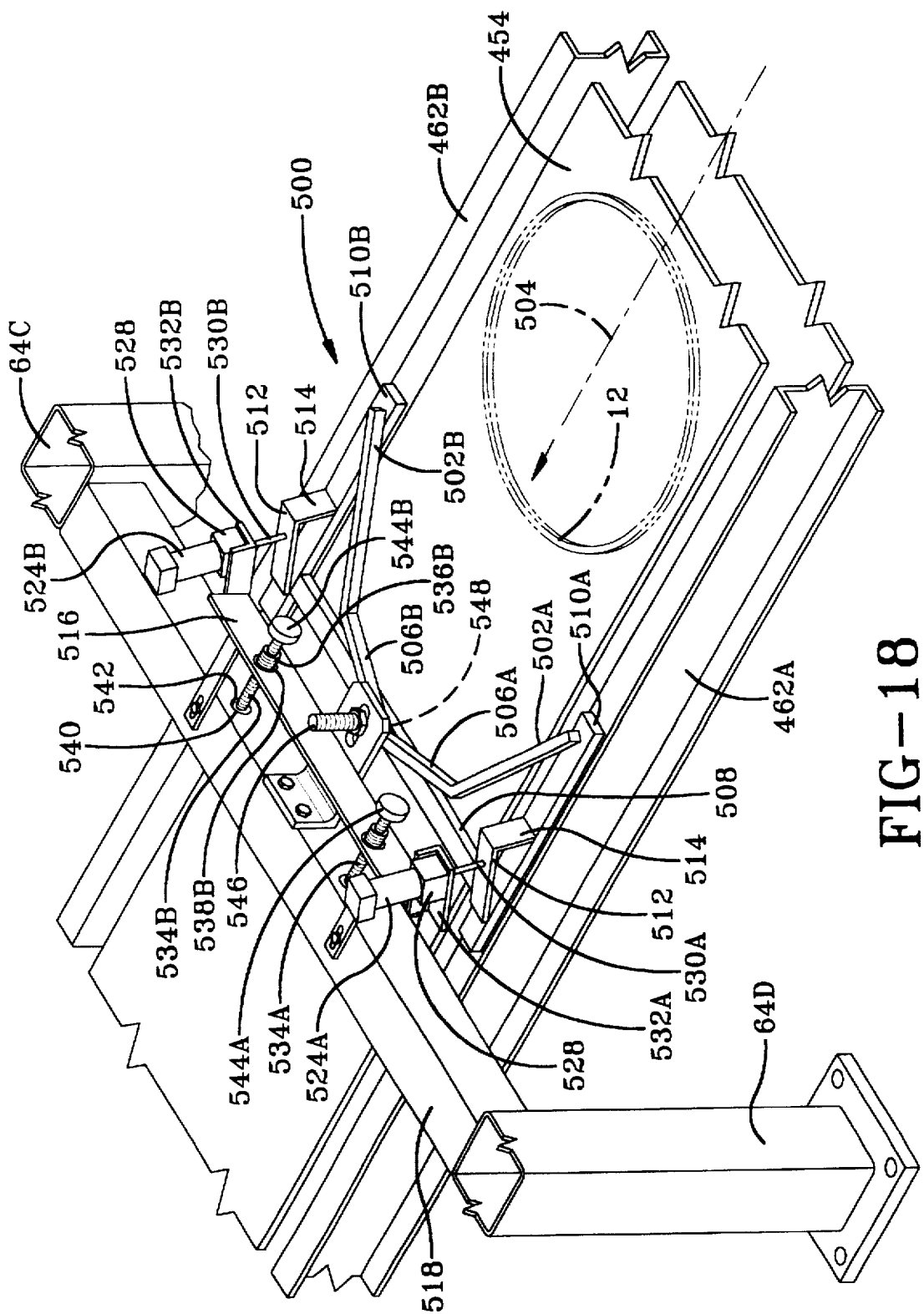
FIG. 18 is a perspective view of an exemplary locator mechanism, taken substantially along line 18—18 of FIG. 8.

In order to contract the bolt circle 405 along which the pulleys 380 for either chuck head 252A or 252B are disposed, the piston head 416 is extended to contact the selected engaging surface 414 and displace the drive block 294A or 294B radially outwardly with respect to the turret arm 256 and along the guide shafts 270 on which the drive block 294A and/or 294B is supported. With reference to FIG. 14B, when the piston 416 moves the drive block 294, for example, radially outwardly, the central disk member 286 is rotated clockwise.

This rotation of the central disk member 286 is effected because the stepped cap screw 350 by which the roller 280 secured to the outer end portion of the drive arm 306A is also secured to the fixed offset arm 278 presented from the end fitting 276 attached to the guide shafts 270. As such, the drive arm 306A will pivot about the fixed axis 282 of the roller 280 as the drive block 294 is displaced toward the end fitting 276. That pivotal movement of the inextendable dog-leg drive arm 306A in response to the displacement of the drive block 294 forces the central disk member 286 to rotate in a clockwise direction in order to accommodate displacement of the drive block 294 and the central disk member 286 carried thereon.

Because the stepped cap screw 332 connects the rimmed disk member 288 to the drive arm 306A through the interaction of the stepped cap screw 332 with the slot 330 in the drive arm 306A, the rimmed disk member 288 will also rotate in a clockwise direction, but to a lesser degree of angular displacement than that to which the central disk member 286 is subjected by the crank-arm action of the drive arm 306A.

The resulting relative rotational movement imposed on the central disk member 286 with respect to the rimmed disk member 288 will force each dog-leg drive arm 306B through 306F—in response to the reaction of the slots 330B through 330F against the movement of the stepped cap screws 332B through 332F—to pivot about the cap screw 310B through 310F by which that drive arm is secured to the central disk member 286. The same relative clockwise movement of the rimmed disk member 288 with respect to the central disk member 286 effects displacement of the pulleys 380 carried on the drive arms 306B through 306F to be displaced radially inwardly to bolt circles 405 of ever decreasing diameter until the piston 416 has been fully extended.

In the representative embodiment of the chuck turret assembly 250 depicted, an axial displacement of the drive block 294 amounting to approximately two and one-half (2½) inches will permit the chuck heads 252 to accommodate bead rings 12 having internal diameters falling within the range of from about twelve (12) inches to about seventeen (17) inches. That is, each bolt circle 405 is capable of expanding to, and contracting from, diameters such as will provide the foregoing dimensions to the engaging portions of pulleys 380.

Conveyor

With general reference to FIG. 5, a conveyor system 450 is provided to receive an annular bead ring 12 at a receiving portion 452 (hereinafter sometimes designated as "Index Station No. 1") on the belt 454 such that when the belt 454 is indexed the aforesaid annular bead ring 12 is translated from Index Station No. 1 (receiving portion 452) to engage a locator mechanism 500 that is operatively associated with a locating portion 456 (hereinafter sometimes designated as "Index Station No. 2"). When the annular bead ring 12 has been transferred from Index Station No. 1 to Index Station No. 2, a successive bead ring 12 is deposited on the belt 454 at Index Station No. 1. During the next successive indexing of the belt 454 the annular bead ring 12 which had been at Index Station No. 2 is delivered to the pick-up/delivery portion 458 (hereinafter sometimes designated as "Index Station No. 3"). With that indexing movement of the belt 454, the annular bead ring 12 which had been at Index Station No. 1 is moved to Index Station No. 2, and the next successive annular bead ring 12 is deposited at Index Station No. 1. Although there are at least two additional indexing positions designated along the longitudinal extent of the uppermost, or operating, run of the belt 454, those will be briefly discussed after the basic structure of the conveyor system 450 has been described as well as after the structure of the locator mechanism 500 and at least the transfer mechanism 550 has been described.

With more specific reference to FIGS. 7–9, the conveyor system 450 is supported on a horizontal frame 460 that may employ laterally-spaced, longitudinally-extending, side members in the nature of channel irons 462A and 462B. The side members 462 may be supported from a plurality of downwardly extending legs such as the box members 464 depicted. The lower extremity of each box member may have a foot plate 466 attached thereto and from which a vertical adjusting pin 468 may extend downwardly to engage the floor 66.

A structural plate 470 may extend between legs 464A and 464B on one side of the frame 460 to support a cam indexing unit 472. The cam indexing unit 472 may be driven by a motor 474 that is depicted as extending upwardly therefrom. A power take-off wheel 476 is rotated by the cam indexing unit 472 to drive an input wheel 478, as by a power transfer member 480. In some installations the wheels 476 and 478 may be pulleys, in which situation the power transfer member could be a belt drive. However, in some installations the wheels may be sprockets, in which situation the power transfer member would likely be a chain drive. In either situation, the cam indexing unit 472 would impart a profiled indexing movement to the power take-off wheel 476. As previously explained in conjunction with the operation of the cam indexing unit 260, the profiled indexing movement would consist of: an acceleration portion; a constant velocity portion; and, a deceleration portion.

In either event the input wheel would selectively rotate a belt drive roll 482 about which the belt 454 is received. The belt drive roll 482 may be located at one end of the endless conveyor belt 454, and a return roll 484 may be located at the other end of the endless conveyor belt 454. For the present arrangement the belt 454 is preferably received on a planar support member 486 that provides minimal sliding resistance to the belt 454 as it slides longitudinally along the support member 486. As such, the support member 486 is preferably comprised of, or is coated with, a low friction material such as Teflon.

21

That portion on the upwardly directed surface of the belt 454 which moves toward the apex filler applicator 50 from the return roll 484 comprises the previously described receiving portion 452 (Index Station No. 1) that is adapted to receive an annular bead ring 12.

The conveyor 450 may also be provided with a lift displacement mechanism 488 in the nature of a table 490 that is located between the belt 454 and the planar support member 486. The table 490 is supported on a pair of force transfer plates 492A and 492B, each of which is attached to the outer end of a corresponding piston rod 494A and 494B which are simultaneously protracted or retracted by operating cylinders 496A and 496B, respectively. The lift displacement mechanism 488 is used in conjunction with the hereinafter described transfer mechanism 550 and is therefor associated with that portion on the upwardly directed surface of the belt 454 which comprises the pick-up/delivery portion 458 (Index Station No. 3) that will be hereinafter more fully described in conjunction with the description of the transfer mechanism 550.

Between the receiving portion 452 (Index Station No. 1) and the pick-up/delivery portion 458 (Index Station No. 3) is the locating portion 456 of the conveyor (Index Station No. 2) which will be more fully described in conjunction with the locator mechanism 500.

Locator

The locator mechanism 500 (FIGS. 7–9 and 18) which is operative in conjunction with the belt 454 of the conveyor system 450 at the locating portion 456 thereof (Index Station No. 2) preferably utilizes a pair of guide bars 502A and 502B that extend outwardly in opposite directions at about forty-five degrees (45°) from the longitudinally extending centerline 504 of the conveyor belt 454 to overlie the full width of the belt 454. It has been found that whereas the internal angle that would be defined by the intersection of the guide bars 502 at the centerline 504 of the belt 454—which would be on the order of about ninety degrees (90°)—may suitably interact with annular bead rings 12 having different internal diameters in order to effect the desired accurate location thereof with respect to the belt 454, if the apex filler applying assembly 10 is to be used with a variety of differently sized bead rings—and particularly annular bead rings of different internal diameters—the guide bars 502 will each preferably intersect a stop bar 506 that extends outwardly in opposite directions at about sixty degrees (60°) from the longitudinally extending centerline 504 of the conveyor belt 454. The internal angle that would be defined by the intersection of the stop bars 506 at the centerline 504 of the belt 454 would be more on the order of about one hundred twenty degrees (120°). The increased internal angle resulting from the use of the stop bars 506 has been found more favorably to locate annular bead rings 12 having various internal diameters about the same forward extent with respect to the belt 454. This consistency in the location of the annular bead rings 12 enhances the operation of the hereinafter described transfer mechanism 550.

Irrespective of whether the guide bars 502 intersect each other or whether the guide bars 502 intersect the stop bars 506 and the stop bars 506 intersect each other, the intersection of the guide bars 502, or the intersection of the stop bars 506, in turn, intersect a cross member 508 in proximity to the location at which the cross member 508 overlies the centerline 504. A pair of lateral members 510A and 510B are secured to the ends of the cross member 508 and extend outwardly therefrom in preferably parallel relation to intersect, and be secured to the outer extremity of a corresponding guide bar 502.

22

Each lateral member 510 has an inclined connecting plate 512 affixed thereto. As shown, one end of each connecting plate 512 may be directly connected to the lateral member 510 with which it is associated, and the other end of each connecting plate 512 may be secured to a riser 514 that extends upwardly for the lateral member 510 with which it is associated in order to assure that the connecting plate 512 is inclined downwardly and rearwardly (with reference to the direction in which the belt 454 moves).

An adjusting member 516 traverses the belt 454 and is supported from a suspension beam 518 that also traverses the belt 454 and is affixed to laterally spaced, vertical posts 64C and 64D or otherwise grounded to the frame 62. The throat end cap 528—through which a piston rod 530 axially extends—of each of a pair of actuating cylinders 524A and 524B is secured to a respective L-shaped bracket 532A and 532B that are, themselves, supported from the ends of the adjusting member 516. The piston rods 530A and 530B emanate through the throat end caps 528 from the respective cylinders 524A and 524B to pass, without restriction, through the L-shaped brackets 532A and 532B to be connected to the inclined connecting plate 512 of the respective lateral members 510A and 510B. In addition, a pair of adjusting screw members 534A and 534B penetrate threaded collars 536A and 536B secured to bores 538 in the adjusting member 516 to be rotatably received in a pair of thrust bearings 540 mounted in bores 542 that penetrate the suspension beam 518. As such, the screw members may be manually rotated by their respective handles 544A and 544B to select the exact longitudinal position of the guide bars 502 and/or the stop bars 506 of the locator mechanism 500 relative to the belt 454. Actuation of the cylinders 524 to retract the respective piston rods 530 causes the inclined connecting plate 512 to be translated rearwardly and upwardly, thereby moving the guide bars 502, the stop bars 506 and the side bars 510 correspondingly upwardly and rearwardly and out of engagement with the belt 454. Protraction of the piston rods 530, on the other hand, forces the inclined connecting plate 512 downwardly and forwardly thereby moving guide bars 502, the stop bars 506 and the side bars 510 downwardly and forwardly into engagement with, or at least into close proximity to, the surface of the belt 454.

When the conveyor belt 454 is indexed to transport a bead ring 12 from the receiving portion 452 (Index Station No. 1) to the locating portion 456 (Index Station No. 2)—and with the stop bars 506 and/or the guide bars 502 disposed in close juxtaposition immediately above the belt 454—movement of the belt 454 will bring the bead ring 12 into contact with the locator mechanism 500 such that when the indexing movement of the belt 454 stops, the bead ring 12 will be precisely disposed, as desired, on the belt 454 at Index Station No. 2. A sensing device 546 may be mounted just ahead of the apex 548 at which the stop bars 506 (or the guide bars 502) join to verify the location of the bead ring 12 on the belt 454.

With the bead ring 12 precisely located, and prior to the next successive indexing movement of the belt 454, the cylinders 524 are actuated to raise the stop bars 506, and the guide bars 502, to permit unrestricted passage of the bead ring 12 beneath the locator mechanism 500. By thus properly utilizing the locator mechanism 500, when the conveyor belt 454 is next indexed, the bead ring will move precisely to Index Station No. 3, at which location the bead ring 12 can be operatively engaged by the transfer mechanism 550.

It will be observed that translation of the guide bars 502—including the stop bars 506, if employed—angularly away from the belt 454 assures that once the annular bead ring 12 has been accurately positioned on the belt 454 by the locator mechanism 500 subsequent movement of the locator mechanism 500 will not inadvertently shift the bead ring 12 on the belt 454.

Transfer Mechanism

Figure 19:
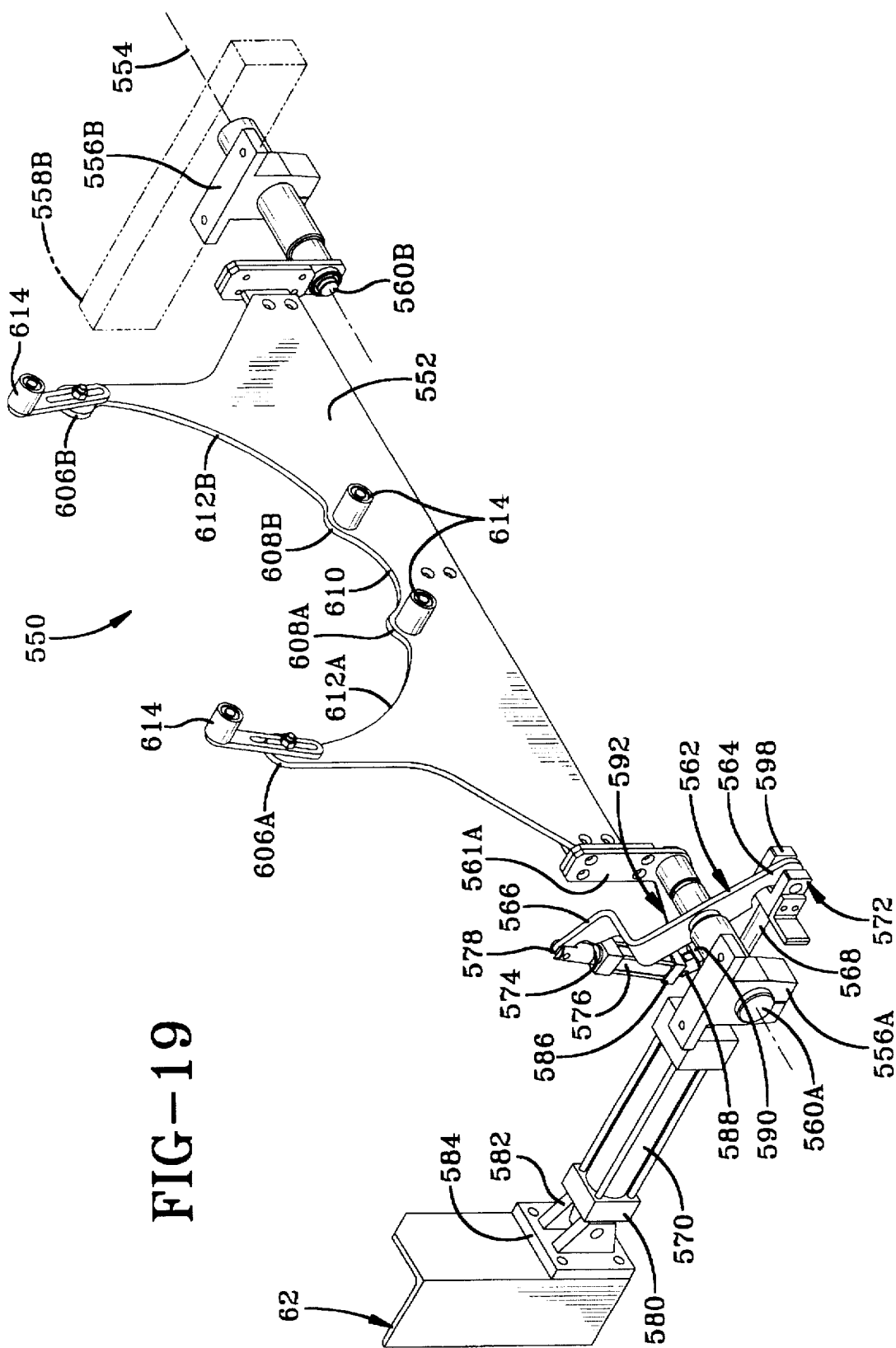
FIG. 19 is a perspective view of the preferred transfer mechanism employed in apparatus embodying the concepts of the present invention.
Figure 23:
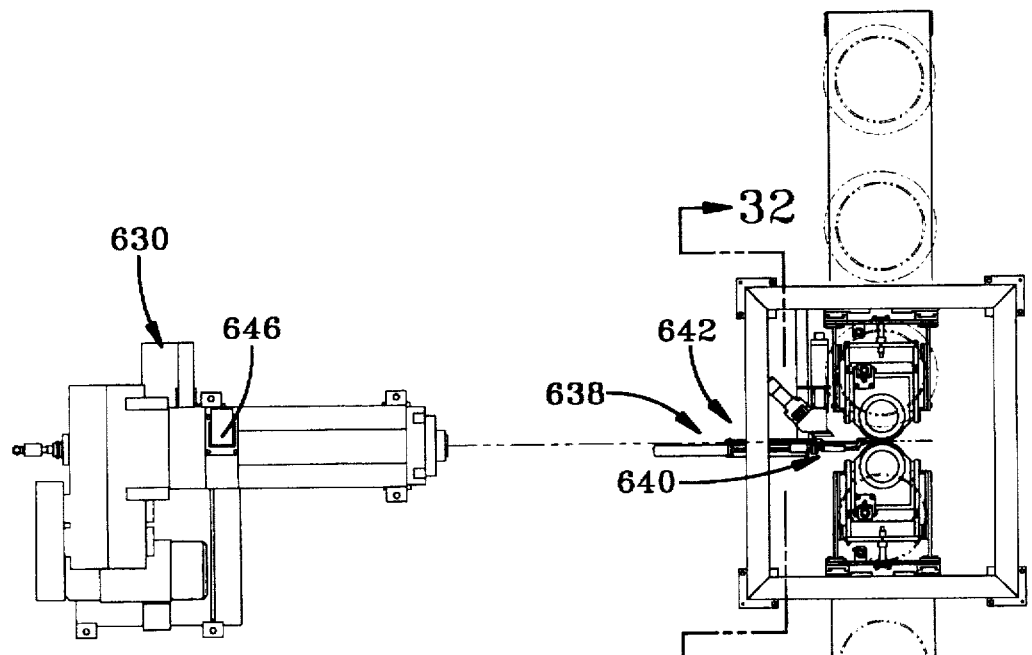
FIG. 23 is a top plan view taken substantially along line 23—23 of FIG. 22.
Figure 22:
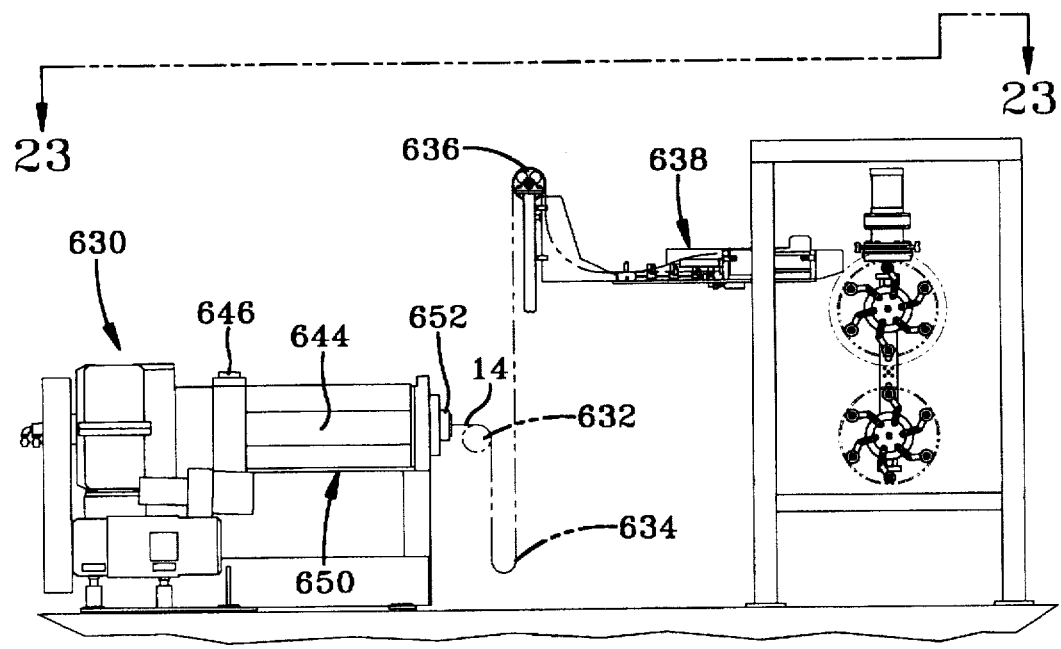
FIG. 22 is a side elevational view depicting the general relationship of the extruder to the orienting feed mechanism, the in-feed mechanism and the chuck turret assembly.

The transfer mechanism 550—which is best seen in FIGS. 19-21—operates in conjunction with the belt 454 of the conveyor system 450 at the pick-up/delivery portion 458 thereof (Index Station No. 3) to retrieve a bead ring 12 from the pick-up/delivery portion 458 and transfers it to a chuck head 252 of the chuck turret assembly 250 when the chuck head 252 is disposed in the loading/unloading position $264_A$. For example, with the chuck head 252 disposed at the loading/unloading position $264_A$, as represented in FIG. 8, the bead ring 12 may be mounted on the chuck head 252 by the unique transfer mechanism 550 so that the chuck turret assembly 250 may then be rotatably indexed to place the annular bead ring 12 that is mounted on that chuck head 252 within the nip 52 of the apex filler applicator 50 so that an apex filler 14 may be applied to the annular bead ring 12 on the chuck head 252 at the application position $264_B$.

With particular reference to FIG. 19, it will be observed that the transfer mechanism 550 employs a generally C-shaped frame member 552 that is pivotally mounted on a transverse axis 554 to be moved between a generally horizontally disposed "pick-up and delivery" position designated at $550_A$ on FIG. 8, a generally vertically disposed "chuck load and chuck unload" position designated at $550_B$ and a rearwardly inclined "ready" position designated at $550_C$. The transverse axis 554 about which the frame member 552 is pivoted may be delineated by the bearing blocks 556A and 556B fixedly mounted on the respective horizontally disposed members 558A and 558B of the main frame 62 or even on the horizontally disposed side rails 462 of the conveyor frame 460. Stub shafts 560A and 560B are secured to, and extend laterally outwardly from, connecting plates 561A and 561B that are, in turn, secured to the C-shaped frame member 552. The stub shafts 560 are rotatably received in the respective bearing blocks 556A and 556B.

The medial portion of a first crank arm 562 is secured to stub shaft 560A, and each of the opposite end portions 564 and 566 are secured to actuating members. That is, a first piston rod 568 is operatively extended and retracted by a generally horizontally disposed piston cylinder 570. The first piston rod 568 is pivotally connected, as by clevis 572, to one end portion 564 of the crank arm 562. A second piston rod 574 is operatively extended and retracted by a generally vertically disposed piston cylinder 576, and the second piston rod 574 is pivotally connected, as by clevis 578, to the other end portion 566 of the first crank arm 562. The base plate 580 of the horizontal piston cylinder 570 is mounted, as by clevis arrangement 582, to an anchor plate 584 that may be secured to one of the vertical support posts 64, or otherwise grounded to the main frame 62, of the apex filler applying assembly 10, or to one of the vertical legs 464 of the conveyor frame 460. In any event, the horizontal piston cylinder 570 is mounted to be pivotal in a generally vertical plane.

The base plate 586 of the vertical piston cylinder 576 is mounted, as by clevis arrangement 588, to one end 590 of a second crank arm 592 that extends outwardly from the connecting plate 561A that is secured to the C-shaped frame member 552. As such, the vertical piston cylinder 576 is also mounted to be pivotal in a generally vertical plane.

When piston rod 574 is retracted within the piston cylinder 576, and when piston rod 568 is retracted within piston cylinder 570 the frame member is disposed in its generally horizontal pick-up and delivery disposition $550_A$ (FIG. 8). With the piston rod 574 still in its retracted position with respect to piston cylinder 576, but with the piston rod 568 extended with respect to piston cylinder 570, the frame member is disposed in its generally vertical chuck load and chuck unload disposition $550_B$ (FIGS. 8 and 19). With the piston rod 574 in its extended position with respect to piston cylinder 576, and with the piston rod 568 extended with respect to piston cylinder 570, the frame member is disposed in a generally rearwardly inclined ready position $550_C$ (FIG. 8).

The interior edge configuration of the generally C-shaped frame member 552 preferably presents a pair of opposed terminal lobes 606A and 606B and a pair of medial lobes 608A and 608B. The medial lobes 608 are separated by a medial sinus, or recess, 610. One lateral sinus, or recess, 612A is disposed between the terminal lobe 606A and medial lobe 608A. A second lateral sinus, or recess, 612B is disposed between the terminal lobe 606B and the medial lobe 608B. An electro-magnet 614 is mounted on each lobe 606 and 608. By precisely locating a bead ring 12 with the locator mechanism 500, when the C-shaped frame member 552 of the transfer mechanism 550 is located at the generally horizontal pick-up and delivery disposition $550_A$, the electro-magnets 614 will grasp the metallic ribbon 18 in the annular bead ring 12 and thereby releasably secure the annular bead ring 12 to the transfer mechanism 550.

In order to permit the transfer of finished tire bead sub-assemblies 16 of various dimensions without distortion that could be caused by having insufficient clearance between the transfer mechanism 550 and the conveyor belt 454, the spacing between the C-shaped frame member 552 and the conveyor belt 454 is preferably greater than the corresponding dimension of any tire bead sub-assembly 16 contemplated to be positioned therebetween. To accommodate the spacing between the frame member 552 and the conveyor belt 454 to the corresponding dimension of the bead ring 12 and/or the tire bead sub-assembly 16, the planar support member 486 may be employed to raise the bead ring 12 into fairly close proximity to the frame member 552.

The sinuses, or recesses, 610 and 612 assure that the pulleys 380 mounted on the radially outer dog-leg portions 309 of the drive arms 306 on the chuck heads 252 of the chuck turret assembly 250 will not engage the C-shaped frame member 552 of the transfer mechanism 550 as the frame member 552 is swung from the generally horizontal pick-up and delivery disposition $550_A$ to the generally vertical chuck load and chuck unload disposition $550_B$ nor from the generally vertical chuck load and chuck unload disposition $550_B$ to the rearwardly inclined ready disposition $550_C$.

When the C-shaped frame member 552 is disposed in the generally vertical chuck load and chuck unload disposition $550_B$ the chuck turret assembly 250 may be operated to expand the drive arms 306 to transfer support of the bead ring 12 from the transfer mechanism 550 to the chuck turret assembly 250. Thereafter, the electro-magnets 614 may be deactivated. Once transfer has been accomplished the C-shaped frame member 552 of the transfer mechanism 550 is moved to the rearwardly inclined ready disposition $550_C$ in order to await the application of the elastomeric strip 16 onto the bead ring 12, as will be hereinafter more fully described. Thereafter the C-shaped frame member 552 of the transfer mechanism 550 will be swung from the rearwardly inclined ready position $550_C$ to the generally vertical chuck load and chuck unload disposition $550_B$. At that point in time the finished bead sub-assembly 16 will be grasped by actuation of the electro-magnets 614 and the chuck head 252 is again retracted to permit the finished bead ring sub-assembly 16 to be supported solely from the transfer mechanism 550. Sequentially thereafter the C-shaped frame member 552 will be swung from the generally vertical chuck load and chuck unload disposition $550_B$ to the generally horizontal pick-up and delivery disposition $550_A$.

When the C-shaped frame member 552 is disposed in the horizontal pick-up and delivery disposition $550_A$, the electro-magnets 614 will be once again deactivated to deposit the finished tire bead sub-assembly 16 on the pick-up/delivery portion 458 of the conveyor 450. The planar support member 486 may then be lowered so that the finished tire bead sub-assembly 16 will not be inadvertently engaged by the transfer mechanism 550 as the conveyor indexes to translate the finished tire bead sub-assembly 16 to the shape retainer portion 616 (Index Station No. 4). That same indexing movement of the conveyor belt 454 translates the next successive bead ring 12 to the pick-up/delivery portion 458 of the conveyor 450.

The subsequent, and last, indexing movement of the conveyor translates the finished tire bead sub-assembly 16 to the removal portion 618A of the conveyor 450 (Index Station No. 5). There is no specific configuration, or mechanism, necessarily associated with the removal portion 618 of the conveyor 450. The removal portion 618 merely affords a resting surface from which the finished tire bead sub-assembly 16 may be removed for subsequent utilization in a tire, not shown. As shown, one may also provide a second removal portion 618B (Index Station No. 6) to afford ample time within which to effect removal of the finished tire bead sub-assembly 16. The additional time may also favorably assure that the finished tire bead sub-assembly adequately cools before removal.

Shape Retainer (If Desired, or Necessary)

With specific reference to FIGS. 5, 7 and 8, a shape retainer 620 may overlie the shape retainer portion 616 of the conveyor belt 454. The shape retainer 620 may comprise a plurality of longitudinally-spaced rolls 622 that are rotatably mounted about their own axes between a pair of laterally-spaced, longitudinally-extending supporting bars 626A and 626B. The rolls 622 are longitudinally, and vertically, spaced so as to apply only enough pressure against the tire bead sub-assembly 16 disposed therebeneath such that as the apex filler 14 of the tire bead sub-assembly 16 cools, the retainer rolls 622 will assure that the apex filler 14 will not lose its desired shape.

Apex Filler Supplier

With general reference to FIGS. 22–27, the uncured elastomeric material 20 is fed into a conventional extruder 630 which generally forms a continuous strip of apex filler 14 that may, in turn, be passed over a freely rotatable discharge roller 632 to form an accumulating loop 634 and over an elevated, and powered, loop weight-reducing roller 636 onto an orienting feed mechanism 638, through an in-feed mechanism 642 (which directs the apex filler 14 into the nip 52) and past a guillotine cutter 640 (FIG. 27).

The relatively conventional extruder 630 utilizes a screw housing 644 that presents a port 646 into which the uncured elastomeric material 20 is fed. The extruder 630 masticates the uncured elastomeric material 20 in a conventional manner, but because the material 20 (FIG. 5) is uncured, the temperature of the extruder 630 must be controlled to prevent the temperature of the material 20 from exceeding its cure initiating level and at the same time permitting a sufficiently elevated temperature for proper mastication and extrusion.

Temperature control of the extruder 630 may be accomplished by a heat exchange system, such as the casing 650 which encapsulates the screw housing 644, which may also be conventional. The heat exchange system 650 provides heating, or cooling, fluid to the screw housing 644 in accordance with a thermostatic control, not shown, that may be incorporated within the heat exchange system 650. The heat exchange system 650 maintains the temperature of the uncured elastomeric material 20—both within the screw housing 644 as well as when the material 20 is forcibly formed into an apex filler 14 by passage through the die head 652. The apex filler 14 exits the die head 652 below the temperature level which would initiate, or "set-off", the curatives in the uncured elastomeric material 20. More specifically, the temperature of the uncured elastomeric material, particularly if the material 20 is a gum rubber of the type typically employed as an apex filler 14, is maintained within the range of from about 180° to about 205° F. (approximately 82° to 96° C.) which is below the typical set-off temperature for initiating the cure of the apex filler 14 but sufficient to permit effective mastication of the uncured elastomeric material 20 within the extruder 630 before the tire bead sub-assembly 16 is incorporated in a tire and the tire itself is cured.

Passage of the extruded apex filler 14 over the discharge roller 632 and into an accumulating loop 634 provides an accommodation for the application of the apex filler 14 to a bead ring 12 at a rate faster than the continuous apex filler 14 can be discharged through the die head 652 and allows a means whereby the availability of the apex filler 14 can be replenished during the cyclic intervals between consecutive applications of an apex filler 14 to successive bead rings 12.

As a continuous length of the apex filler 14 within the accumulating loop 634 increases, the weight of the apex filler 14 within the accumulating loop 634 could adversely oppose the desired, free movement of the apex filler 14 into the orienting feed mechanism 638 and the in-feed mechanism 642. By passing the apex filler 14 over the roller 636—which is powered to rotate at a speed consistent with the rate at which the apex filler 14 is to enter the orienting feed mechanism 638 and the in-feed mechanism 642—the undesired consequence of the accumulating loop-weight is negated.

The orienting feed mechanism 638, as best depicted in FIGS. 24–27, is carried on a horizontally oriented supporting deck plate 654 that is, in turn, supported from the main frame 62 of the apex filler applicator 50. A feed throat 656 is attached to the outboard end portion 658 of the supporting deck plate 654. The feed throat 656 receives the apex filler 14 from the powered, loop weight-reducing roller 636 and directs the downward passage of the apex filler 14 as it leaves the loop weight-reducing roller 636 in the horizontal disposition desired for entry into the bay 660 of transitional rollers utilized to rotate the apex filler 14 about a longitudinal reference from its horizontally flat disposition as it leaves the feed throat 656 to the vertically upright disposition required for operation of the in-feed mechanism 642 and the guillotine cutter 640.

With particular reference to FIGS. 25–27, the bay 660 begins with an entry roller 662 that is disposed horizontally in laterally spaced bearing blocks 664A and 664B that are mounted on outboard end portion 658 of the deck plate 654. A retaining roller 666 extends substantially vertically upwardly from each bearing block 664 to confine the apex filler 14 laterally with respect to entry roller 662. As such, the retaining rollers 666A and 666B are laterally spaced modestly in excess of the major dimension of the apex filler 14.

A succession of transitional rollers are disposed in pairs that are generally opposed. The first pair of transitional rollers 668A and 668B are rotatably mounted on bearing stub shafts 670A and 670B, respectively, that extend outwardly from a locating block 672$_A$ mounted on a longitudinal rod 674 along which the locating block 672$_A$ may be adjustably positioned. The locating block 672$_A$ has a canted first mounting face 676$_A$ and a canted second mounting face 678$_A$ that are disposed perpendicularly with respect to each other, but the mounting faces 676$_A$ and 678$_A$ are disposed on the locating block 672$_A$ such that the transitional roller 668A is inclined upwardly at approximately 22.5°—represented as angle $\beta_1$ in FIG. 26B—from a horizontal reference plane 680.

The inclination of the first canted roller 668A begins to lift the outer edge 26 of the apex filler 14, and the inclination of the second canted roller 668B serves to retain the base 22 of the apex filler in the desired alignment with the longitudinal axis 682 of the orienting feed mechanism 638 against the lateral displacement force resulting from the lifting of the outer edge 26 of the apex filler 14.

The second transitional rollers 668C and 668D are rotatably mounted on bearing stub shafts 670C and 670D, respectively that extend outwardly from a locating block 672$_B$ that may also be mounted on the longitudinal rod 674 along which the locating block 672$_B$ may be adjustably positioned. The locating block 672$_B$ has a first canted mounting face 676$_C$ that is disposed to permit the transitional roller 668C, mounted thereon by bearing stub shaft 670C, to be inclined upwardly at approximately 45° from the horizontal reference plane 680—which angle is designated as angle $\beta_2$ in FIG. 26C.

The second canted mounting face 678$_B$, which supports roller 668D that is mounted on bearing stub shaft 670D, however, is also canted perpendicularly with respect to the first mounting face 676$_C$. The locating block 672$_B$ may be placed longitudinally of the orienting feed mechanism 638 such that the hereinafter more fully described wing plate extension 688 of the in-feed mechanism 642 is vertically disposed in opposition to roller 668C. The right angle relationship between the disposition of the support rollers 668C and 668D is intended to permit support roller 668D to engage the base 22 of the apex filler 14 to prevent it from sliding laterally away from the transitional roller 668C, and the presence of the wing plate extension 688 assures that the apex filler 14 will not be over-rotated.

The third pair of transitional rollers includes transitional roller 668E that is rotatably mounted on bearing stub shaft 670E which extends outwardly from the first canted surface 676$_E$ on locating block 672$_C$. The first canted mounting face 676$_E$ is disposed to permit the transitional roller 668E to be inclined upwardly at approximately 66.5° from the horizontal reference plane 680—as represented by angle $\beta_3$ in FIG. 26D. The locating block 672$_C$ may also be mounted on the longitudinal rod 674 along which the locating block 672$_C$ may be adjustably positioned.

The third pair of transitional rollers also includes roller 668F which is mounted on bearing stub shaft 670F that extends outwardly from the second canted mounting face 676$_F$. Here, too, the mounting face 676$_F$ which supports roller 668F is disposed perpendicularly with respect to the mounting face 676$_E$. At this station, as well the hereinafter more fully described wing plate extension 688 of the backing plate 700 in-feed mechanism 642 is disposed vertically in opposition to roller 668E. Hence, roller 668F is also intended to support the base 22 of the apex filler 14 to prevent it from sliding laterally away from the transitional roller 668E, whereas the wing plate extension 688 continues to assure that the apex filler 14 will not be over-rotated.

One or more additional pairs of transitional rollers 668 may also be employed, if desired or required because of the particular aspect ratio of the apex filler 14 to be applied by the apex filler applying assembly 10. Such additional transitional rollers 668 may also be presented from locating blocks 672 mounted on the longitudinal rod 674 along which the other locating blocks 672 may be adjustably positioned.

Beginning at about the transitional rollers 668C and/or 668D and extending forwardly to the transition between the orienting feed mechanism 638 and the in-feed mechanism 642, a rearwardly-directed, substantially vertically oriented, wing plate extension 688 is presented from the backing plate 700 of the in-feed mechanism 642. The wing plate extension 688 may be opposed by transitional rollers 668C, 668E and any additional transitional rollers deemed necessary, or desirable, to conclude the transition of the apex filler 14 from its horizontal to its vertical disposition.

The backing plate 700 of the in-feed mechanism 642, as well as the wing plate extension 688 may preferably be coated with a low friction coating 702, such as Teflon—or even the same coating material 226 employed on the applying rollers 54 and 56—in order to minimize resistance against longitudinal movement of the continuous strip of the pre-applied apex filler 14 through the in-feed mechanism 642.

A guide plate 704, which may also be supported on the deck plate 654, is secured in laterally spaced opposition to the backing plate 700 of the in-feed mechanism 642, as by a plurality of nut and bolt combinations 706 which penetrate the guide plate 704 and the backing plate 700. A spacer ring 708 (FIG. 29) circumscribes a portion of the bolt shaft in the combination 706 to determine the lateral spacing between the guide plate 704 and the backing plate 700. A sleeve roller 710 is rotatably mounted on the spacer ring 708 to support the apex filler 14 as it moves between the guide plate 704 and the backing plate 700 within the in-feed mechanism 642.

The body portion 712 of the guide plate 704 is provided with at least one longitudinal aperture 714 within which a plurality of vertically oriented sleeve rollers 716 are mounted on vertical pins 718. The sleeve rollers 716 oppose the backing plate 700 and provide an enhanced means by which to assist the continuous strip of apex filler 14 in traversing through the in-feed mechanism 642 with minimal resistance.

At the forward end of the body portion 712 an extension lip 720 extends further forwardly to engage the lower lateral edge 722 of the apex filler 14 and thereby prevent the apex filler 14 from falling away from the backing plate 700, even as the apex filler 14 moves beyond the body portion 712 of the guide plate 704. A clutch roller 726 is located within the cutaway 724 formed by the juncture of the guide plate 704 and the extension lip 720. The clutch roller 726 is mounted on a one-way clutch mechanism 728 supported from an axle 730 that depends from one end portion 732 of a crank arm 734 that is pivotally mounted on a bearing 736 supported from an angle bracket 738 that is attached to a protuberance 740 which extends upwardly from the body portion 712 of the backing plate 700.

An operating cylinder 742 may also be fixedly mounted on the angle bracket 738, as by machine screws 744, such that the piston rod 746 operated thereby extends through the angle bracket 738 to be pivotally connected to one end of a link 748. The other end of the link 748 is attached to the second end portion 750 of the crank arm 734. By this mechanical arrangement when the piston rod 746 is selectively extended by operation of the operating cylinder 742, the inwardly thrusting translation of the clutch roller 726 will force the apex filler 14 against the low friction coating 702 on the surface of the backing plate 700, thereby allowing movement of the apex filler 14 relative to the in-feed mechanism 642—but only in the direction permitted by the one-way clutch mechanism 728.

The in-feed mechanism 642 is afforded selective reciprocation by a stroking cylinder 752. Although any number of structural arrangements can be employed, one preferred arrangement is to "ground" a pair of longitudinally spaced support pillars 753A and 753B to the support frame 62. A pair of rails 754A and 754B are secured to, and extend longitudinally between, the grounded support pillars 753A and 753B. A cross-head 755 is slidably mounted on the rails 754, and to enhance movement of the cross-head 755 along the rails 754 pairs of sleeve bearings $756A_1$ and $756A_2$ as well as $756B_1$ and $756B_2$ may be interposed between the cross-head 755 and the respective support rails 754A and 754B. The cross-head 755 is fixedly secured to the backing plate 700 and thus provides the sole support to the in-feed mechanism 642—i.e.: the backing plate 700 and the mechanism connected thereto. A piston rod 757 emanates from the stroking cylinder 752, the forward end portion 758 of which is also secured to support pillar 753A. As such, extension and retraction of the piston rod 757 effects reciprocation of the in-feed mechanism 642.

A retractor assembly 840 includes a gripping mechanism 842 and a displacement mechanism 844. The displacement mechanism 844 is mounted on the supporting deck plate 654 which extends longitudinally beneath both the orienting feed mechanism 638 and the in-feed mechanism 642. As will be hereinafter more fully described, the gripping mechanism 842—which generally employs opposed paddles 846A and 846B, is adapted selectively to engage and release the continuous strip of the apex filler 14 as it enters the in-feed mechanism 642. The paddles 846 are thus mounted for longitudinal translation with, and with respect to, the in-feed mechanism 642.

As best seen in FIGS. $26E_1$ and $26E_2$, one means by which to effect the gripping engagement, and release, of the opposed paddles 846 may be accomplished by pivotally mounting the paddles on a common shaft 848 that is oriented substantially parallel to the longitudinal axis 682 (FIG. 27) of the aligned orienting and in-feed mechanisms 638 and 642, respectively, and thus also substantially parallel to the longitudinally extending strip of the apex filler 14 received within the in-feed mechanism 642. Actuating arms 852A and 852B extend angularly outwardly from the hubs 854A and 854B, respectively, by which each paddle 846A and 846B are mounted on a common supporting shaft 848. Protraction of a wedge-shaped piston head 858—that is mounted on a piston rod 860 for selective reciprocation by cylinder 862—simultaneously to engage the diverging actuating arms 852A and 852B will force the opposed paddles 846A and 846B into gripping engagement with the continuous strip of the apex filler 14 disposed between the paddles 846, as shown in FIG. $26E_2$. A tension spring 864 may be connected to, and extend between, the opposed actuating arms 852A and 852B so that in response to withdrawal of the wedge-shaped piston head 858, the paddles 846A and 846B will move apart to release the strip of the apex filler 14 disposed between the paddles 846, as represented in FIG. $26E_2$.

The gripping mechanism 842 of the retractor assembly 840 is itself longitudinally reciprocated by action of a double action cylinder 866 which is secured to the supporting deck plate 654, as best seen in FIG. 28. The outboard end portion 868 of each of a pair of piston rods 870A and 870B (FIG. 29) which is selectively extended and retracted, from the double acting cylinder 866 supports the cylinder 862 and the gripping mechanism 842 such that the gripping mechanism 842 will translate with the in-feed mechanism 642 without actuating the double action cylinder 866, but the gripping mechanism 842 will translate with respect to the in-feed mechanism by virtue of the piston rods 870 which emanate from the double acting cylinder 866. A pair of piston rods 870 were employed to assure orientational stability of the gripping mechanism 842, even as it is being translated by the double-acting cylinder 866.

Before explaining the reason for the reciprocation of the in-feed mechanism 642, the operation of the clutch roller 726 and the retraction mechanism 840, it is preferred that one understand the operation of the guillotine cutter 640.

Guillotine Cutter

The guillotine cutter 640 (FIGS. 30 and 31) utilizes a leading edge cutting blade 760 and a trailing edge cutting blade 762 that are simultaneously stroked to impact against a reaction surface presented from an anvil 764 (FIGS. 28 and 29). The anvil 764 is mounted on the backing plate 700 of the in-feed mechanism 642. To prevent interference with passage of the apex filler 14, the anvil 764 may be recessed into the backing plate 700. The cutting blades 760 and 762 are angularly disposed with respect to each other—as represented by the angle $\Theta$ in FIG. 31—to accommodate the working of the uncured elastomer of the apex filler 14 which occurs as the applying rollers 54 and 56 rotate against the apex filler 14 to effect the application thereof onto the outer circumference of the bead ring 12. Thus, the respective angular disposition of the blades 760 and 762 assures that when the trailing end 766 is conjoined to the leading end 768 thereof the two ends 766 and 768 will merge with substantial accuracy.

Figure 4:
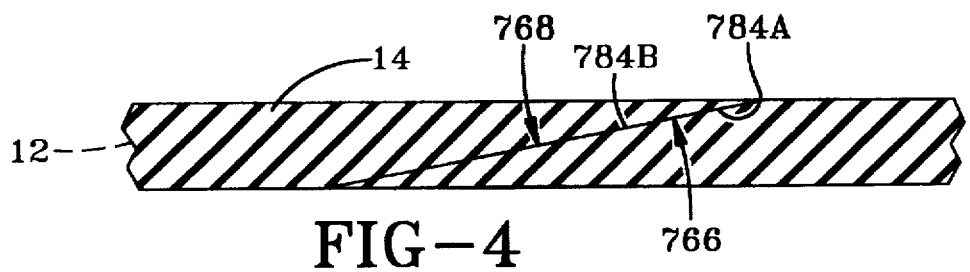
FIG. 4 is a further enlarged section taken substantially along line 4—4 of FIG. 1.

The two cutting blades 760 and 762 are secured to a mounting head 770 that is, in turn, fastened to the end of a piston rod 772 that is reciprocated by the action of the cutter operating cylinder 774 which is also preferably mounted on the frame 62 of the apex applying mechanism 50. The angular orientation of the cutting blades 760 and 762 relative to each other—as represented by angle $\Theta$—and relative to a vertical frame of reference 776—angle $\Delta$ and angle $\Delta$ plus $\Theta$, respectively—determines the angularity of the leading and trailing ends 768 and 766 (FIGS. 1 and 4), as represented by the lines 778 and 780 on FIG. 28, which shows, in phantom line, the disposition of the anvil 764 when the backing plate 700 of the in-feed mechanism 642 has been extended by the stroking cylinder 752. On the other hand, the horizontal angular orientation of the cutting blades effected by the common horizontal angularity of the guillotine cutter 640 with respect to the transverse frame of reference 782—represented by angle $\Phi$ in FIG. 27—determines the angularity of the skive cut (represented by the angularity of the opposed faces 784A and 784B on the respective trailing and leading ends 766 and 768 of the apex filler 14, as depicted in FIG. 4) which permits the trailing and leading ends 766 and 768 to overlap as they are conjoined at the conclusion of the application of the apex filler 14 to the bead ring 12.

As a result of the angularly disposed cutting blades 760 and 762 there will be a generally triangularly shaped waste piece 786 (FIG. 31) which should be removed in order to prevent it from becoming entangled with the leading end 768 of the next successive apex filler 14 that will be fed into the nip 52 of the apex filler applicator 50. One effective waste-piece removal mechanism 790 employs a long-stroke piston rod 792 that is reciprocated by a cylinder 794. The outboard end of the piston rod 792 terminates in a generally cylindrical crown block 796. A circumferentially spaced plurality of barbs, or tines, 798 extend axially outwardly from the peripheral edge of the axially forward face 800 to engage, and snag, the waste piece 786 when the piston rod 792 is extended. When the piston rod 792 is retracted, the barbs 798 will withdraw the waste piece 786 and translate it past a stripping edge 802 that peals the waste piece 786 from the barbs 798 and allows the waste piece 786 to drop into a receiving canister 804. Another effective waste removal system, not shown, might well employ a conveyor (not shown) that would return the scrap to the feed port 646 of the extruder 630 for recycling.

Operation of the in-feed mechanism 642 is best understood in conjunction with the guillotine cutter 640, the clutch roller 726 and the retraction mechanism 840. One must understand that when a sensor (such as a laser photo sensor not shown) signals the passage of a leading end 768 of a still continuous strip of apex filler 14 past a specific position about the circumference of the chuck head 252 at application position 264$_B$, the length of the strip passing through the in-feed mechanism 642 is measured by the angular rotation of the driving motor 112 or 116. The driving motors 112 and 116 rotate the respective applying roller 54 or 56, and when the selected length of the apex filler 14 has passed therethrough, the double-bladed guillotine cutter 640 severs the strip of apex filler 14 by driving the blades 760 and 762 against the anvil 764 that is mounted on the backing plate 700 of the in-feed mechanism 642.

The exact positioning of the sensor can be determined for each size tire bead sub-assembly 16 that will be manufactured on the apex filler applying assembly 10, and that information can be stored in the central processing unit 837. The sensor used may be a conventional device such as an optical, electrical or fluidic proximity sensor, each of which is compatible with conventional central processing units. These devices are well known such that a more elaborate discussion of them is not believed necessary. Operation of the Retractor and In-feed Mechanisms in Relation to the Guillotine After the blades 760 and 762 strike the anvil 764 to sever the apex filler 14, the gripping mechanism 842 of the retractor mechanism 840 is actuated, causing the paddles 846 to grasp the apex filler 14 as it enters the in-feed mechanism 642. Sequentially following actuation of the gripping mechanism 842, the displacement mechanism 844 is also actuated to withdraw the newly formed leading end 768 of the apex filler strip from the cutting blade 760—on the order of about one-half (½) inch. After the leading end 768 has been thus retracted, at least the cutting blade 760 is itself retracted (in the exemplary embodiment depicted both blades 760 and 762 are simultaneously retracted). This sequence assures that the leading end 768 will not be deformed by withdrawal of cutting blade 760.

During the aforesaid cutting sequence, the one-way clutch roller 726 remains in its retaining position whereby it thrusts the apex filler 14 against the backing plate 700. The one-way clutch mechanism 728, however, permits the continued movement of the trailing end 766 severed by cutting blade 762.

To prepare for feeding the newly cut leading end 768 of the apex filler 14 into the nip 52, the clutch roller 726 is then moved into its open position in spaced relation to the backing plate 700. The gripping mechanism 842 is also actuated to release the apex filler 14 from the gripping engagement of the opposed paddles 846A and 846B. With the apex filler strip merely resting in the in-feed mechanism 642, the in-feed mechanism 642 is moved rearwardly by the stroking cylinder 752, which movement is also accomplished relative to the apex filler 14.

The clutch roller 726 is then thrust against the backing plate 700 by the action of operating cylinder 742 such that when the next bead ring 12 is moved into the nip 52 by the chuck turret assembly 250, the in-feed mechanism 642 will be moved forwardly to insert the leading end 768 within the nip 52. It should be noted that the leading end 768 is purposely fed into the nip 52 at a linear speed that is equal to, or less than, the tangential speed of the frusto-conical surfaces 58 and 60 on the applying rollers 54 and 56. It has been found that the aforesaid speed differential assists in forcing the base 22 of the apex filler 14 into firmly engaging contact with the outer circumferential surface 24 of the bead ring 14. If the leading end 768 is forced into the nip 52 at a linear speed that is greater than the tangential speed of the surfaces of the frusto-conical surfaces 58 and 60, the leading end 768 of the apex filler 14 tends to skip off the bead ring 12. Hence, the proper relative speeds are important.

As the nip 52 engages the leading end 768, the one-way clutch mechanism 728 permits the apex filler 14 to be drawn through the in-feed mechanism 642 between the clutch roller 726 and the backing plate 700.

Accessories

A pair of divergently disposed hold-down rollers 806A and 806B (FIG. 13A) are mounted for rotation on the forked mounting arm 808 which is secured to ground through the main frame 62 and presented at the input side of the nip 52 between the opposed applying rollers 54 and 56 of the apex filler applicator 50. The hold-down rollers 806 are provided to maintain the trailing end 766 of the apex filler 14 in a position to engage the outer circumferential surface 24 of the annular bead ring 12 after the guillotine cutter 640 has severed the apex filler 14 and the trailing end 766 enters the nip 52.

With reference to FIGS. 32–34, it will be observed that a retainer system 810 is preferably utilized with the high aspect ratios apex fillers 14 in order to assure that the apex filler 14 will not begin to cup, curl or bow—even during the brief interim that it takes for the applicator 50 to apply the apex filler 14 to the bead ring 12.

Typically, the retainer system 810 will employ a plurality of circumferentially-segmented arcuate plate members 812. Plate members 812A and 812B may be fixedly secured to, and supported by, the turret arm 256. As such, plate members 812A and 812B will index with the turret arm 256 between the diametral stations 264$_A$ and 264$_B$ of the chuck heads 252. Plate members 812C and 812D are located on the same side of the chuck head 252 as are plate members 812A and 812B, but they are supported from a cross head 814 that is secured to the outboard end portion 816 of a piston rod 818 that is selectively extended and retracted by a locating cylinder 820 that may be mounted on haunched bracket 106A. A pair of guide rods 822 are secured to the cross head 814 and extend through alignment apertures 824 provided in the head plate 826 of the locating cylinder 820. Extension of the piston rod 818 moves the plate members 812C and 812D into juxtaposition with the apex filler 14 being applied to the ring at chuck head application position 264$_B$, and retraction of the piston rod 818 withdraws the plate members 812C and 812D.

An opposing plate member 828 is preferably in the form of a truncated circular disk. That is a segment of the circular disk forming the plate member 828 has been removed along chord 830. The plate member 828 is also movable into, and out of, close juxtaposition with the chuck head 252 located at application position 264$_B$, as by being secured to the outboard end portion 831 of a piston rod 832 that is extended and retracted by a cylinder 833 that may be mounted on a shelf 834 supported on the upper end portion of a fixed column 835. By mounting the majority of the plate members 812 as well as plate member 828 in a manner whereby those plate members can be translated into, and out of, juxtaposition with the chuck head 252 located at chuck head station 634$_B$ access to the area within which the chuck head 252 is disposed when the apex filler 14 is being applied to the bead ring 12 is facilitated.

Each segmented plate member 812 will at least be provided with a low friction surface, if the plate member is not itself fabricated from a low friction material.

Further Details in the Operation of the Apex Filler Applying Assembly

With a bead ring 12 positioned within the nip 52 the continuous apex filler 14 enters the orienting feed mechanism 638—assisted by the powered, loop weight-reducing roller 636. The forward impetus imparted to the apex filler 14 by the roller 636 rotates the apex filler 14 about the longitudinal axis 682 of the orienting feed mechanism 638 such that the apex filler 14 enters the in-feed mechanism 642 in the desired vertical disposition. On the initial entry of the apex filler 14, an operator will assure that the leading end 768 of the apex filler 14 has advanced to the point that the apex filler 14 overlies the leading end cutting line 778, and if necessary, the operator will manually advance the apex filler 14. So positioned, the guillotine cutter 640 is actuated to prepare the leading end 768 of the apex filler 14.

It will be recalled that the surface portions 58$_{A1}$ and 58$_{A2}$ of the opposed applying rollers 54 and 56 have whatever configuration is necessary to effect the necessary driving engagement with the flanks of the bead ring 12—those flanks being the corners 224A and 224B in the rectilinear configuration depicted in FIG. 2. Hence, rotation of the applying rollers 54 and 56 not only rotates the bead ring 14 on the chuck head 252 but also continues to draw the apex filler 14 into the nip 52 and onto the bead ring 12. In response to the triggering action initiated by passage of the leading end 768 of the apex filler 14 the guillotine cutter 640 is actuated simultaneously to sever the continuous apex filler 14 along the predetermined cutting lines 778 and 780 and reciprocatingly retract the in-feed mechanism 642. As the trailing end 766 of the apex filler 14 approaches the nip 52, the hold-down rollers 806 prevent the trailing end 766 from raising upwardly to too great a degree, thus assisting in bringing the trailing end 766 into mating engagement with the leading end 768 that was previously attached to the bead ring 12.

With the aforesaid supplemental description as to the operation of an apex filler applying assembly 10 embodying the concepts of the present invention, one skilled in the art can readily program a central processing unit 837 to effect at least semi-automatic operation of the assembly 10.

Conclusion

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that an apparatus for applying an apex filler to a bead ring embodying the concepts of the present invention is capable of applying apex fillers having substantially greater aspect ratios than was capable by prior art apparatus, but also that the other objects of the invention can be likewise accomplished.

We claim:

1. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces, portions of which are spaced, one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring; and retainers to engage substantially the entire apex filler as it is applied to said outer circumferential surface of said bead ring in order substantially to maintain the radial disposition in which said apex filler is applied to said bead ring by said nip while obviating adherence between said retainers and said elastomeric strip.

2. Apparatus for applying an apex filler to an annular bead ring, as set forth in claim 1, said apparatus further comprising:

means on said outer surfaces of said applying rollers to obviate adherence between said outer surfaces and said elastomeric strip.

3. Apparatus for applying an apex filler to an annular bead ring, as set forth in claim 1, wherein said retainers are positioned on both sides of said apex filler.

4. Apparatus for applying an apex filler to an annular bead ring comprising:

chuck means for selectively receiving an annular bead ring having an outer circumferential surface:

a pair of opposed frusto-conical, applying rollers each having a rotational axis and outer surfaces, portions of which are spaced one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring;

said means for presenting a linear strip of uncured elastomeric material to said outer circumferential surface of said bead ring further comprising:

an in-feed mechanism;

a guillotine cutter;

said guillotine cutter having a leading end cutter blade and a trailing end cutter blade;

said leading and trailing end cutter blades being angularly disposed with respect to each other and being disposed with respect to a vertical frame of reference to sever said elastomeric strip with leading and trailing ends in order to accommodate working of said uncured elastomeric material by said applying rollers and thereby to effect a mating engagement between said leading and trailing ends of said uncured elastomeric material as it is applied to said bead ring.

5. Apparatus for applying an apex filler to an annular bead ring, as set forth in claim 4, wherein:

said cutting blades are also angularly disposed with respect to a transverse frame of reference to determine the angularity of a skive cut in said leading and trailing ends of said elastomeric strip in order to effect mating engagement of said leading and trailing ends at the completion of the application of said elastomeric strip onto said bead ring.

6. Apparatus for applying an apex filler to an annular bead ring, as set forth in claim 4, wherein said in-feed mechanism further comprises:

a backing plate means;

guide means laterally spaced with respect to said backing means in order to receive said uncured elastomeric strip therebetween;

an anvil mounted on said backing means;

means to drive at least one cutter blade into engagement with said anvil to sever a predetermined length of said uncured elastomeric strip and to withdraw said cutter blade to permit unimpaired passage of said elastomeric strip through said in-feed mechanism;

means selectively to capture said elastomeric strip within said in-feed mechanism in order to preclude passage of said elastomeric strip through said in-feed mechanism after said cutter blade severs said elastomeric strip.

7. Apparatus for applying an apex filler to an annular bead ring, as set forth in claim 6, wherein said means selectively to capture said uncured strip of elastomeric material further comprises:

a clutch roller supported from said backing plate means in parallel relation with respect thereto;

means to limit said clutch roller to uni-directional rotation;

means to displace said clutch roller in parallel relation toward and away from said uncured elastomeric material and thereby selectively capturing or releasing said elastomeric material for axial movement with respect to said backing plate means in a direction opposite to that direction permitted by said uni-directional rotation of said clutch roller.

8. Apparatus for applying an apex filler to an annular bead ring, as set forth in claim 7, wherein said in-feed mechanism further comprises:

means for selectively reciprocating said backing plate means.

9. Apparatus for applying an apex filler to an annular bead ring, as set forth in claim 8, said apparatus further comprising:

a retraction means selectively to engage said strip of uncured elastomeric material within said in-feed mechanism and retro-translate said strip an incremental distance.

10. Apparatus for applying an apex filler to an annular bead ring, as set forth in claim 9, wherein:

said means for selectively reciprocating said backing plate means translates said anvil longitudinally beyond said clutch roller to be struck by said at least one cutter blade.

11. Apparatus for applying an apex filler to an annular bead ring, as set forth in claim 10, wherein:

said retraction means being actuatable to retro-translate said strip after said at least one cutter blade strikes said anvil but before said at least one cutter blade is withdrawn from said anvil.

12. Apparatus for applying an apex filler to an annular bead ring, as set forth in claim 9, wherein said means for retracting said strip further comprises:

a gripping means and a displacement means;

said displacement means being mounted on said in-feed mechanism;

said gripping means being mounted in said displacement means.

13. Apparatus for applying an apex filler to an annular bead ring, as set forth in claim 12, wherein said gripping means comprises:

opposed paddles that are selectively movable toward and away from each other to grasp said elastomeric strip therebetween;

an actuating arm attached to each said paddle;

piston means operatively engaging said actuating arms to move said opposed paddles toward each other;

spring means to bias said paddles away from each other.

14. Apparatus for applying an apex filler to an annular bead ring, as set forth in claim 13, wherein said displacement means comprises:

double-acting cylinder means mounted on said in-feed mechanism;

a piston rod selectively extended and retracted from said double acting cylinder means;

said paddle actuating piston means mounted on said piston rod that is selectively extended and retracted from said double acting cylinder.

15. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces, portions of which are spaced, one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring;

said means for presenting a linear strip of uncured elastomeric material to said outer circumferential surface of said bead ring further comprising:

an extruder to convert an uncured elastomeric material into said strip having the cross sectional configuration of a desired apex filler;

an in-feed mechanism;

said in-feed mechanism delivering said uncured elastomeric strip into said nip;

an accumulating loop;

a powered, loop-weight reducing roller;

said powered, loop-weight reducing roller being elevated with respect to said linear strip as it enters said orienting feed mechanism;

an orienting feed mechanism; and a feed throat to receive an uncured elastomeric strip from said powered, loop weight-reducing roller and deliver said strip in a horizontal disposition to said orienting feed mechanism;

said orienting feed mechanism employing a bay of successive, longitudinally-spaced, transitional rollers;

said successive transitional rollers effecting rotation of said strip from said horizontal disposition to a vertical disposition for entry into said in-feed mechanism.

16. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces, portions of which are spaced, one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring;

said chuck means further comprising:

a chuck turret assembly;

at least one chuck head mounted on said chuck turret assembly;

said chuck head having at least three drive arms adapted selectively to engage and position a bead ring, having an outer circumferential surface, in said nip, the radially outer end of one of said at least three drive arms being fixedly positioned with respect to said turret assembly;

a drive block incorporated in said chuck turret assembly for reciprocation toward and away from said at least one chuck head;

means to translate said drive block in one direction to effect radial expansion within a radial plane of the radially outer ends of all of said drive arms except said drive arm having a fixedly positioned outer end in order to engage and to secure an annular bead ring on said chuck head; and, means to translate said drive block in the opposite direction to effect radial contraction within said radial plane of the radially outer ends of all of said drive arms except said drive arm having a fixedly positioned outer end in order to release an annular bead ring supported on said chuck head.

17. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces, portions of which are spaced, one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ting;

means for cutting said elastomeric strip to the length required to cover said outer circumferential surface of said annular bead ring said chuck means further comprising:

a chuck turret assembly;

at least one chuck head mounted on said chuck turret assembly;

said at least one chuck head adapted selectively to engage and release a bead ring having an outer circumferential surface;

said chuck means having a drive block;

said chuck means having a rimmed outer disk means supported on said drive block for rotational movement relative to said drive block as well as translational movement with said drive block;

said chuck means also having a central disk means supported on said drive block for rotational movement relative to both said drive block and said rimmed outer disk means as well as for translational movement with said rimmed outer disk means and said drive block;

at least three drive arms having a radially inner end pivotally mounted on said central disk means, a medial means linearly guided on said rimmed outer disk means and a radially outer end;

said radially outer end of one of said at least three drive arms being fixedly positioned with respect to said turret assembly;

means to effect reciprocal translation of said drive block with respect to said fixedly positioned outer end of one said drive arm;

reciprocal translation of said drive block in one direction effecting relative rotation of said central disk means with respect to said rimmed outer disk means in order to move said radially outer ends of all said drive arms except said drive arm having a fixedly positioned outer end radially outwardly to engage and secure an annular bead ring on said chuck means; and, reciprocal translation of said drive block in the opposite direction effecting relative retro-rotation of said central disk means and said rimmed outer disk means to move said radially outer ends of all said drive arms except said drive arm having a fixedly positioned outer end radially inwardly to release the annular bead ring supported on said chuck means.

18. Apparatus for applying an apex filler to an annular bead ring, as set forth in claim 17, said apparatus further comprising:

a turret arm having a medial portion and opposite end portions;

a rotational axis extending transversely through said medial portion of said turret arm;

a chuck head mounted on each opposite end portion of said turret arm;

power means operatively to rotate said turret arm about said transversely extending rotational axis to move said chuck heads between two diametral positions relative to said transverse axis.

19. Apparatus for applying an apex filler to an annular bead ring, as set forth in claim 18, wherein:

one said diametral position serves as a loading/unloading position for receiving a bead ring and discharging a finished tire bead sub-assembly;

the other said diametral position locating said bead ring mount on either said chuck heads at least partially within said nip and thus serving as an applying position.

20. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces portions of which are spaced, one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring;

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring;

a substantially horizontal conveyor means;

a receiving index station associated with said conveyor;

said receiving index station adapted to accept an annular bead ring deposited thereon in a substantially horizontal position;

a locating index station;

a locator mechanism cooperatively associated with said locating index station capable of precisely locating annular bead rings of different diameters deposited on said receiving index station with respect to a point along the circumference of said annular bead ring as said conveyor means indexes to transport said bead ring from said receiving index station to said locating index station; and a pick up/delivery index station where bead rings positioned by said locator are transferred to said chuck means.

21. Apparatus for applying an apex filler to an annular bead ring, as set forth in claim 20, wherein said locator mechanism further comprises:

angularly diverging stop bars opening toward said receiving index station to engage an annular bead ring on said conveyor and precisely locate said annular bead ring with respect to said conveyor; and, means selectively to effect relative separation between said stop bars and said conveyor in order to permit said precisely located annular bead ring to be indexed by said conveyor without interference between said conveyor and said locator mechanism.

22. Apparatus for applying an apex filler to an annular bead ring, as set forth in claim 21, wherein said means relatively to separate said stop bars and said conveyor further comprises:

means to move said stop bars obliquely upwardly and away from said locating index station.

23. Apparatus for applying an apex filler to an annular bead ring, as set forth in claim 22, wherein said locator mechanism further comprises:

means selectively to adjust the longitudinal position of said stop bars relative to said conveyor.

24. Apparatus for applying an apex filler to an annular bead ring, as set forth in claim 23, wherein said locator mechanism further comprises:

an inboard and an outboard end on each said stop bar;

said stop bars being joined at their respective inboard ends, and diverging outwardly therefrom;

a guide bar extending outwardly from the outboard end of each said stop bar;

said guide bars extending obliquely outwardly from said outboard end of each said stop bar.

25. Apparatus for applying an apex filler to an annular bead ring comprising:

chuck means for selectively receiving an annular bead ring having an outer circumferential surface;

a pair of opposed, frusto-conical, applying rollers each having a rotational axis and outer surfaces, portions of which are spaced one with respect to the other, in order to define a nip therebetween having a cross sectional configuration in the shape of the desired apex filler;

means for delivering said chuck means, at least when supporting an annular bead ring, into said nip;

means for presenting a linear strip of uncured elastomeric material in the general cross sectional configuration of the desired apex filler to the outer circumferential surface of said annular bead ring:

said nip adapted to engage said linear strip of uncured elastomeric material and to apply said linear strip to said outer circumferential surface of said annular bead ring;

means for cutting said elastomeric strip to the length required to cover said outer circumferential surface of said annular bead ring;

a pick-up/delivery index station; and transfer means cooperatively associated with said pick-up/delivery index station to pick-up a substantially horizontally disposed bead ring from said pick-up/delivery index station and position said bead ring substantially vertically for engagement by said chuck means.

26. Apparatus for applying an apex filler to an annular bead ring, as set forth in claim 25, said transfer means further comprising:

a pivotally mounted frame member; means mounted on said frame members to grasp and release a bead ring;

means selectively to pivot said frame member between a pick-up and delivery position disposed substantially parallel to said loading/unloading portion of said conveyor means, a chuck loading and chuck unloading position disposed substantially perpendicularly with respect to said loading/unloading portion of said conveyor means and a ready position disposed at an angle greater than perpendicularly with respect to said loading/unloading portion of said conveyor means.

27. Apparatus for applying an apex filler to an annular bead ring. as set forth in claim 26. said transfer means further comprising:

first cylinder means to pivot said frame member between said pick-up and delivery position and said chuck loading and chuck unloading position; and, second cylinder means to pivot said frame member between said chuck loading and chuck unloading position and said ready position.

28. Apparatus for applying an apex filler to an annular bead ring. as set forth in claim 27. said transfer means further comprising:

a structural anchor connected to ground;

stub shaft means connected to ground for pivotally supporting said frame member;

side plate means attached to said frame member in proximity to said stub shafts;

a crank arm having opposite first and second end portions and a medial portion;

said medial portion of said crank arm pivotally mounted on at least one said stub shaft;

said first cylinder connected to ground and said first end portion of said crank arm; and, said second cylinder connected between said second end portion of said crank arm and at least one of said side plates.

29. Apparatus for applying an apex filler to an annular bead ring. as set forth in claim 27. said transfer means further comprising:

a table means;

said table means cooperatively interactive with said pick-up/delivery index station on said conveyor means vertically to displace said pick-up/delivery index station;

means selectively to displace said table means toward and away from said transfer means when said transfer means is disposed in said pick-up and delivery position.

\* \* \* \* \*